US012032447B2

(12) United States Patent
Wang et al.

(10) Patent No.: US 12,032,447 B2
(45) Date of Patent: Jul. 9, 2024

(54) METHODS, APPARATUSES AND COMPUTER PROGRAM PRODUCTS FOR UPDATING A CARD DATA OBJECT RENDERING INTERFACE BASED ON CARD ACTION INPUTS, REVERSAL CARD ACTION INPUTS, REINSTATE CARD ACTION INPUTS, AND REPLICATE CARD ACTION INPUTS

(71) Applicants: ATLASSIAN PTY LTD, Sydney (AU); Atlassian US, Inc., San Francisco, CA (US)

(72) Inventors: Raymond Wang, New York City, NY (US); Daniel LeCheminant, Seattle, WA (US)

(73) Assignees: ATLASSIAN PTY LTD, Sydney (AU); Atlassian US, Inc., San Francisco, CA (US)

( * ) Notice: Subject to any disclaimer, the term of this patent is extended or adjusted under 35 U.S.C. 154(b) by 351 days.

(21) Appl. No.: 17/247,023

(22) Filed: Nov. 24, 2020

(65) Prior Publication Data
US 2022/0164257 A1 May 26, 2022

(51) Int. Cl.
*G06F 11/14* (2006.01)
*G06Q 10/0633* (2023.01)
(52) U.S. Cl.
CPC ..... *G06F 11/1451* (2013.01); *G06Q 10/0633* (2013.01)

(58) Field of Classification Search
CPC .............................. G06F 11/14; G06Q 10/0633
See application file for complete search history.

(56) References Cited

U.S. PATENT DOCUMENTS

| | | | |
|---|---|---|---|
| 10,181,199 B2* | 1/2019 | Sunkavalli | G06T 7/49 |
| 2002/0078007 A1* | 6/2002 | Herrero | G06Q 10/10 |
| 2005/0182773 A1* | 8/2005 | Feinsmith | G06Q 10/10 |
| 2007/0250784 A1* | 10/2007 | Riley | G06Q 10/10 715/764 |
| 2010/0250322 A1* | 9/2010 | Norwood | G06Q 10/103 705/7.21 |
| 2017/0109243 A1* | 4/2017 | Kumar | G06F 11/1466 |
| 2018/0053127 A1* | 2/2018 | Boileau | G06Q 10/0631 |
| 2019/0065014 A1* | 2/2019 | Richter | G06F 9/451 |
| 2020/0099773 A1* | 3/2020 | Myers | H04L 67/1095 |
| 2020/0409523 A1* | 12/2020 | Saragadam | G06F 3/04847 |

* cited by examiner

*Primary Examiner* — Maher N Algibhah
(74) *Attorney, Agent, or Firm* — Alston & Bird LLP

(57) ABSTRACT

Various embodiments herein described are directed to methods, apparatuses and computer program products configured for improving human-user interactions and interfaces in card-based collaborative workflow management systems. In some embodiments, a client device may generate card action data objects that may monitor, track, and/or support a sequence of user inputs associated with a card data object, such that one or more user inputs can be reverted, reinstated, and/or replicated on another data object. Additional example embodiments provide various example card data object rendering interfaces that facilitate various user inputs and software operations in a card-based collaborative workflow management system.

17 Claims, 39 Drawing Sheets

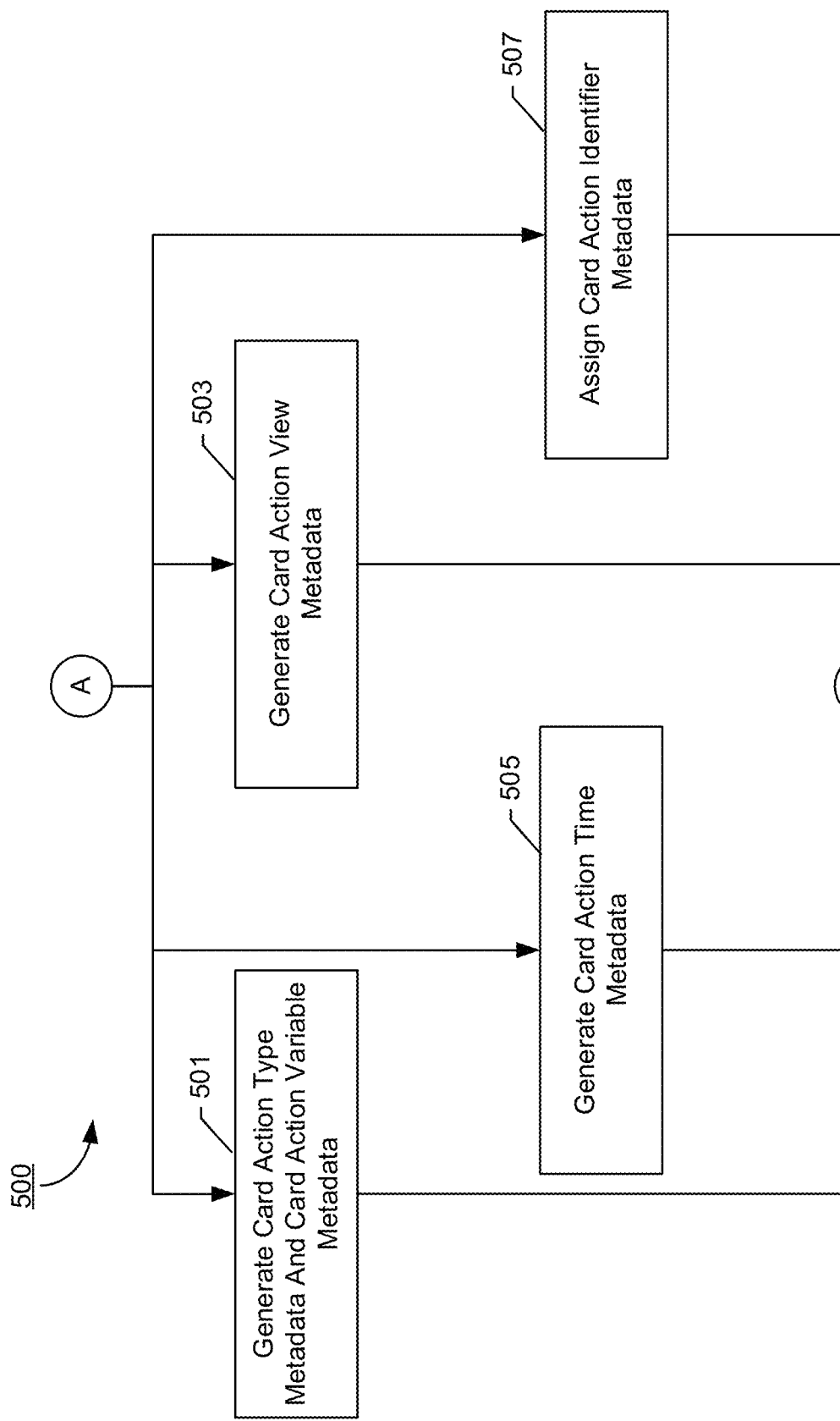

IDENTIFY GOAL STAKEHOLDERS
IN LIST GOAL 1: GROW CUSTOMERS BY 25%

MEMBERS
(YZ) (+)
1933

LABELS
EASY [+]

DESCRIPTION [EDIT]
ADD BOARD MEMBERS TO THIS CARD IF THEY ARE MAINLY RESPONSIBLE FOR THE TEAM'S PROGRESS TOWARD THE GOAL. THE STAKEHOLDER WILL UPDATE PROGRESS ON THIS BOARD, AND KEEP THE TEAM UP-TO-DATE ON PERFORMANCE.

[SHOW DETAILS]

ACTIVITY
(YZ) [WRITE A COMMENT...]

ADD TO CARD
- MEMBERS
- LABELS
- CHECKLIST
- DUE DATE
- ATTACHMENT
- COVER

POWER-UPS
+ ADD POWER-UPS

ACTIONS
- → MOVE
- COPY
- MAKE TEMPLATE
- WATCH [>]
- ARCHIVE
- SHARE

□ IDENTIFY GOAL STAKEHOLDERS
IN LIST GOAL 1: GROW CUSTOMERS BY 25% ☺

LABELS
[ EASY ] [ + ]

≡ DESCRIPTION [ EDIT ]
ADD BOARD MEMBERS TO THIS CARD IF THEY ARE MAINLY RESPONSIBLE FOR THE TEAM'S PROGRESS TOWARD THE GOAL. THE STAKEHOLDER WILL UPDATE PROGRESS ON THIS BOARD, AND KEEP THE TEAM UP-TO-DATE ON PERFORMANCE.

[ SHOW DETAILS ]

≡ ACTIVITY
(YZ) [ WRITE A COMMENT... ]

✕

ADD TO CARD
[ ♙ MEMBERS ]
[ ◈ LABELS ]
[ ☑ CHECKLIST ]
[ ⏱ DUE DATE ]
[ ⌘ ATTACHMENT ]
[ ▣ COVER ]

POWER-UPS
+ ADD POWER-UPS

ACTIONS
[ → MOVE ]
[ ▢ COPY ]
[ ▦ MAKE TEMPLATE ]
[ ⊙ WATCH ]
[ ▤ ARCHIVE ]
[ ⌁ SHARE ]

1935
MEMBER "YZ" REMOVED

FIG. 19D

IDENTIFY GOAL STAKEHOLDERS
IN LIST GOAL 1: GROW CUSTOMERS BY 25%

LABELS
EASY | IN PROGRESS —2012 | +

DESCRIPTION [EDIT]
ADD BOARD MEMBERS TO THIS CARD IF THEY ARE MAINLY RESPONSIBLE FOR THE TEAM'S PROGRESS TOWARD THE GOAL. THE STAKEHOLDER WILL UPDATE PROGRESS ON THIS BOARD, AND KEEP THE TEAM UP-TO-DATE ON PERFORMANCE.

[SHOW DETAILS]

ACTIVITY
(YZ) [WRITE A COMMENT...]

ADD TO CARD
- MEMBERS
- LABELS
- CHECKLIST
- DUE DATE
- ATTACHMENT
- COVER

POWER-UPS
+ ADD POWER-UPS

ACTIONS
- → MOVE
- COPY
- MAKE TEMPLATE
- WATCH
- ARCHIVE
- SHARE

☐ IDENTIFY GOAL STAKEHOLDERS
IN LIST GOAL 1: GROW CUSTOMERS BY 25%

LABELS
[ EASY ] [ + ]

≡ DESCRIPTION [EDIT]
ADD BOARD MEMBERS TO THIS CARD IF THEY ARE MAINLY RESPONSIBLE FOR THE TEAM'S PROGRESS TOWARD THE GOAL. THE STAKEHOLDER WILL UPDATE PROGRESS ON THIS BOARD, AND KEEP THE TEAM UP-TO-DATE ON PERFORMANCE.

[ SHOW DETAILS ]

≡ ACTIVITY
(YZ) [ WRITE A COMMENT... ]

×

ADD TO CARD
[ ♤ MEMBERS ]
[ ◈ LABELS ]
[ ☑ CHECKLIST ]
[ ⏲ DUE DATE ]
[ ✎ ATTACHMENT ]
[ ▣ COVER ]

POWER-UPS
+ ADD POWER-UPS

ACTIONS ⌐2301
[ → MOVE ]
[ ▭ COPY ]
[ ▦ MAKE TEMPLATE ]
[ ◉ WATCH ]
[ ⬒ ARCHIVE ]
[ ⇗ SHARE ]

FIG. 23A

LAUNCH CUSTOMER REFERAL EMAIL PROGRAM.
IN LIST GOAL 1: GROW CUSTOMERS BY 25%

LABELS   DUE DATE
[MEDIUM] [+]  [☐ NOV 1 AT 3:00 PM >]

DESCRIPTION [EDIT]
A CARD LIKE THIS REPRESENTS A PROJECT THAT THE TEAM IS WORKING ON TO REACH THE GOAL.
LOG WEEKLY UPDATES ON PROGRESS TOWARD THE GOAL IN THE COMMENTS BELOW!

[SHOW DETAILS]

ACTIVITY
(YZ) [WRITE A COMMENT...]

ADD TO CARD
[👤 MEMBERS]
[🏷 LABELS]
[☑ CHECKLIST]
[🕐 DUE DATE]
[📎 ATTACHMENT]
[🖼 COVER]

POWER-UPS
[+ ADD POWER-UPS]

ACTIONS
[→ MOVE]
[📋 COPY]
[📄 MAKE TEMPLATE]
[👁 WATCH]
[🗄 ARCHIVE]
[🔗 SHARE]

METHODS, APPARATUSES AND COMPUTER PROGRAM PRODUCTS FOR UPDATING A CARD DATA OBJECT RENDERING INTERFACE BASED ON CARD ACTION INPUTS, REVERSAL CARD ACTION INPUTS, REINSTATE CARD ACTION INPUTS, AND REPLICATE CARD ACTION INPUTS

BACKGROUND

Applicant has identified many technical deficiencies and problems associated with human-computer interactions and interfaces in complex computer systems. Through applied effort, ingenuity, and innovation, these deficiencies and problems are solved by developing solutions that in accordance with the present disclosure.

BRIEF SUMMARY

In general, embodiments of the present disclosure provide methods, apparatus, systems, computing devices, and/or the like for improving human-computer interactions and interfaces in card-based collaborative workflow management systems.

In accordance with various embodiments of the present disclosure, an apparatus is provided. In some embodiments, the apparatus comprises at least one processor and at least one non-transitory memory comprising program code. In some embodiments, the at least one non-transitory memory and the program code configured to, with the at least one processor, cause the apparatus to at least: in response to receiving a card action input associated with a card data object, trigger generating a card action data object based at least in part on the card action input and the card data object; update a card action history registry with a card action data object indication associated with the card action data object; in response to receiving a reversal card action input, determine whether the card action data object is reversible based at least in part on a reversible card action registry; and in response to determining that the card action data object is reversible based at least in part on the reversible card action registry: execute a reversal card action operation associated with the card action data object, and delete the card action data object indication from the card action history registry and add the card action data object indication to a reversed card action history registry.

In some embodiments, the card action data object comprises one or more of card action type metadata, card action variable metadata, card action view metadata, card action identifier metadata, and card action time metadata.

In some embodiments, when trigger generating the card action data object, the at least one non-transitory memory and the program code are configured to, with the at least one processor, cause the apparatus to: generate card action type metadata and card action variable metadata for the card action data object based at least in part on the card action input; generate card action view metadata based at least in part on the card data object; generate card action time metadata based at least in part on a system time associated with the card action input; and assign card action identifier metadata to the card action data object.

In some embodiments, prior to updating the card action history registry with the card action data object indication, the at least one non-transitory memory and the program code are configured to, with the at least one processor, cause the apparatus to: determine whether the card action data object is recordable based at least in part on a recordable card action registry. In some embodiments, the recordable card action registry defines a plurality of card action type metadata associated with recordable card action data objects.

In some embodiments, the at least one non-transitory memory and the program code are configured to, with the at least one processor, cause the apparatus to: in response to determining that the card action data object is recordable, trigger updating the card action history registry with the card action data object indication. In some embodiments, the card action history registry is stored in the at least one non-transitory memory of the apparatus.

In some embodiments, the at least one non-transitory memory and the program code are configured to, with the at least one processor, cause the apparatus to: in response to determining that the card action data object is not recordable, trigger discarding the card action data object.

In some embodiments, the card action history registry comprises a plurality of card action data object indications arranged in a chronological arrangement. In some embodiments, in response to receiving the reversal card action input, the at least one non-transitory memory and the program code are configured to, with the at least one processor, cause the apparatus to: determine that the card action data object indication is a most recent card action data object indication among the plurality of card action data object indications.

In some embodiments, the reversible card action registry comprises a plurality of card action type metadata associated with reversible card action data objects. In some embodiments, when determining whether the card action data object is reversible, the at least one non-transitory memory and the program code are configured to, with the at least one processor, cause the apparatus to: determine a card action type metadata associated with the card data object; and determine whether the card action type metadata corresponds to one of the plurality of card action type metadata.

In some embodiments, the at least one non-transitory memory and the program code are configured to, with the at least one processor, cause the apparatus to: in response to determining that the card action type metadata corresponds to one of the plurality of card action type metadata, determine that the card action data object is reversible.

In some embodiments, the at least one non-transitory memory and the program code are configured to, with the at least one processor, cause the apparatus to: in response to determining that the card action type metadata does not correspond to any of the plurality of card action type metadata: determine that the card action data object is not reversible; and forgo executing the reversal card action operation, forgo deleting the card action data object indication from the card action history registry, and forgo adding the card action data object indication to the reversed card action hi story registry.

In some embodiments, the reversible card action registry comprises a plurality of card data object indications associated with reversible card action data objects. In some embodiments, when determining whether the card action data object is reversible, the at least one non-transitory memory and the program code are configured to, with the at least one processor, cause the apparatus to: determine whether the card data object corresponds to one of the plurality of card data object indications.

In some embodiments, the at least one non-transitory memory and the program code are configured to, with the at least one processor, cause the apparatus to: in response to determining that the card data object corresponds to one of the plurality of card data object indications, determine that the card action data object is reversible.

In some embodiments, the at least one non-transitory memory and the program code are configured to, with the at least one processor, cause the apparatus to: in response to determining that the card data object does not correspond to any of the plurality of card data object indications: determine that the card action data object is not reversible; and forgo executing the reversal card action operation, forgo deleting the card action data object indication from the card action history registry, and forgo adding the card action data object indication to the reversed card action history registry.

In some embodiments, when determining whether the card action data object is reversible, the at least one non-transitory memory and the program code are configured to, with the at least one processor, cause the apparatus to: determine reversal card action view metadata associated with the reversal card action input; and determine whether the reversal card action view metadata corresponds to card action view metadata of the card action data object.

In some embodiments, the at least one non-transitory memory and the program code are configured to, with the at least one processor, cause the apparatus to: in response to determining that the reversal card action view metadata corresponds to the card action view metadata, determine that the card action data object is reversible.

In some embodiments, the at least one non-transitory memory and the program code are configured to, with the at least one processor, cause the apparatus to: in response to determining that the reversal card action view metadata does not correspond to the card action view metadata: determine that the card action data object is not reversible; and forgo executing the reversal card action operation, forgo deleting the card action data object indication from the card action history registry, and forgo adding the card action data object indication to the reversed card action history registry.

In some embodiments, the reversible card action registry defines a plurality of reversal card action operations. In some embodiments, each of the plurality of reversal card action operations corresponds to one or more card action type metadata.

In some embodiments, when executing the reversal card action operation, the at least one non-transitory memory and the program code are configured to, with the at least one processor, cause the apparatus to: determine a card action type metadata associated with the card action data object; and determine, based at least in part on the reversible card action registry, the reversal card action operation corresponding to the card action type metadata.

In some embodiments, the reversible card action registry defines a first reversal card action operation corresponding to a first card action type metadata. In some embodiments, the first card action type metadata indicates associating a list identifier with a first card data object. In some embodiments, the first reversal card action operation indicates disassociating the list identifier from the first card data object.

In some embodiments, the reversible card action registry defines a first reversal card action operation corresponding to a first card action type metadata. In some embodiments, the first card action type metadata indicates associating a user identifier with a first card data object. In some embodiments, the first reversal card action operation indicates disassociating the user identifier from the first card data object.

In some embodiments, the reversible card action registry defines a first reversal card action operation corresponding to a first card action type metadata. In some embodiments, the first card action type metadata indicates associating a label identifier with a first card data object. In some embodiments, the first reversal card action operation indicates disassociating the label identifier from the first card data object.

In some embodiments, the reversed card action history registry is stored in the at least one non-transitory memory of the apparatus.

In some embodiments, subsequent to add the card action data object indication to the reversed card action history registry, the at least one non-transitory memory and the program code are configured to, with the at least one processor, cause the apparatus to: in response to receiving a reinstate card action input: execute a reinstate card action operation based on the card action data object indication; and delete the card action data object indication from the reversed card action history registry and add the card action data object indication to the card action history registry.

In accordance with various embodiments of the present disclosure, an apparatus is provided. In some embodiments, the apparatus comprises at least one processor and at least one non-transitory memory comprising program code. In some embodiments, the at least one non-transitory memory and the program code are configured to, with the at least one processor, cause the apparatus to at least: in response to receiving a first card action input associated with a first card data object, trigger generating a first card action data object based at least in part on the first card action input and the first card data object; and in response to receiving a first replicate card action input associated with a second card data object: determine first card action type metadata and first card action variable metadata associated with the first card action data object; and execute a first replicate card action operation on the second card data object based at least in part on the first card action type metadata and first card action variable metadata.

In some embodiments, the at least one non-transitory memory and the program code are configured to, with the at least one processor, cause the apparatus to: generate a card action template data object based on the first card action type metadata and first card action variable metadata; and store the card action template data object in the at least one non-transitory memory of the apparatus.

In some embodiments, the first card action type metadata and first card action variable metadata define associating a board identifier and a list identifier with the first card data object. In some embodiments, when executing the first replicate card action operation on the second card data object, the at least one non-transitory memory and the program code are configured to, with the at least one processor, cause the apparatus to: associate the board identifier and the list identifier with the second card data object.

In accordance with various embodiments of the present disclosure, a computer-implemented method is provided. The computer-implemented method comprises in response to receiving a card action input associated with a card data object, triggering generating a card action data object based at least in part on the card action input and the card data object; updating a card action history registry with a card action data object indication associated with the card action data object; in response to receiving a reversal card action input, determining whether the card action data object is reversible based at least in part on a reversible card action registry; and in response to determining that the card action data object is reversible based at least in part on the reversible card action registry: executing a reversal card action operation associated with the card action data object, and deleting the card action data object indication from the card action history registry and add the card action data object indication to a reversed card action history registry.

In accordance with various embodiments of the present disclosure, a computer-implemented method is provided. The computer-implemented method comprises: in response to receiving a first card action input associated with a first card data object, triggering generating a first card action data object based at least in part on the first card action input and the first card data object; and in response to receiving a first replicate card action input associated with a second card data object: determining first card action type metadata and first card action variable metadata associated with the first card action data object; and executing a first replicate card action operation on the second card data object based at least in part on the first card action type metadata and first card action variable metadata.

In accordance with various embodiments of the present disclosure, a computer program product is provided. In some embodiments, the computer program product comprises at least one non-transitory computer-readable storage medium having computer-readable program code portions stored therein. In some embodiments, the computer-readable program code portions comprise an executable portion configured to: in response to receiving a card action input associated with a card data object, trigger generating a card action data object based at least in part on the card action input and the card data object; update a card action history registry with a card action data object indication associated with the card action data object; in response to receiving a reversal card action input, determine whether the card action data object is reversible based at least in part on a reversible card action registry; and in response to determining that the card action data object is reversible based at least in part on the reversible card action registry: execute a reversal card action operation associated with the card action data object, and delete the card action data object indication from the card action history registry and add the card action data object indication to a reversed card action history registry.

In accordance with various embodiments of the present disclosure, a computer program product is provided. In some embodiments, the computer program product comprises at least one non-transitory computer-readable storage medium having computer-readable program code portions stored therein. In some embodiments, the computer-readable program code portions comprise an executable portion configured to: in response to receiving a first card action input associated with a first card data object, trigger generating a first card action data object based at least in part on the first card action input and the first card data object; and in response to receiving a first replicate card action input associated with a second card data object: determine first card action type metadata and first card action variable metadata associated with the first card action data object; and execute a first replicate card action operation on the second card data object based at least in part on the first card action type metadata and first card action variable metadata.

The above summary is provided merely for purposes of summarizing some example embodiments to provide a basic understanding of some aspects of the disclosure. Accordingly, it will be appreciated that the above-described embodiments are merely examples. It will be appreciated that the scope of the disclosure encompasses many potential embodiments in addition to those here summarized, some of which will be further described below.

BRIEF DESCRIPTION OF THE DRAWINGS

Figure 1:
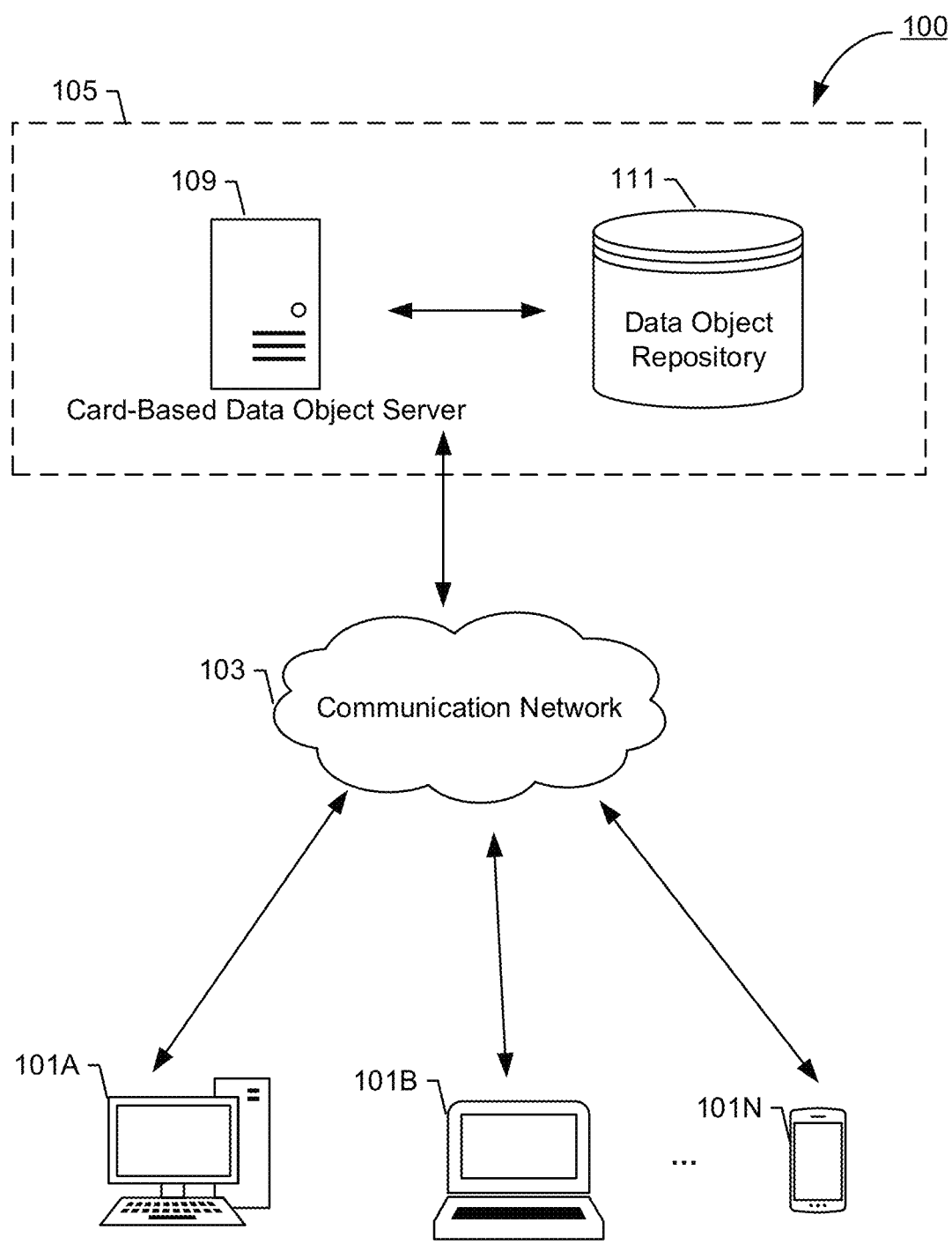
Figure 2:
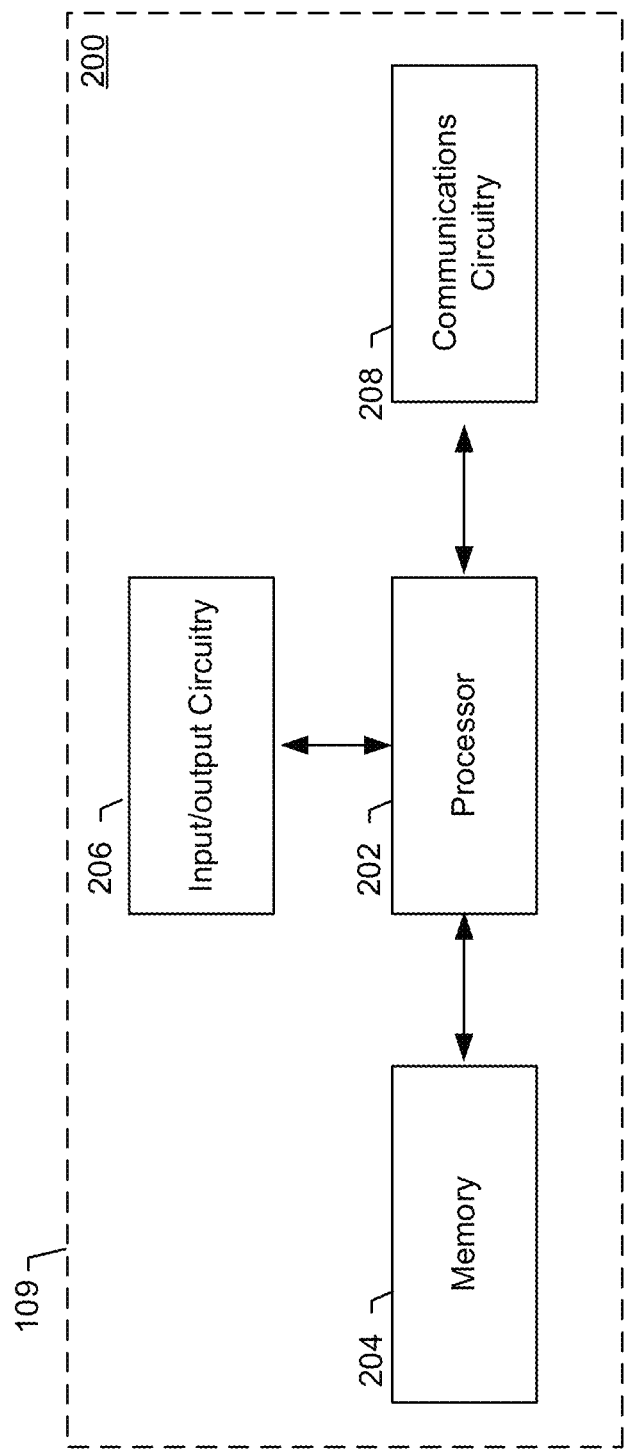
Figure 3:
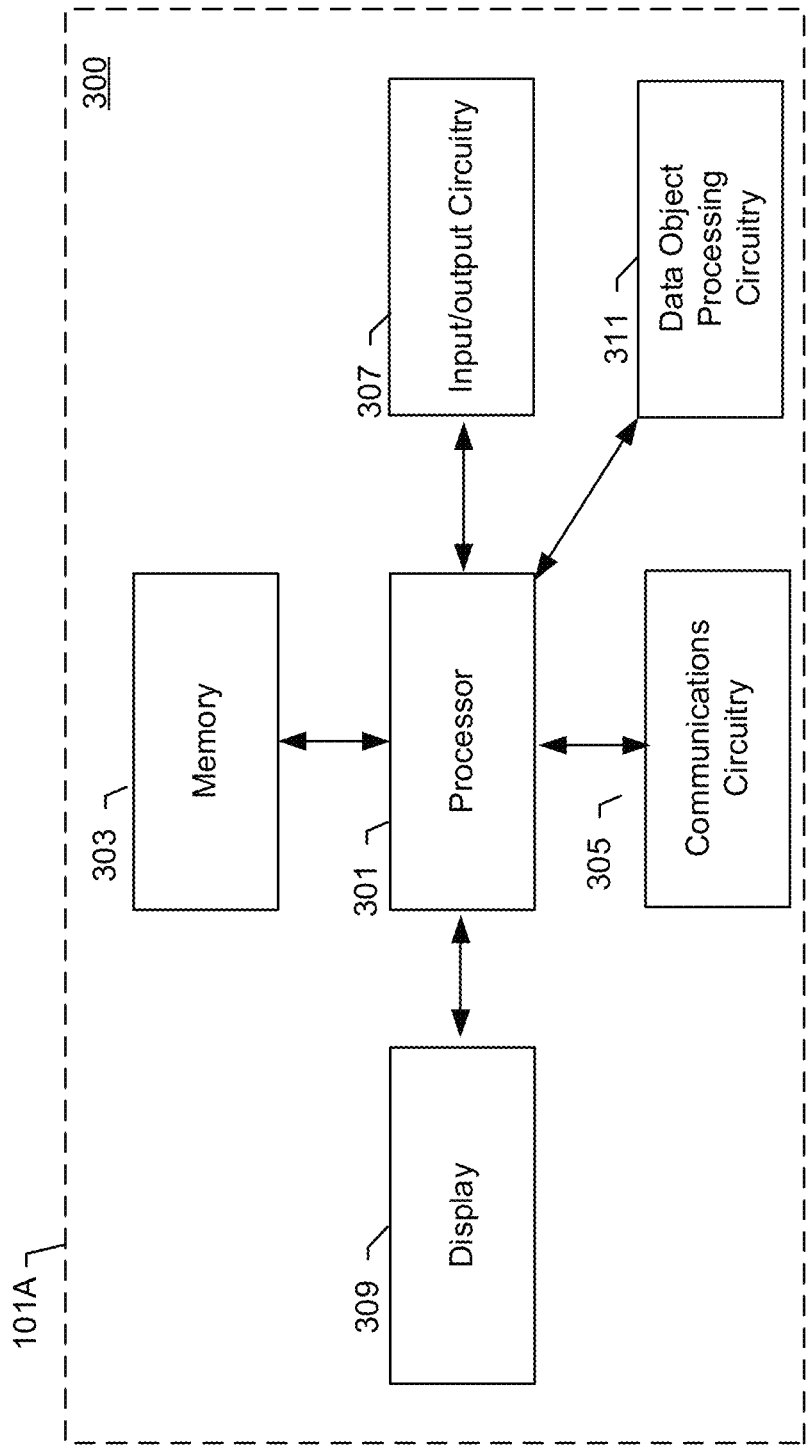
Figure 4A:
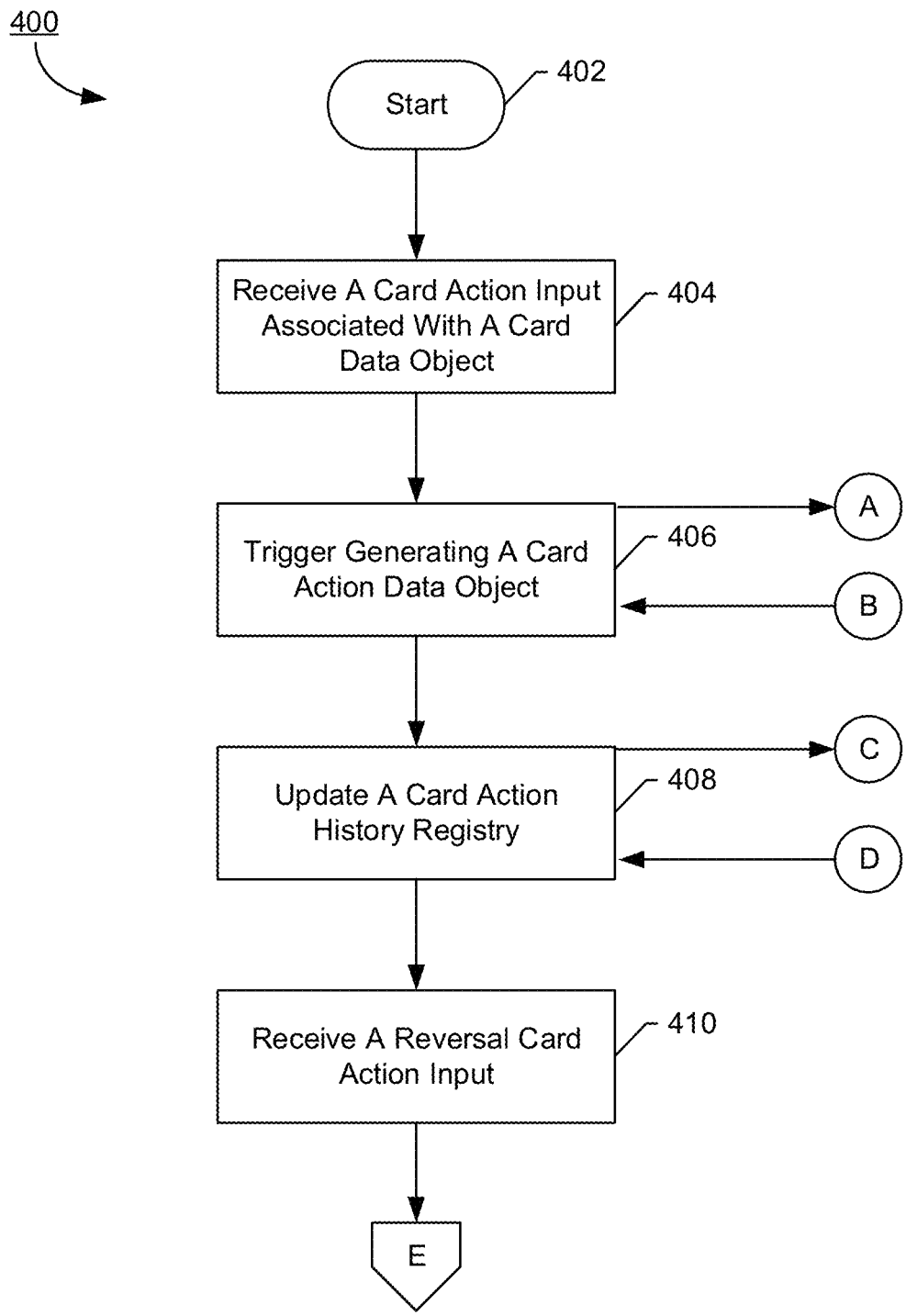
Figure 4B:
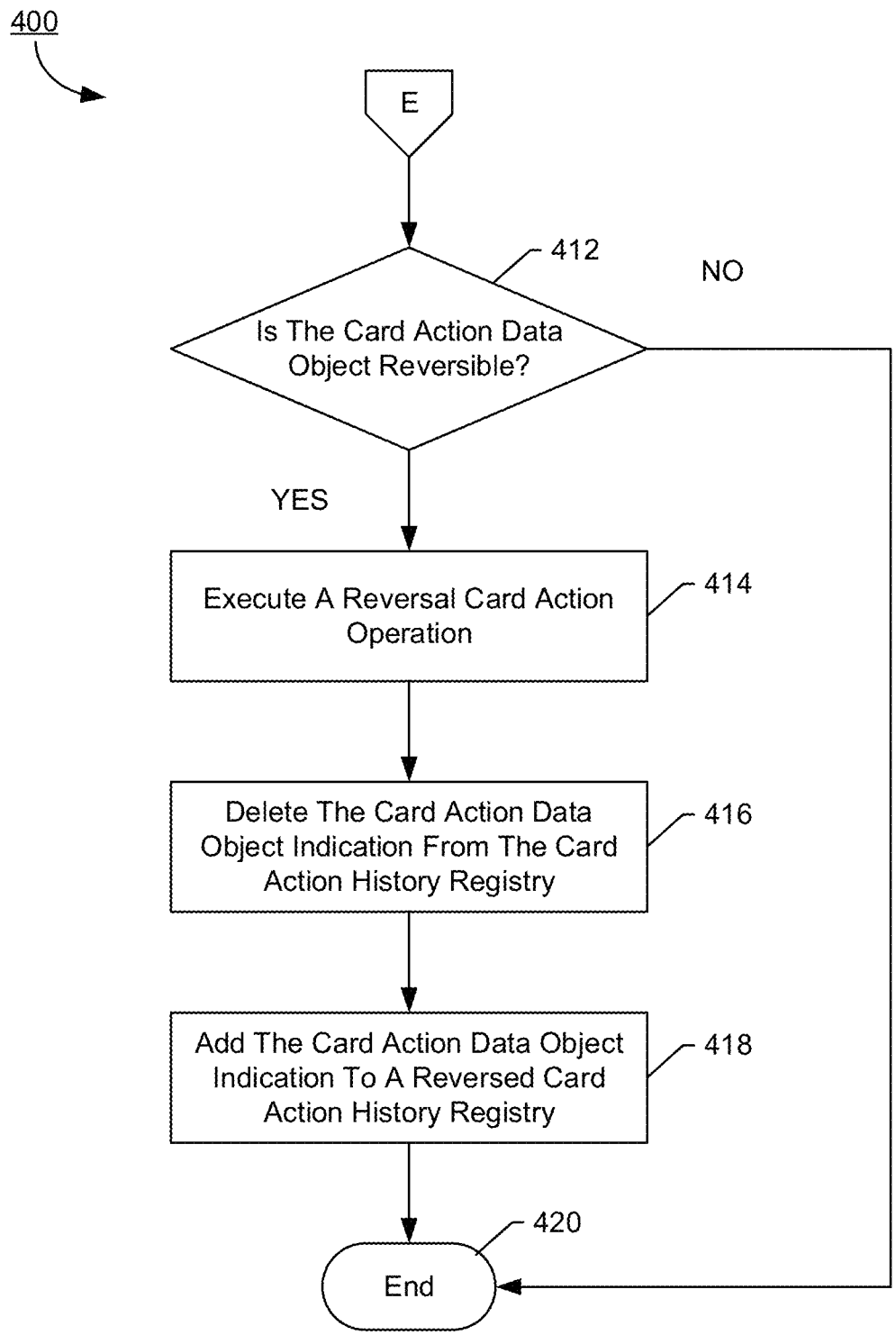
Figure 6:
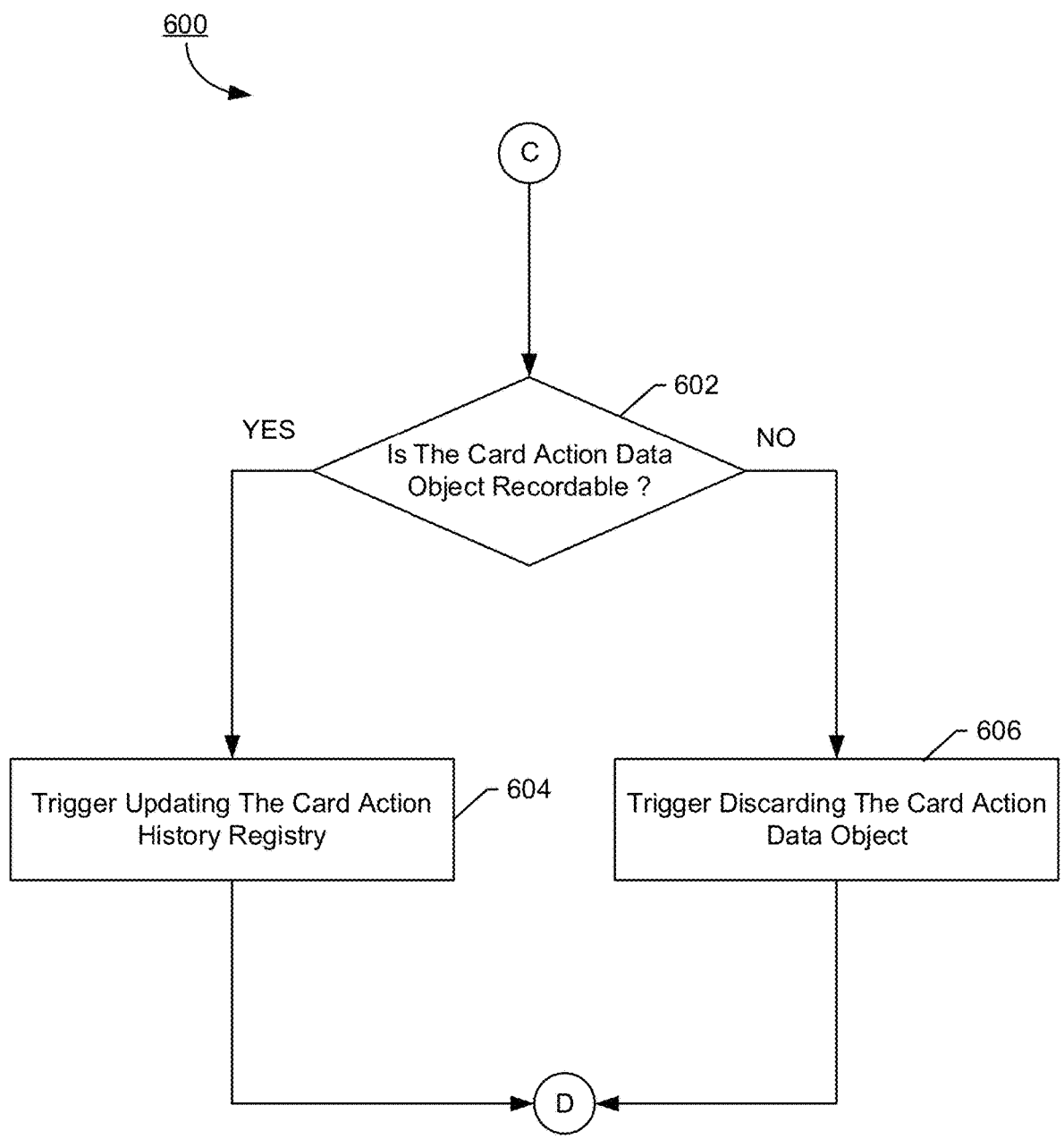
Figure 7:
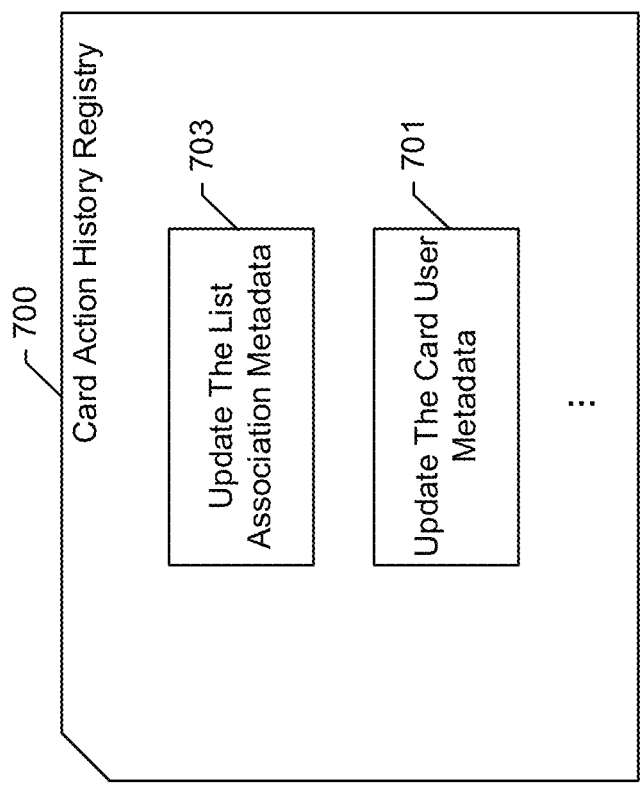
Figure 8:
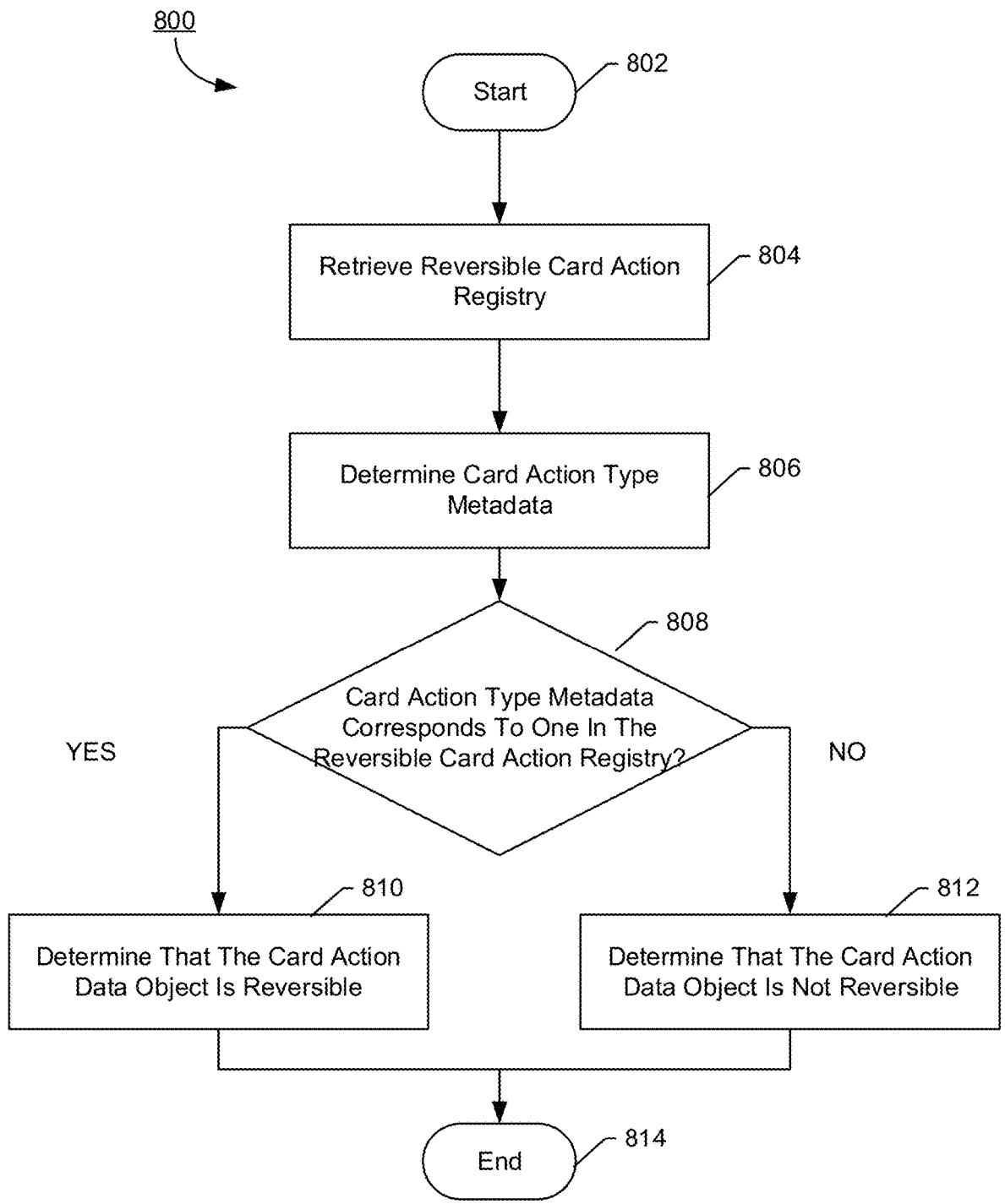
Figure 9:
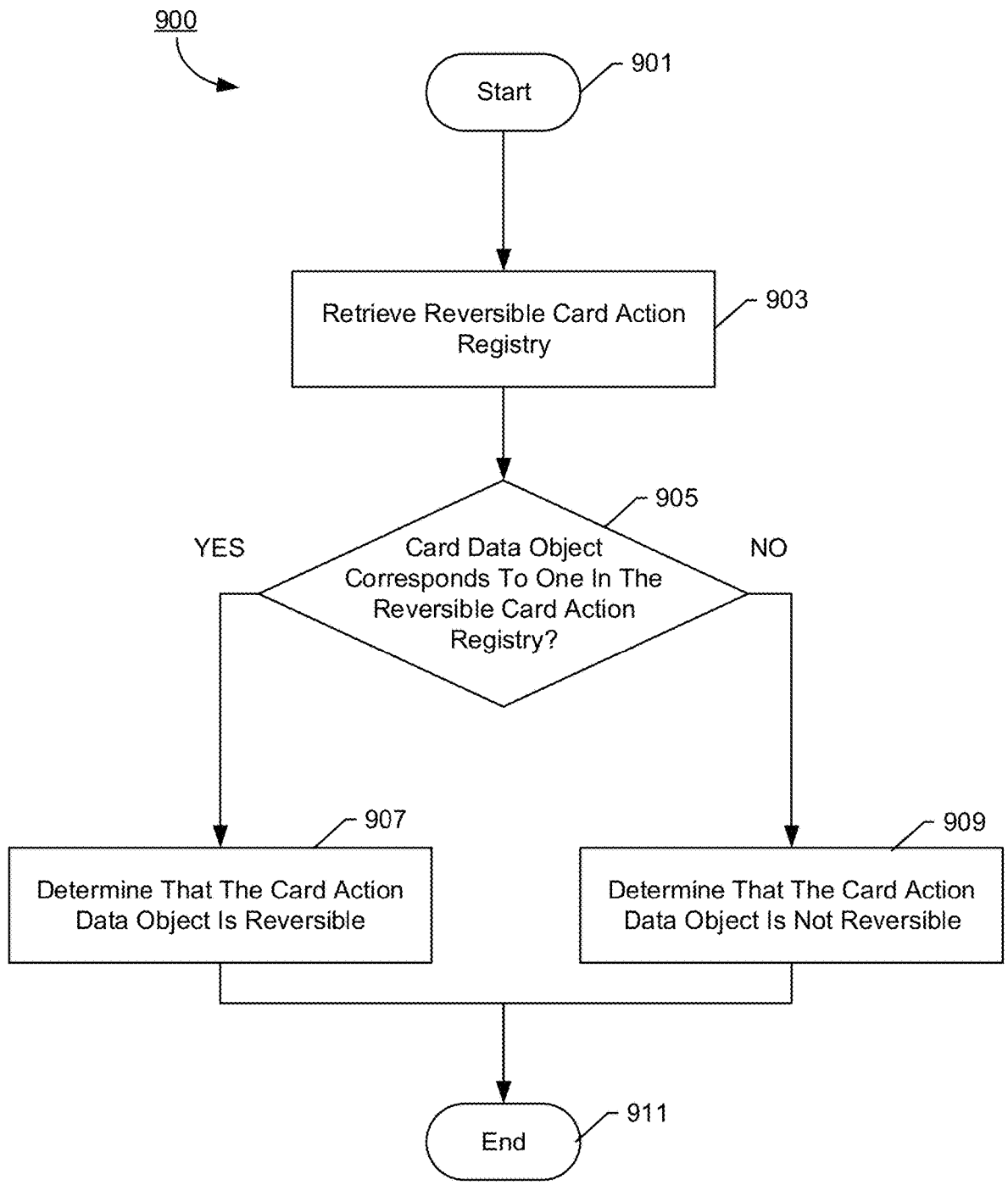
Figure 10:
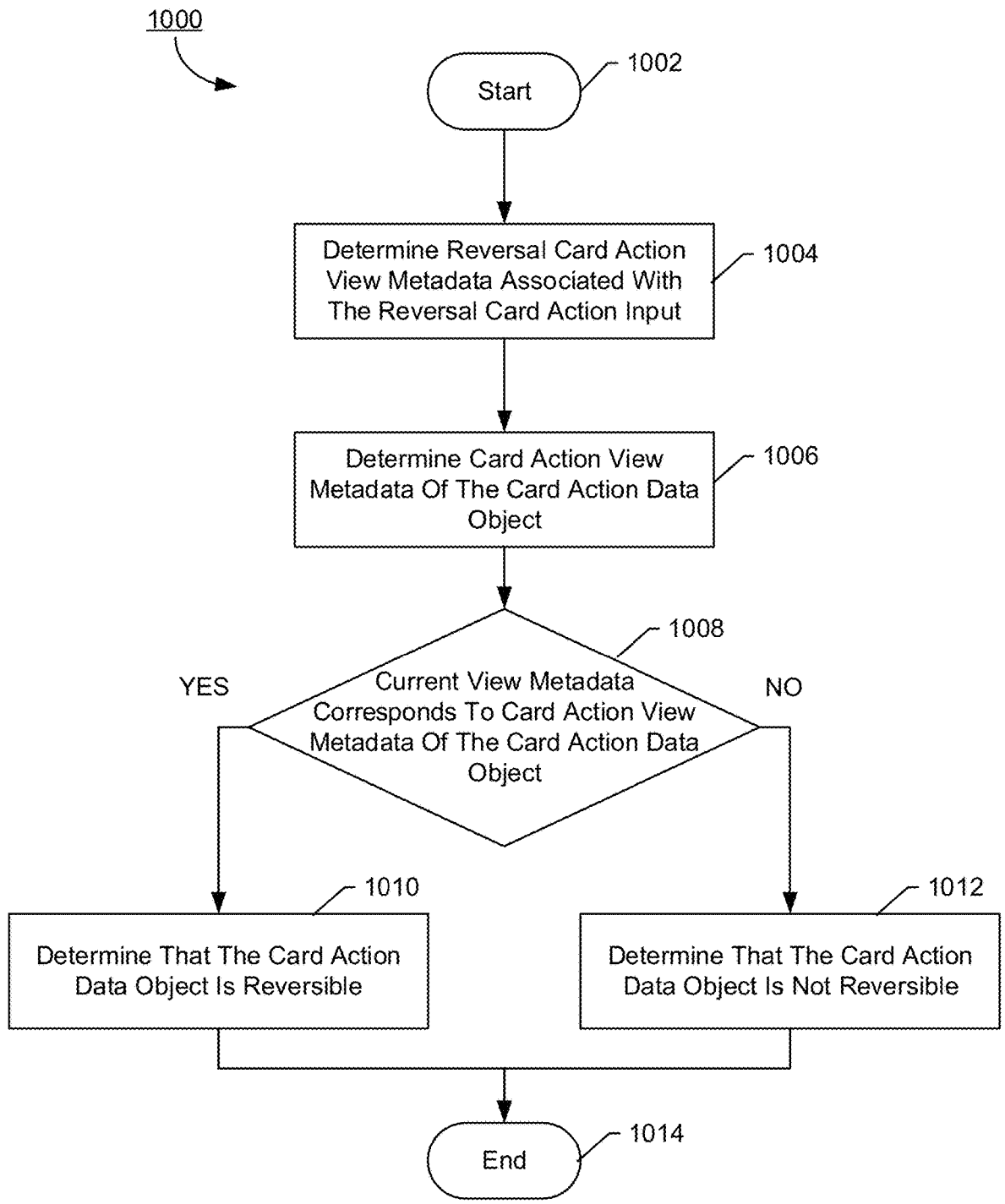
Figure 11:
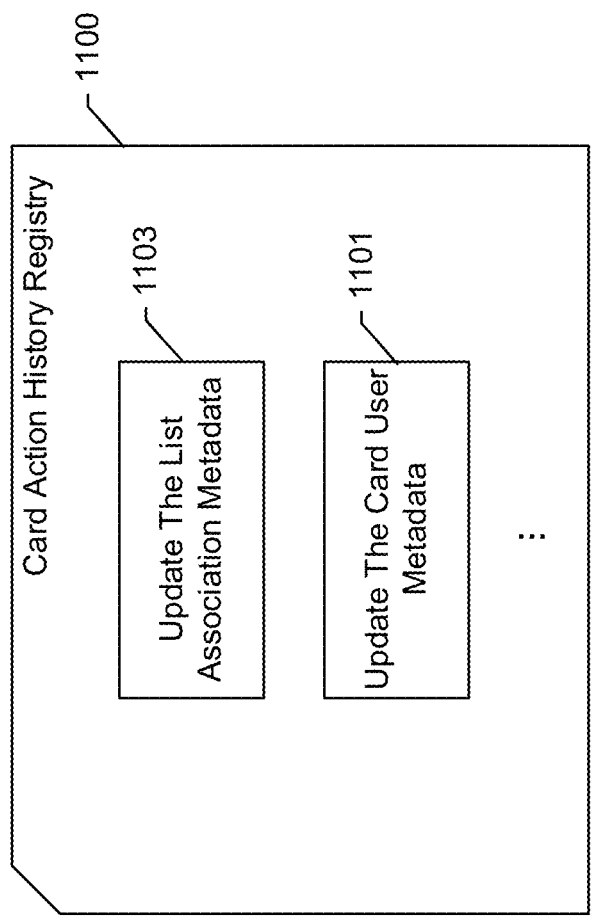
Figure 12:
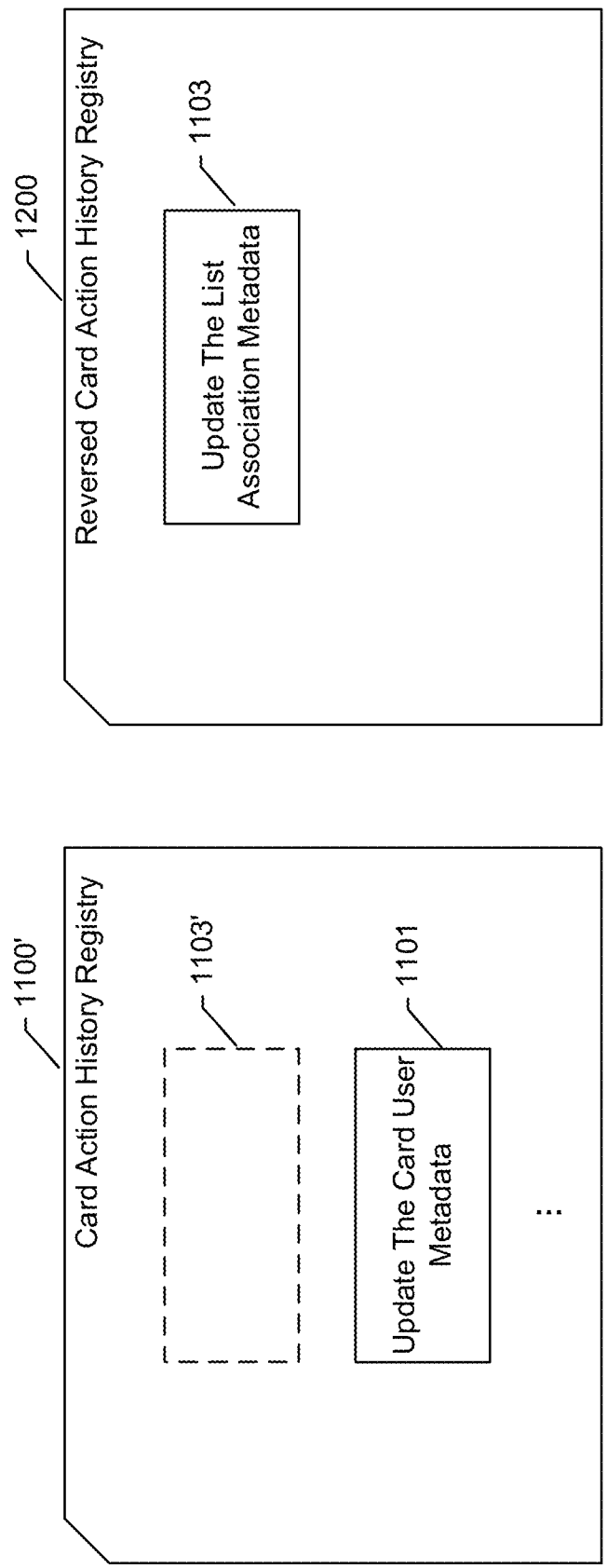
Figure 13:
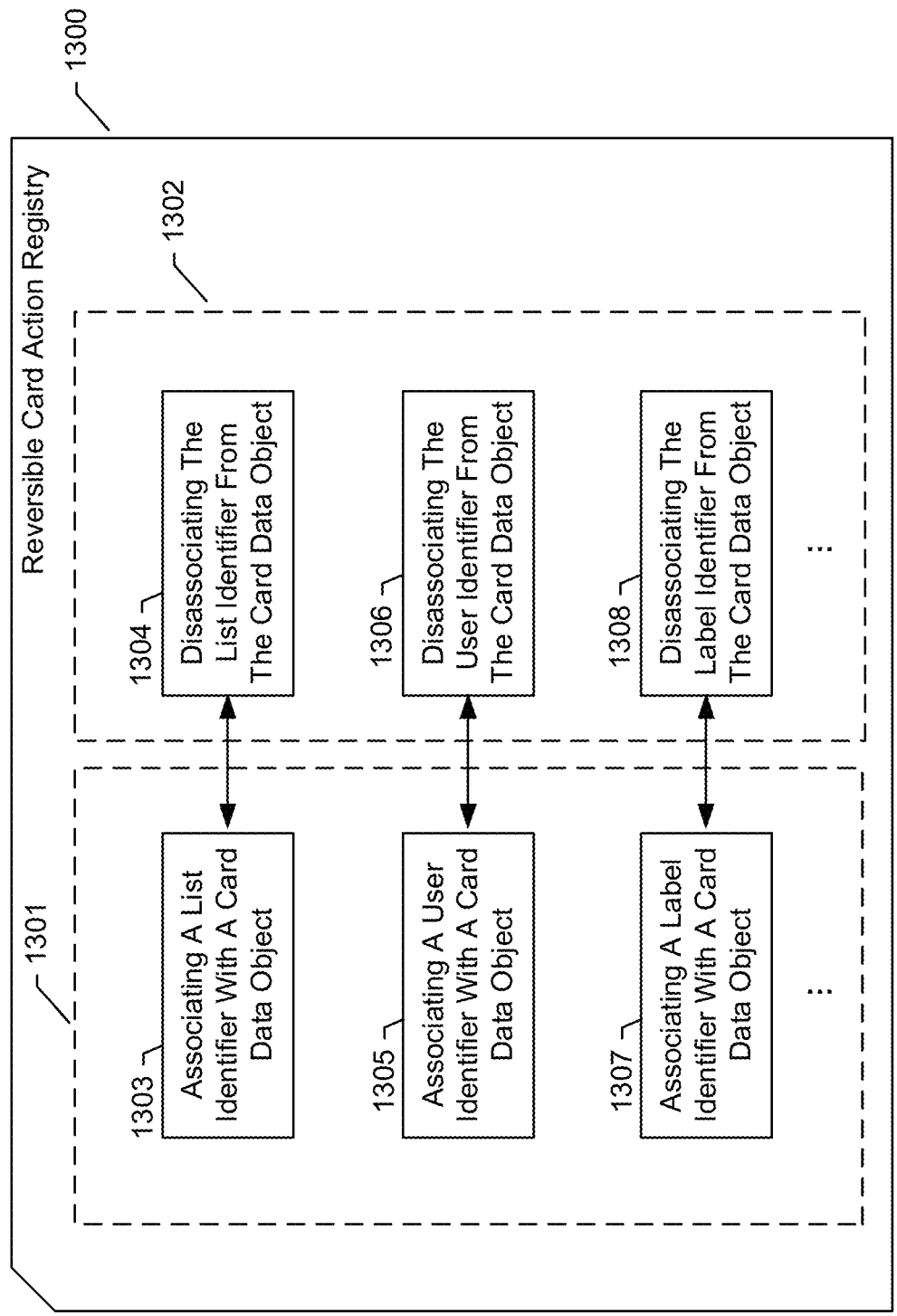
Figure 14:
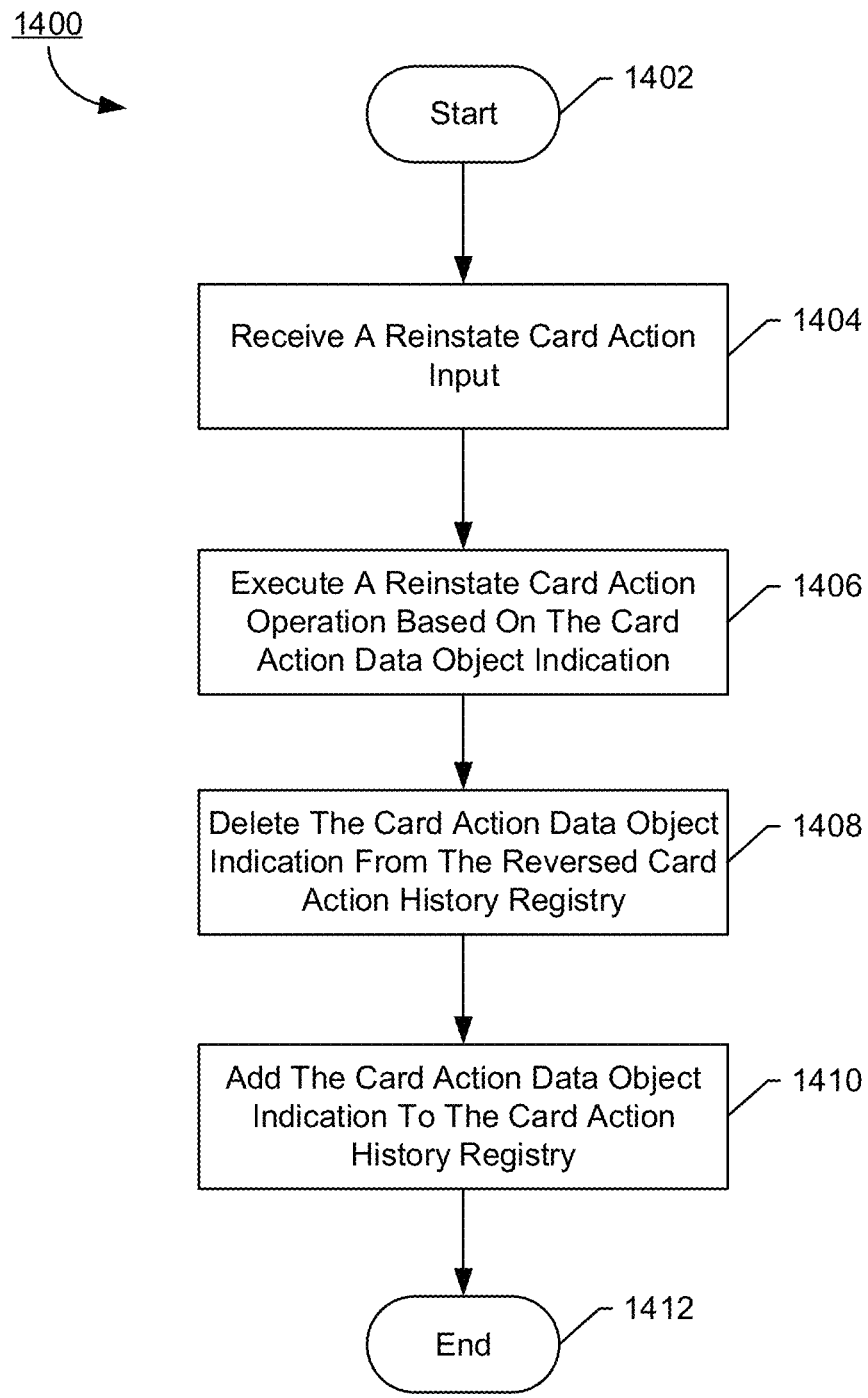
Figure 15A:
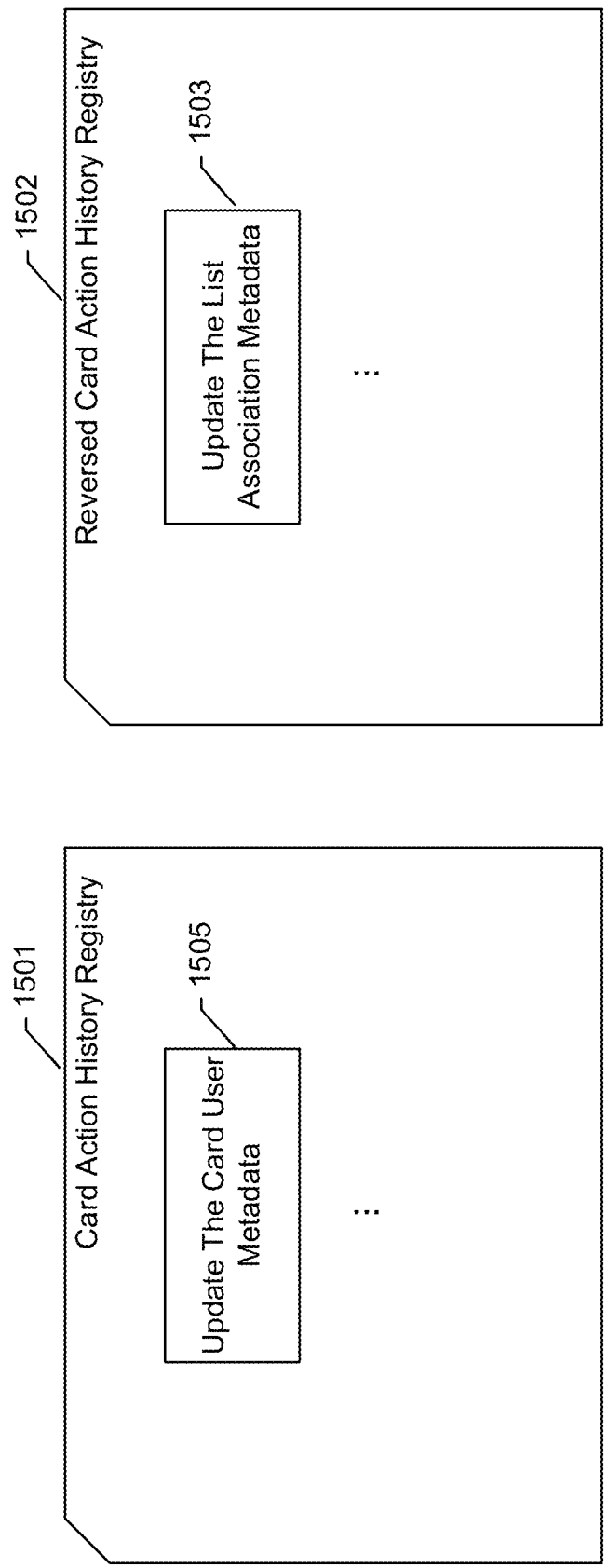
Figure 15B:
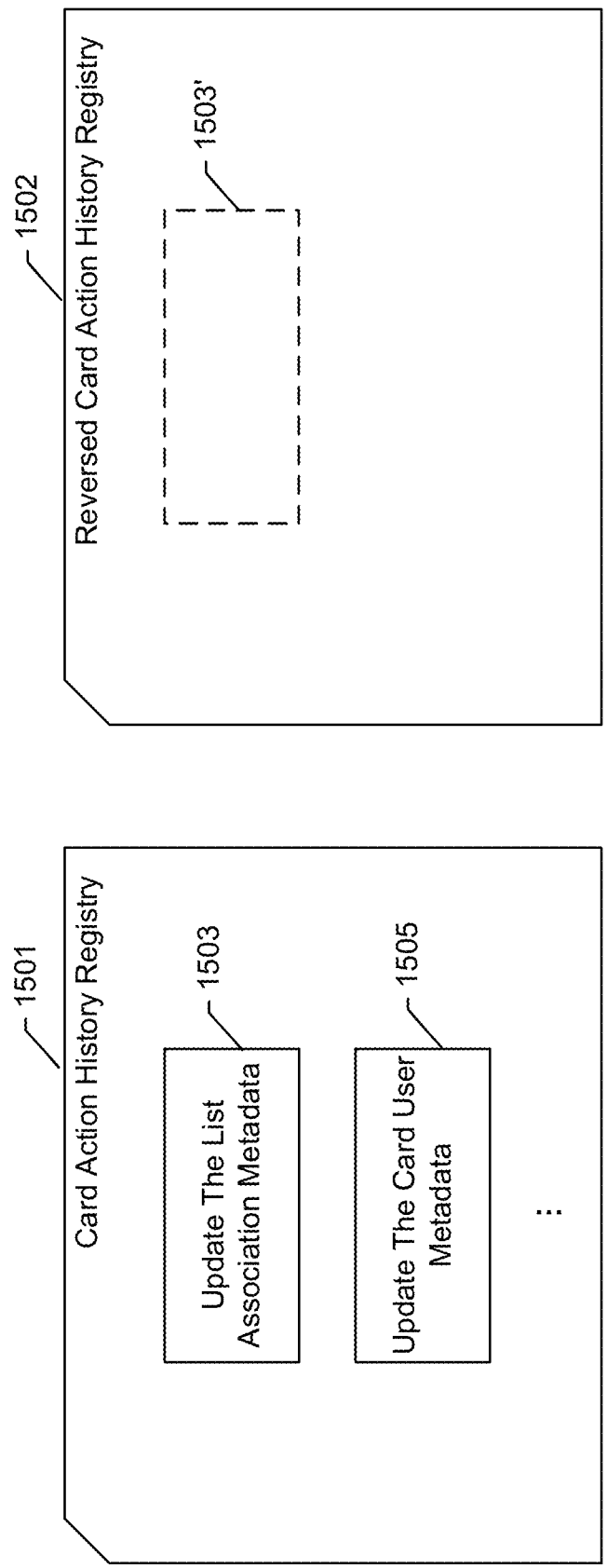
Figure 16:
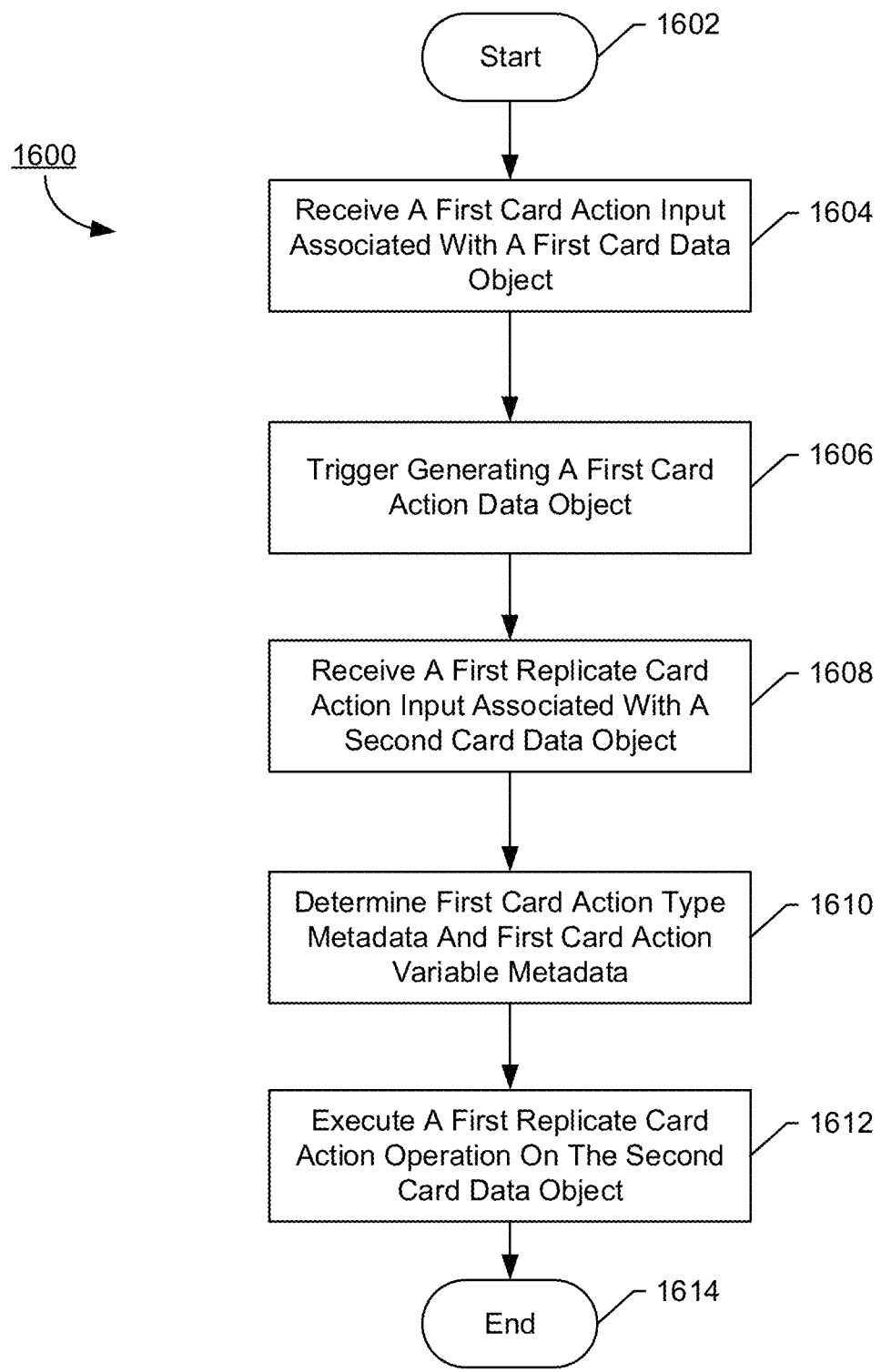
Figure 17:
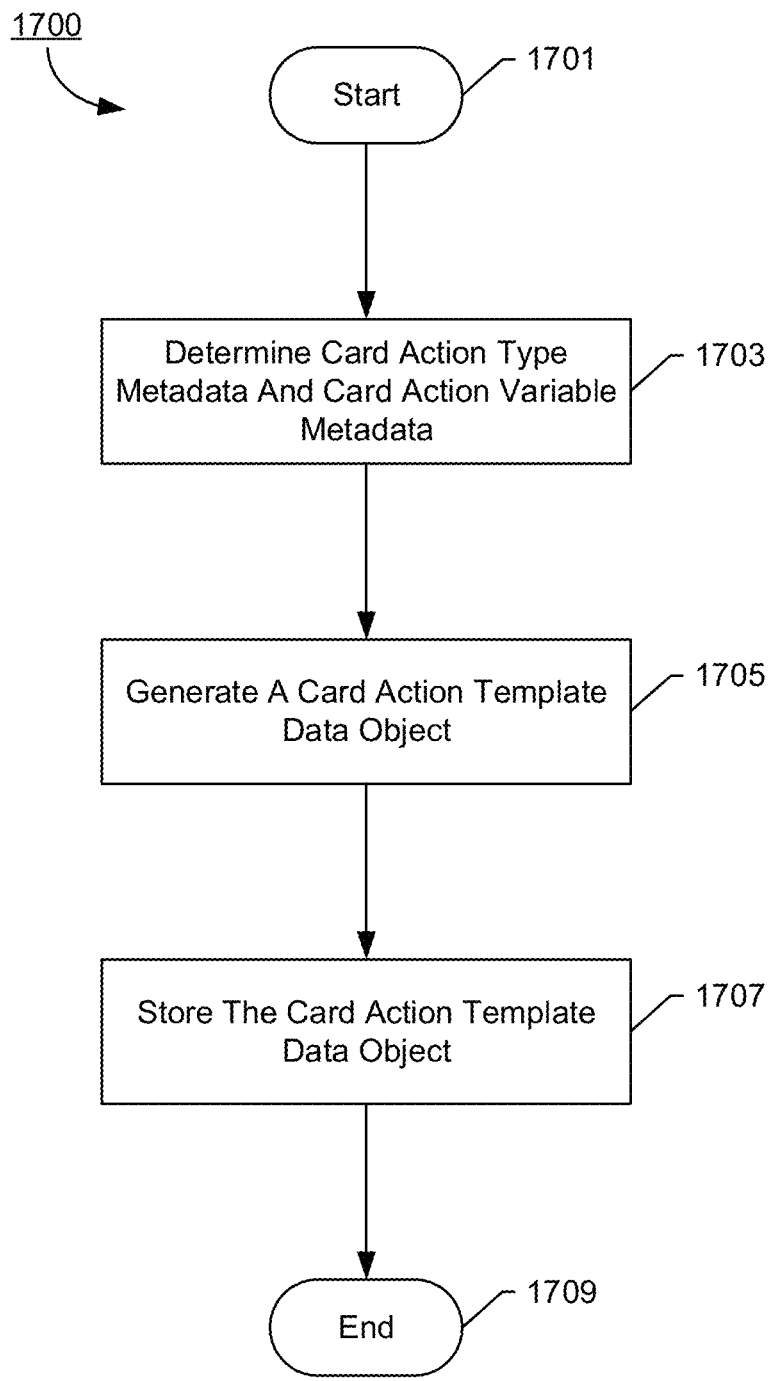
Figure 18A:
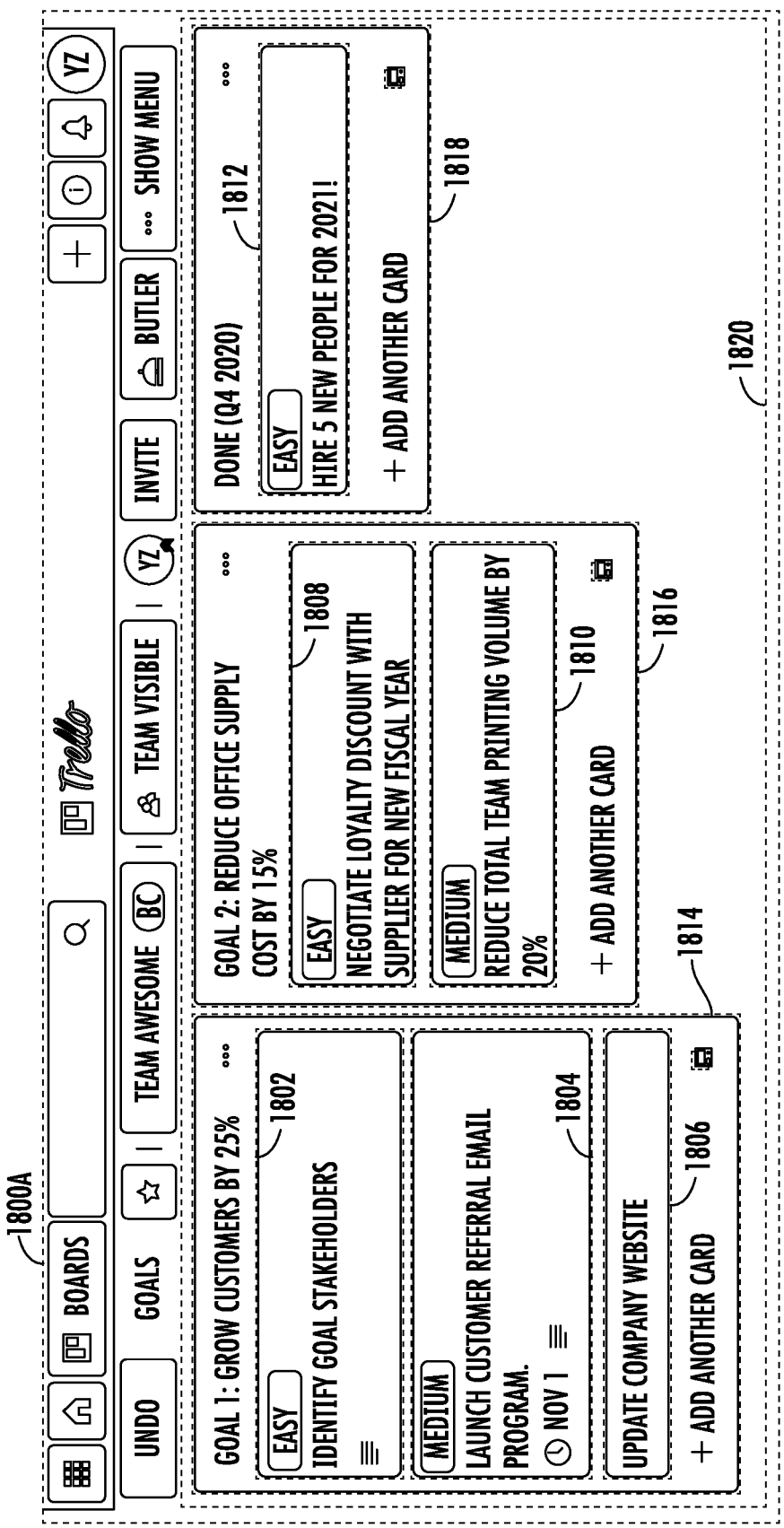
Figure 18B:
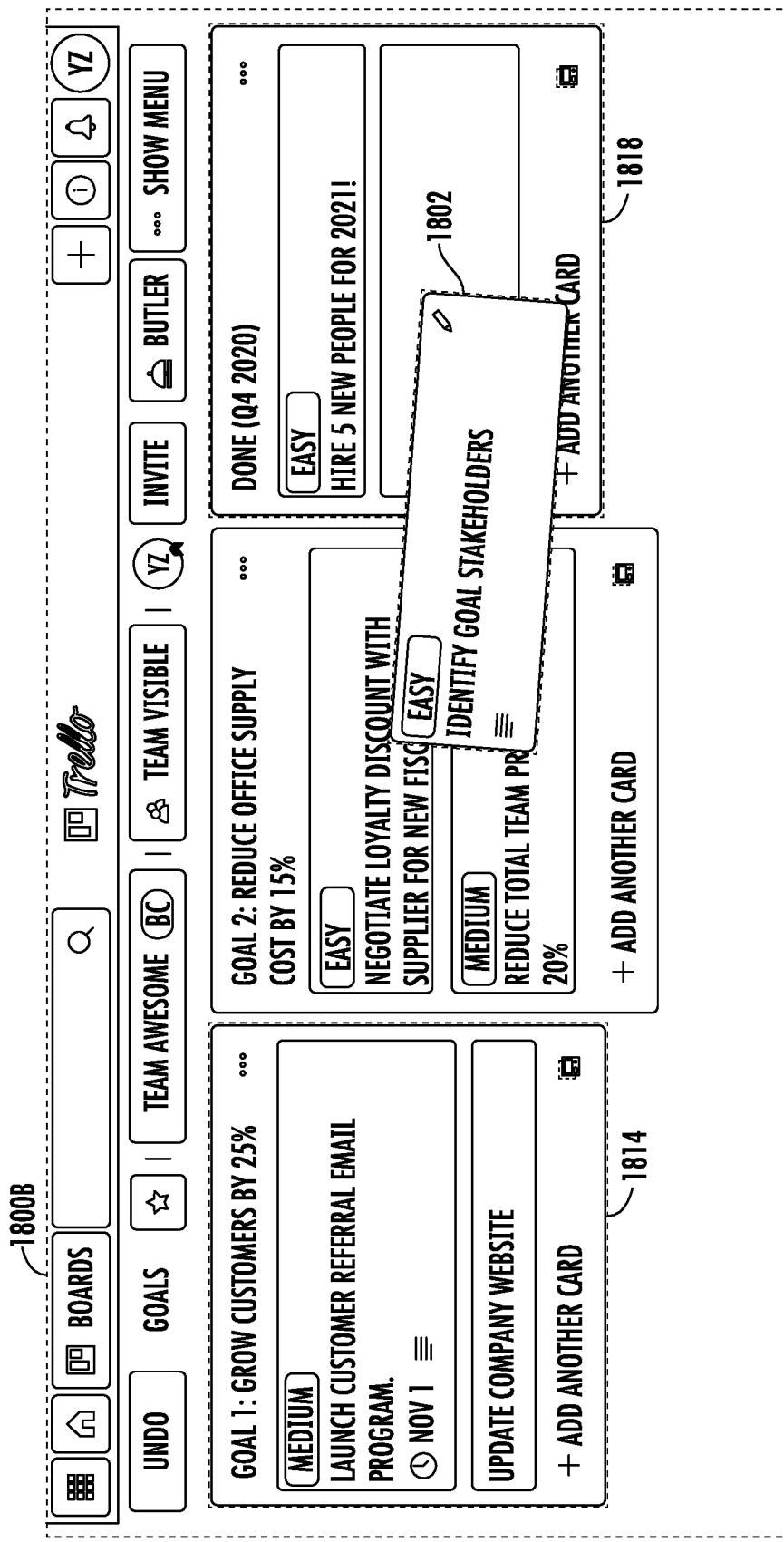
Figure 18C:
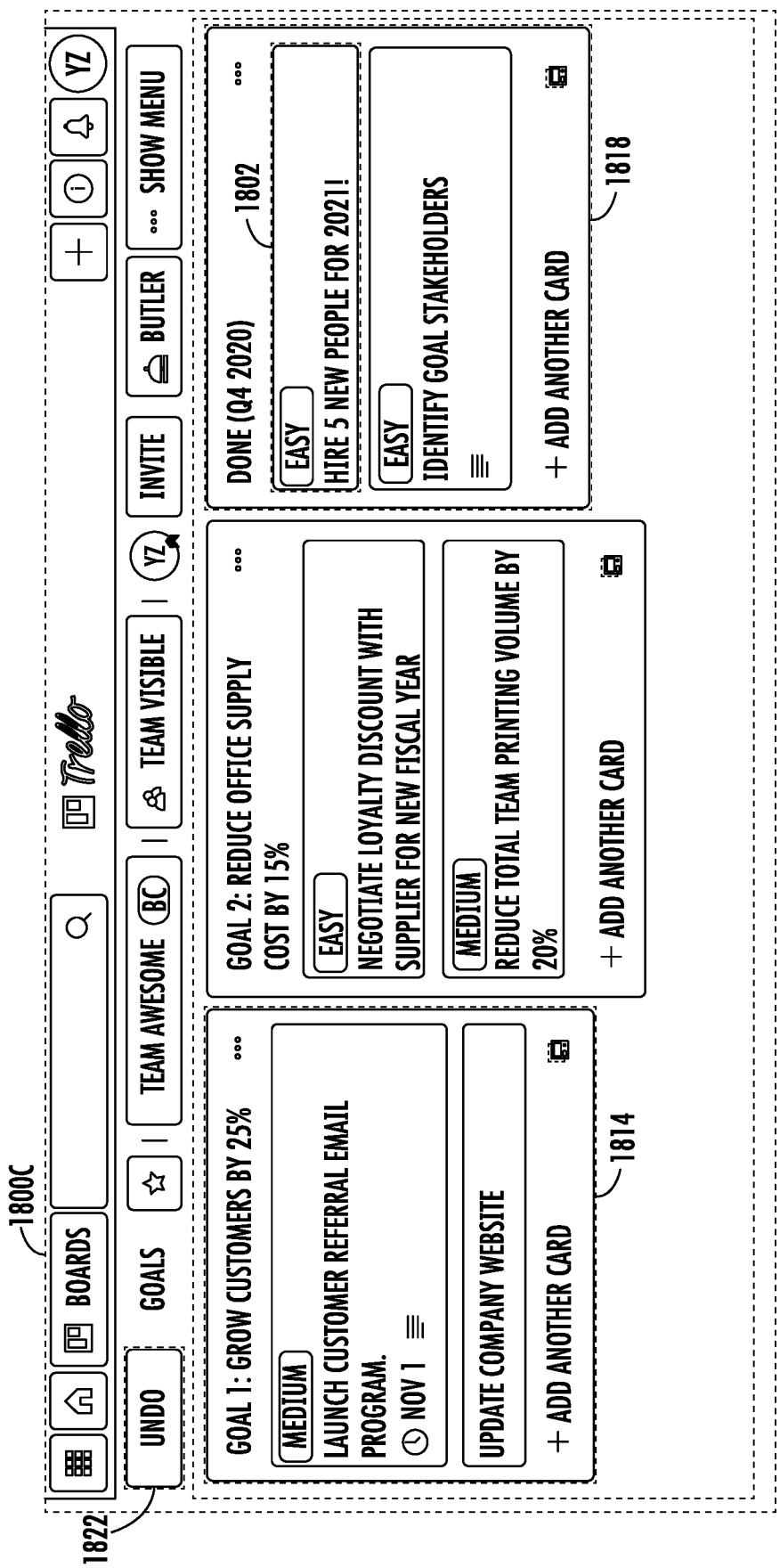
Figure 18D:
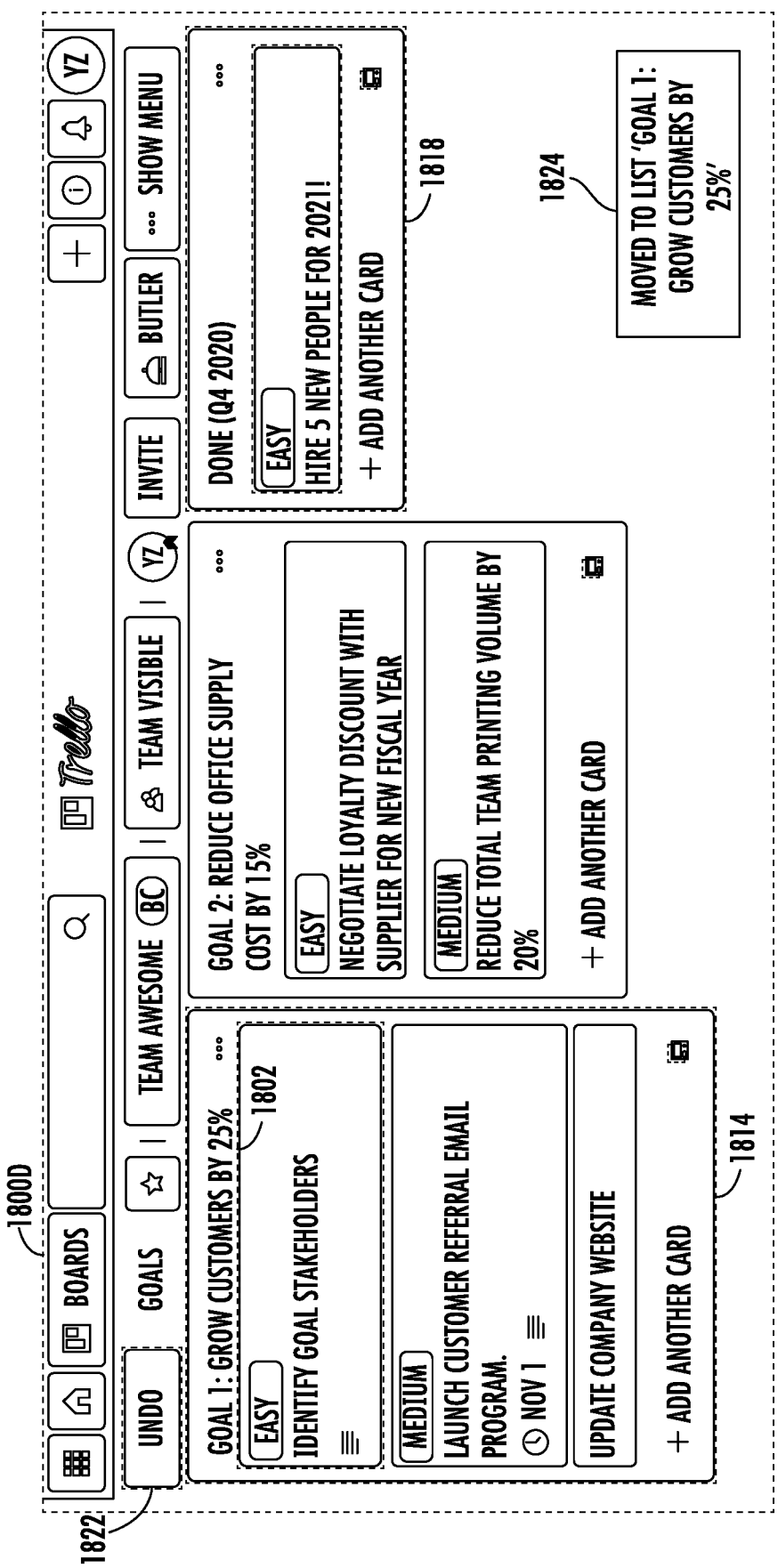
Figure 19A:
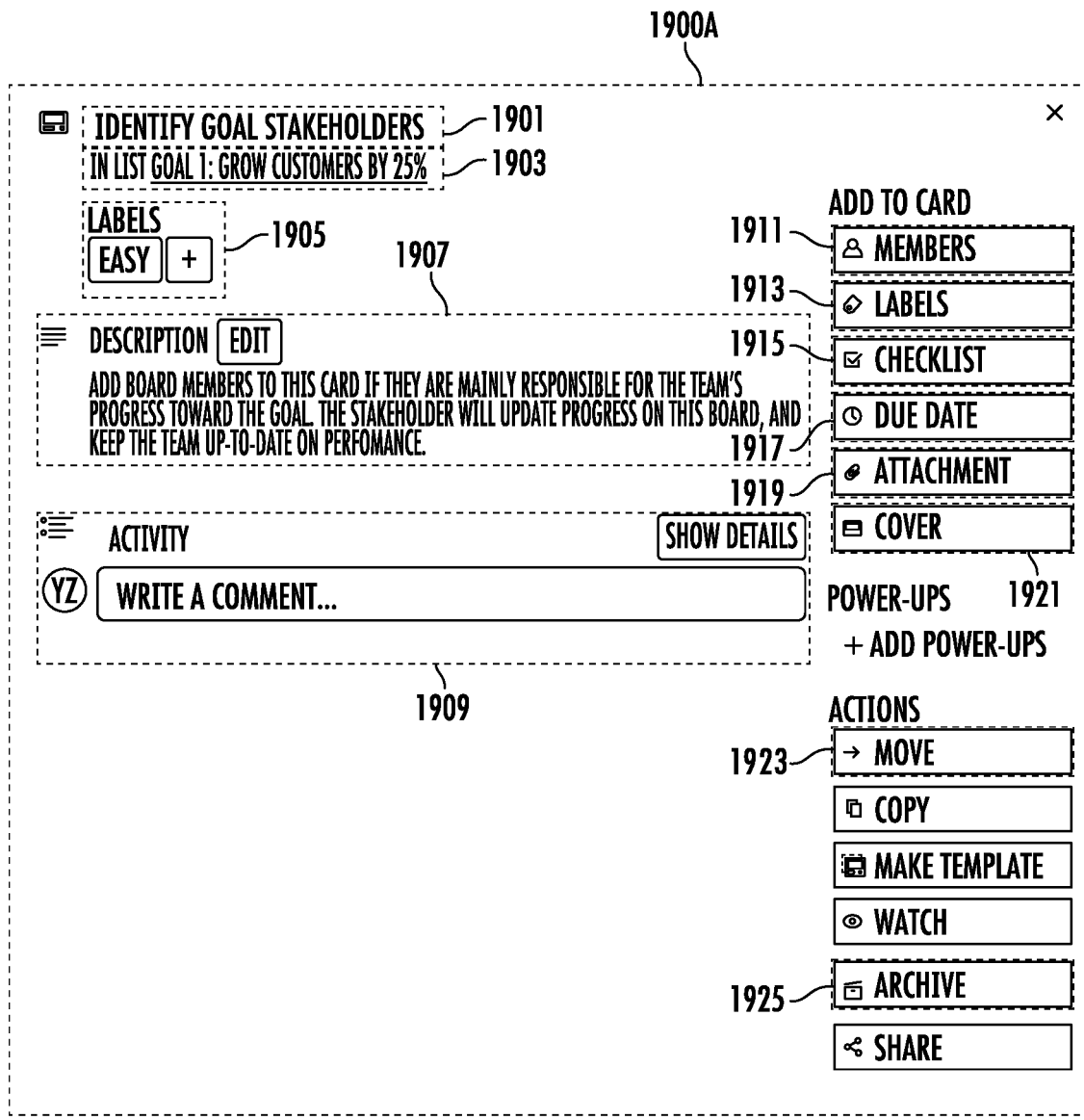
Figure 19B:
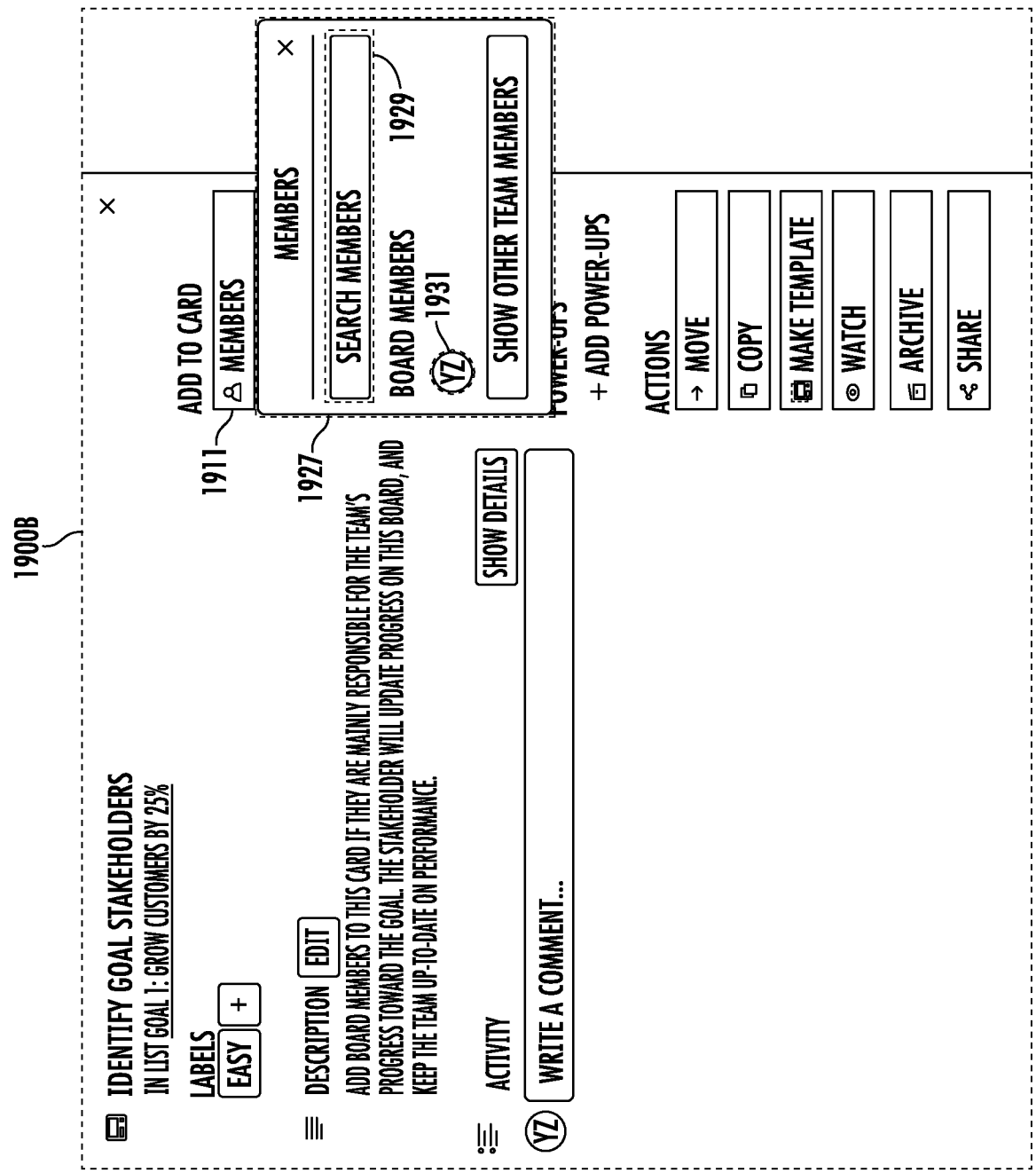
Figure 20A:
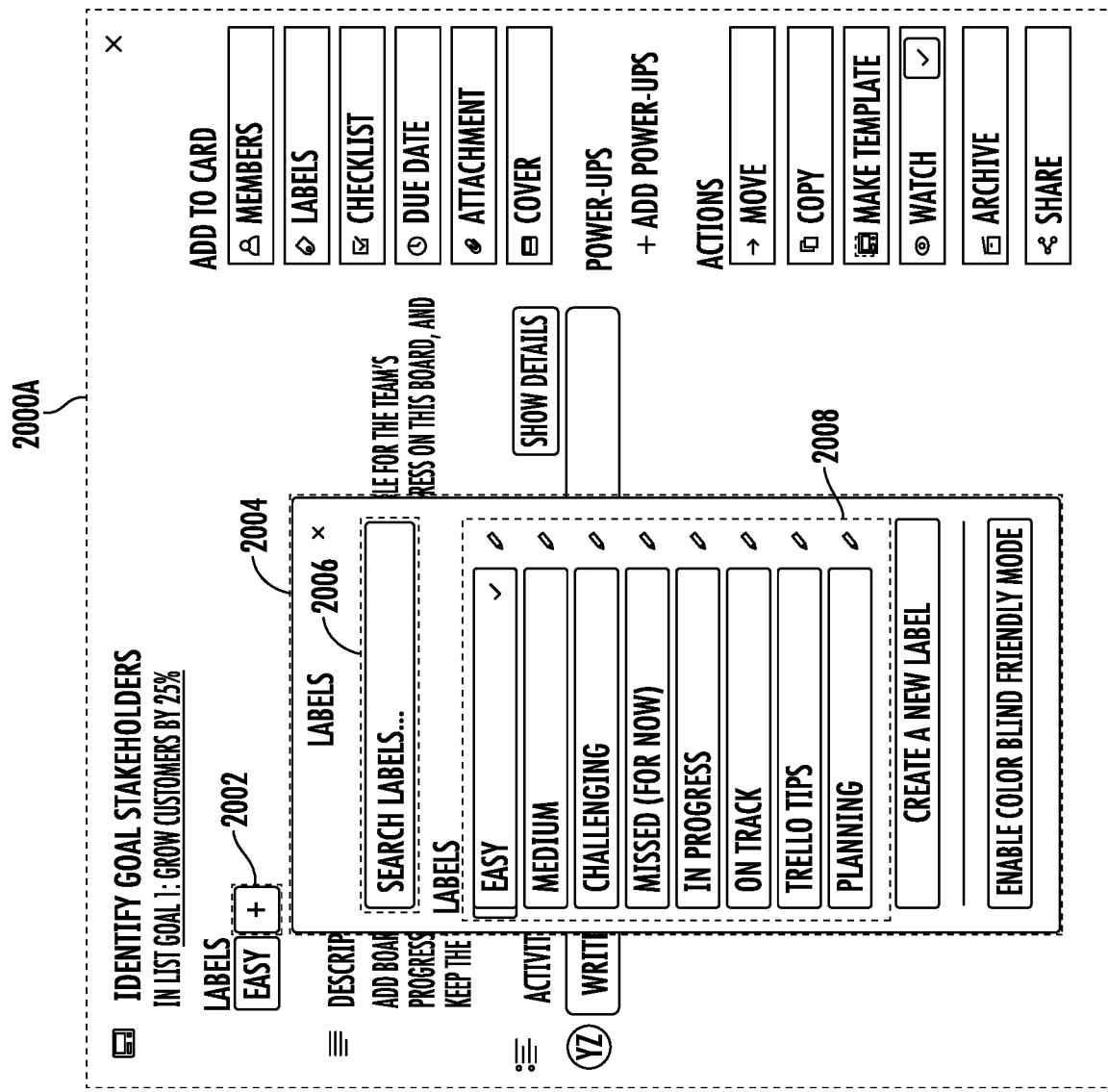
Figure 20C:
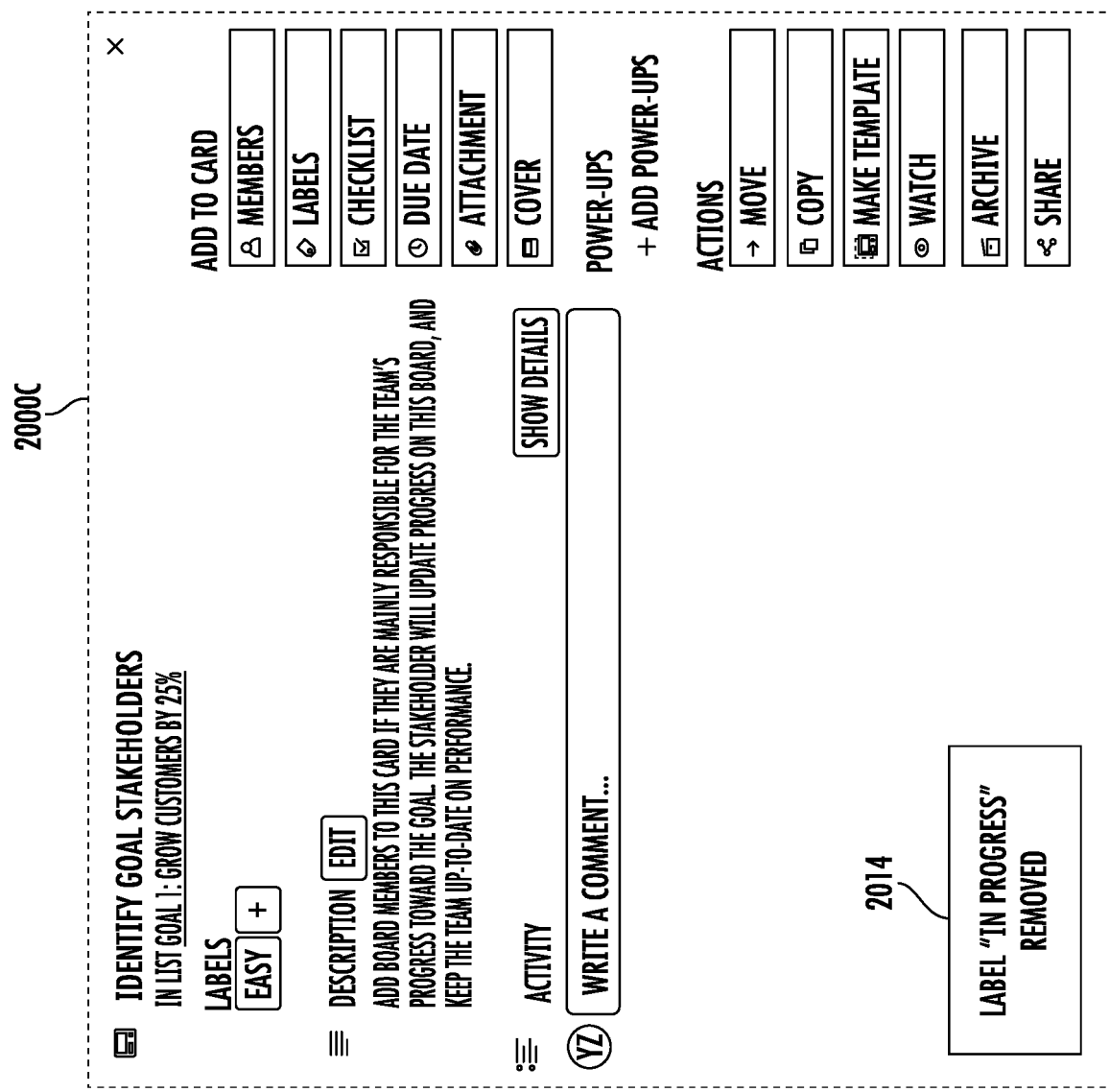
Figure 21:
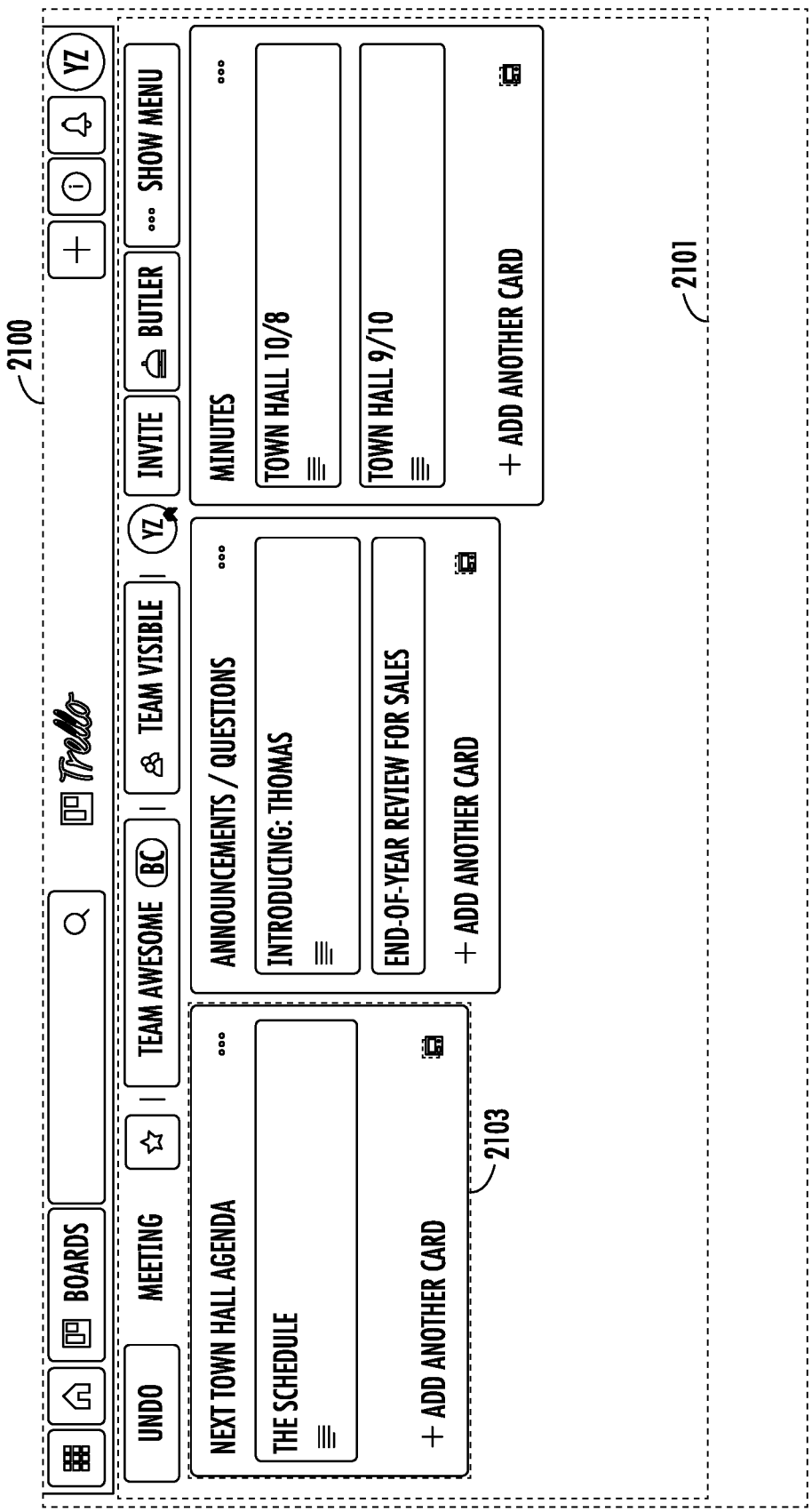
Figure 22:
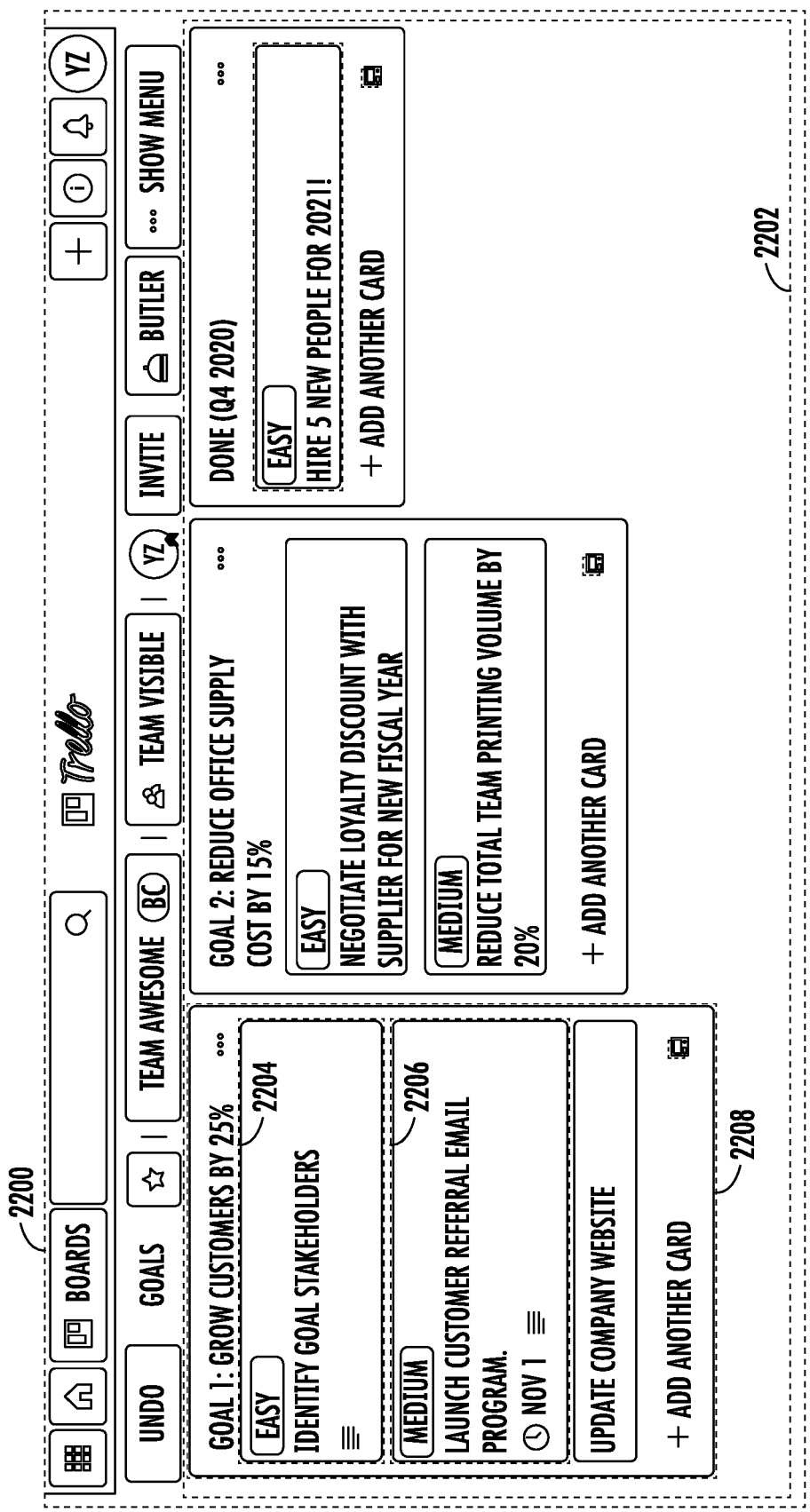
Figure 23B:
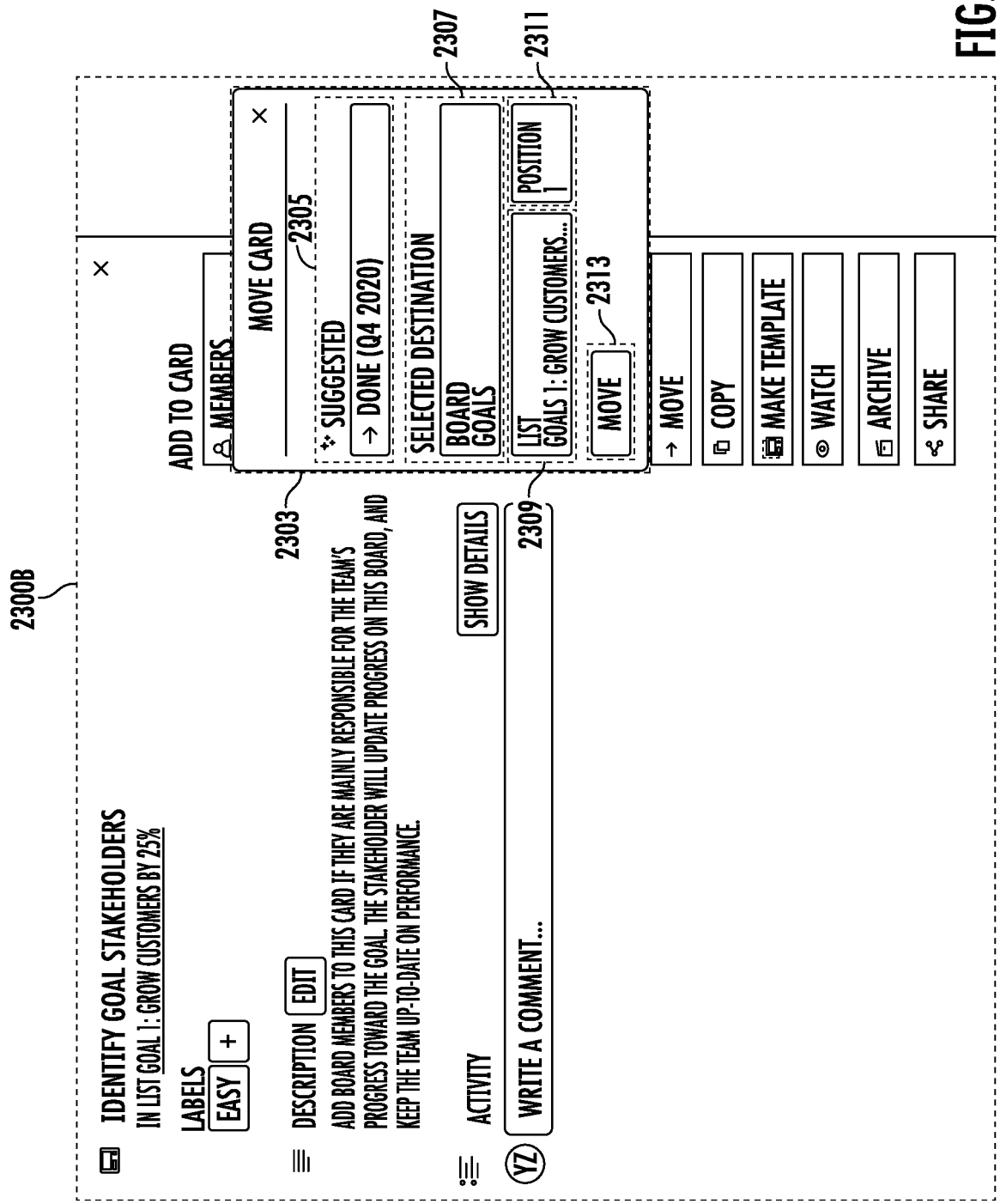
Figure 23C:
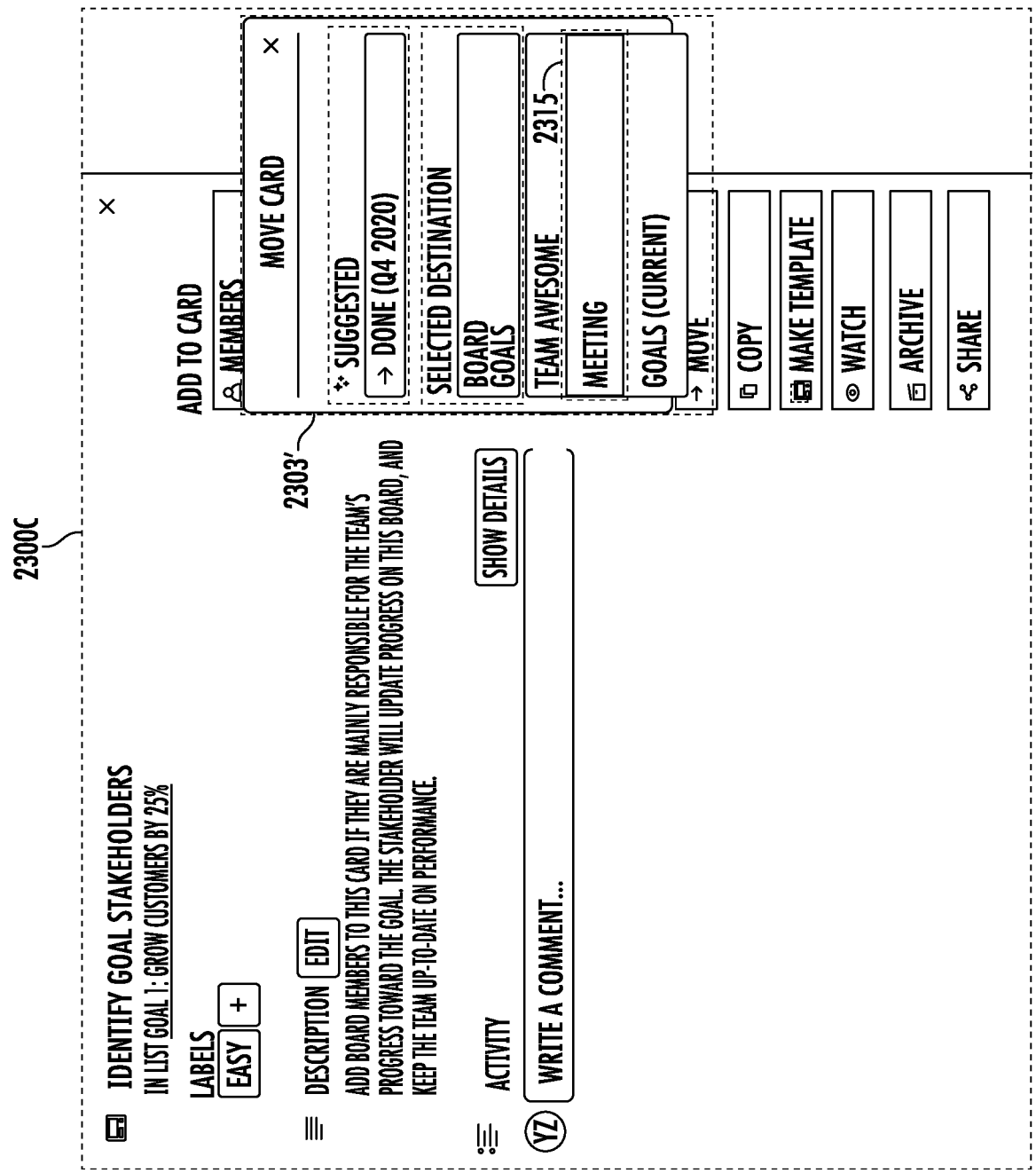
Figure 24:
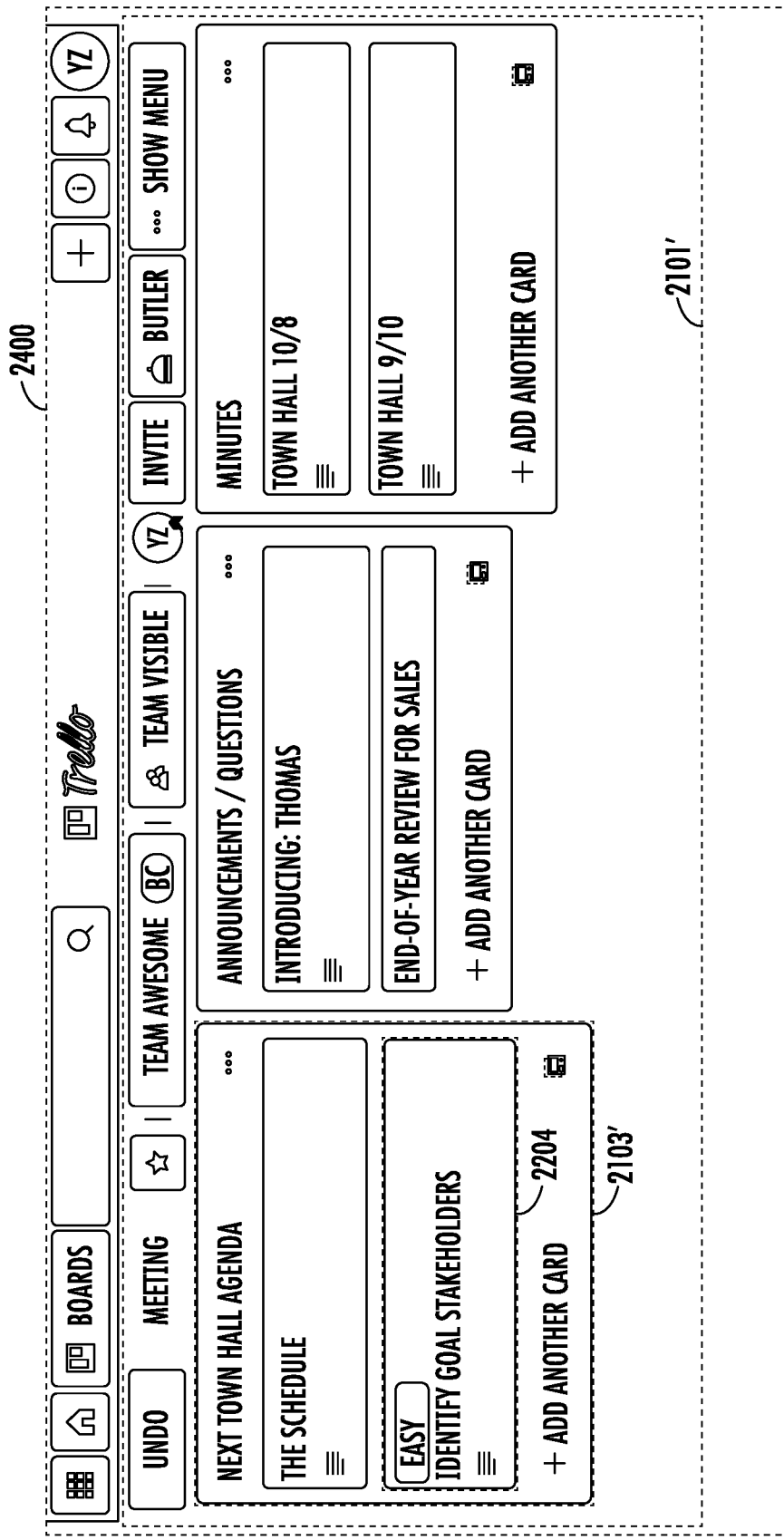
Figure 25:
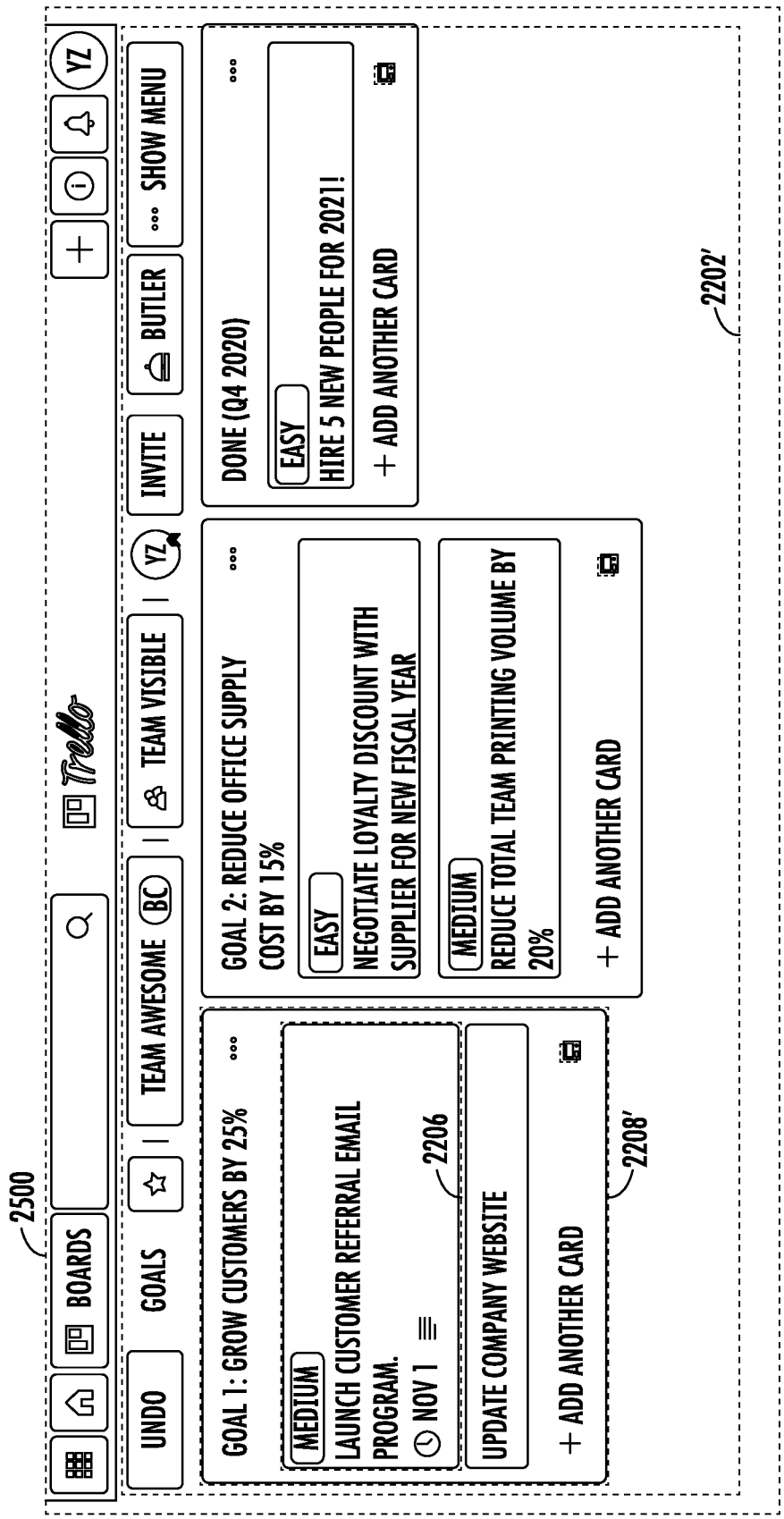
Figure 27:
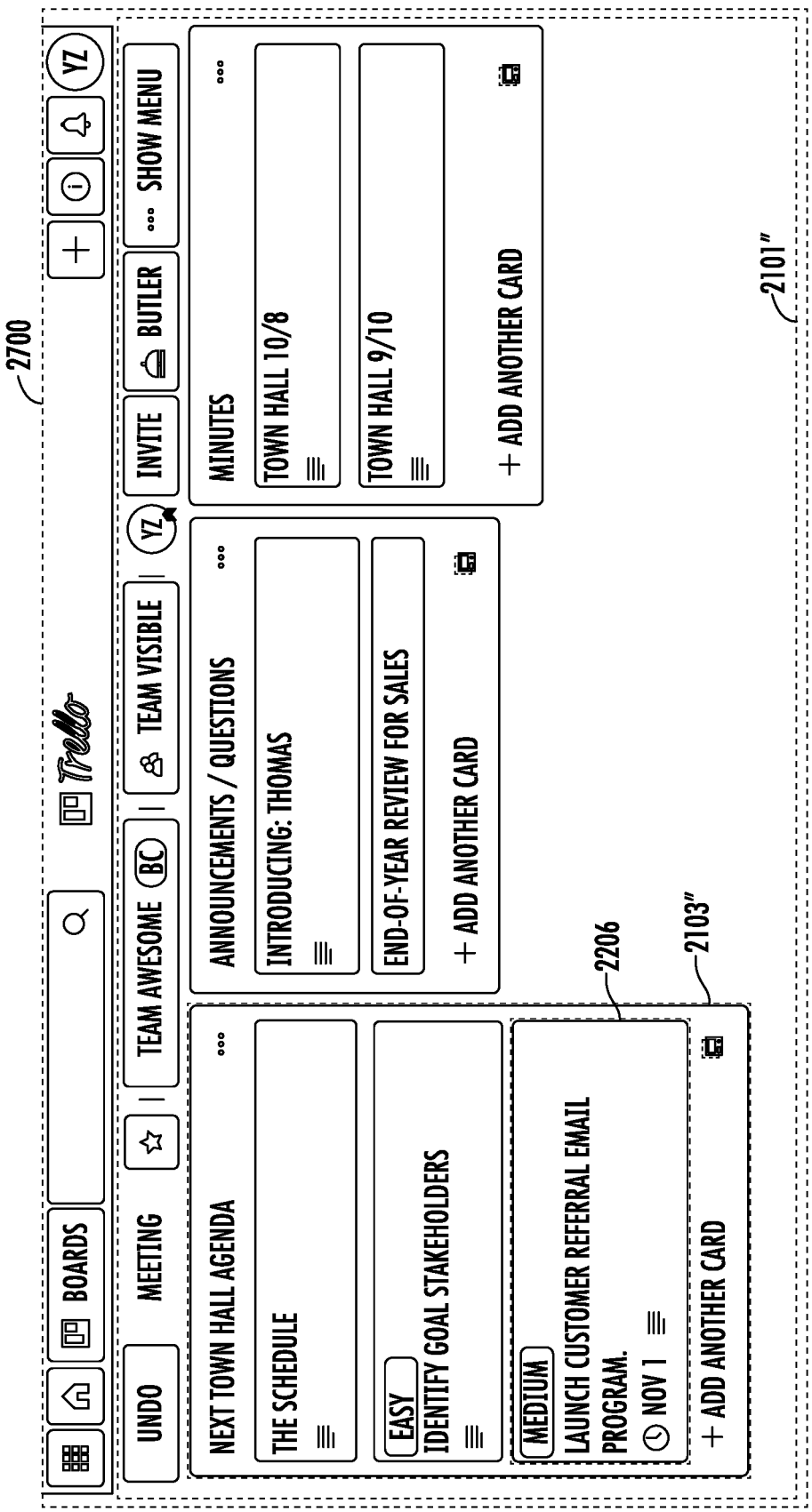

Having thus described some embodiments in general terms, references will now be made to the accompanying drawings, which are not necessarily drawn to scale, and wherein:

FIG. 1 is an example system architecture diagram illustrating an example data object server in communication with other devices (such as client devices) in accordance with some embodiments of the present disclosure;

FIG. 2 is an example infrastructure diagram illustrating an example computing device (for example, an example data object server) in accordance with some embodiments of the present disclosure;

FIG. 3 is an example infrastructure diagram illustrating an example computing device (for example, an example client device) in accordance with some embodiments of the present disclosure;

FIG. 4A and FIG. 4B are example flowcharts illustrating an example method for generating a card action data object and responding to a reversal card action input in accordance with some embodiments of the present disclosure;

FIG. 5 is an example flowchart illustrating an example method for generating a card action data object in accordance with some embodiments of the present disclosure;

FIG. 6 is an example flowchart illustrating an example method associated with determining whether a card action data object is recordable in accordance with some embodiments of the present disclosure;

FIG. 7 is an example diagram illustrating an example card action history registry in accordance with some embodiments of the present disclosure;

FIG. 8 is an example flowchart illustrating an example method associated with determining whether a card action data object is reversible in accordance with some embodiments of the present disclosure;

FIG. 9 is an example flowchart illustrating an example method associated with determining whether a card action data object is reversible in accordance with some embodiments of the present disclosure;

FIG. 10 is an example flowchart illustrating an example method associated with determining whether a card action data object is reversible in accordance with some embodiments of the present disclosure;

FIG. 11 is an example diagram illustrating an example card action history registry in accordance with some embodiments of the present disclosure; and FIG. 12 is an example diagram illustrating an example card action history registry and an example reversed card action history registry in accordance with some embodiments of the present disclosure;

FIG. 13 is an example diagram illustrating an example reversible card action registry in accordance with some embodiments of the present disclosure;

FIG. 14 is an example flowchart illustrating an example method associated with responding to a reinstate card action input in accordance with some embodiments of the present disclosure;

FIG. 15A is an example diagram illustrating an example card action history registry and an example reversed card action history registry in accordance with some embodiments of the present disclosure;

FIG. 15B is an example diagram illustrating an example card action history registry and an example reversed card action history registry in accordance with some embodiments of the present disclosure;

FIG. 16 is an example flowchart illustrating an example method associated with responding to a replicate card action input in accordance with some embodiments of the present disclosure;

FIG. 17 is an example flowchart illustrating an example method associated with generating a card action template data object in accordance with some embodiments of the present disclosure;

FIG. 18A illustrates an example card data object rendering interface comprising card data object renderings, list data object renderings, and a board data object rendering in accordance with some embodiments of the present disclosure;

FIG. 18B illustrates an example card data object rendering interface showing an example card action input in accordance with some embodiments of the present disclosure;

FIG. 18C illustrates an example card data object rendering interface showing an example undo button in accordance with some embodiments of the present disclosure;

FIG. 18D illustrates an example card data object rendering interface showing an example notification message in accordance with some embodiments of the present disclosure;

FIG. 19A illustrates an example card data object rendering interface showing an example card data object back rendering in accordance with some embodiments of the present disclosure;

FIG. 19B illustrates an example card data object rendering interface showing an example card action input in accordance with some embodiments of the present disclosure;

FIG. 19C illustrates an example card data object rendering interface showing an example card data object back rendering in accordance with some embodiments of the present disclosure;

FIG. 19D illustrates an example card data object rendering interface showing an example notification message in accordance with some embodiments of the present disclosure;

FIG. 20A illustrates an example card data object rendering interface showing an example card action input in accordance with some embodiments of the present disclosure;

FIG. 20B illustrates an example card data object rendering interface showing an example card data object back rendering in accordance with some embodiments of the present disclosure;

FIG. 20C illustrates an example card data object rendering interface showing an example notification message in accordance with some embodiments of the present disclosure;

FIG. 21 illustrates an example card data object rendering interface comprising card data object renderings, list data object renderings, and a board data object rendering in accordance with some embodiments of the present disclosure;

FIG. 22 illustrates an example card data object rendering interface comprising card data object renderings, list data object renderings, and a board data object rendering in accordance with some embodiments of the present disclosure;

FIG. 23A illustrates an example card data object rendering interface showing an example card data object back rendering in accordance with some embodiments of the present disclosure;

FIG. 23B illustrates an example card data object rendering interface showing an example card action input in accordance with some embodiments of the present disclosure;

FIG. 23C illustrates an example card data object rendering interface showing an example card action input in accordance with some embodiments of the present disclosure;

FIG. 24 illustrates an example card data object rendering interface comprising card data object renderings, list data object renderings, and a board data object rendering in accordance with some embodiments of the present disclosure;

FIG. 25 illustrates an example card data object rendering interface comprising card data object renderings, list data object renderings, and a board data object rendering in accordance with some embodiments of the present disclosure;

FIG. 26 illustrates an example card data object rendering interface showing an example card data object back rendering in accordance with some embodiments of the present disclosure; and FIG. 27 illustrates an example card data object rendering interface comprising card data object renderings, list data object renderings, and a board data object rendering in accordance with some embodiments of the present disclosure.

DETAILED DESCRIPTION OF VARIOUS EMBODIMENTS

Various embodiments of the present disclosure are described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

The term "comprising" means "including but not limited to," and should be interpreted in the manner it is typically used in the patent context. Use of broader terms such as "comprises," "includes," and "having" should be understood to provide support for narrower terms such as "consisting of," "consisting essentially of," and "comprised substantially of."

The phrases "in one embodiment," "according to one embodiment," "in some examples," "for example," and the like generally mean that the particular feature, structure, or characteristic following the phrase may be included in an embodiment of the present disclosure, and may be included in more than one embodiment of the present disclosure (importantly, such phrases do not necessarily refer to the same embodiment).

Overview

Various embodiments of the present disclosure relate generally to updating a card data object rendering interface based on card action inputs, reversal card action inputs, reinstate card action inputs, and replicate card action inputs. More specifically, various embodiments of the present disclosure are related to defining and generating various data objects (such as, but not limited to, card action data objects) that may monitor, track, and/or support user interactions with card-based collaborative workflow management systems, generating card data object rendering interfaces, and/ or enable users to control/customize software operations in the data card-based collaborative workflow management systems.

A card-based collaborative workflow management system is a type of data object computing system that allows a user to view, edit, and/or interact with data objects by providing a sequence of user inputs to a client device that is in electronic communication with the card-based collaborative workflow management systems. In some embodiments, the sequence of user inputs may describe, define, and/or represent one or more desired characteristics or outcomes associated with one or more data objects. In response to receiving the sequence of user inputs, the client device may determine and execute a sequence of software operations based on the sequence of user inputs. The sequence of software operations may access, modify and/or update one or more aspects of data object(s) (for example, metadata associated with the data object(s)), so that the desired characteristics or outcomes associated with the data objects are achieved through execution of the sequence of software operations.

In particular, the card-based collaborative workflow management system may comprise card data objects that may represent, for example, tasks associated with a team or group of people. Each of the card data objects may be associated with a list data object, which may represent, for example, a list of tasks associated with the team or group of people. As such, the card-based collaborative workflow management system may allow a group of people to manage various tasks based at least in part on generating one or more card data objects, list data objects, and/or board data objects, and generating card data object renderings, list data object renderings, and/or board data object renderings that are displayed on client devices associated with the group of people. Additional definitions and details of card data object and list data object are described herein.

As an example, a team of salespeople may implement the team collaboration software to track various tasks associated with sales. For example, the team may create a card data object for the task "identify goal stakeholders," and may associate this card data object with the list data object "Goal 1: Grow Customers By 25%." In this example, the "identify goal stakeholders" task is on the "Goal 1: Grow Customers By 25%" list.

However, many systems lack capability in monitoring, tracking, and/or supporting a sequence of user inputs, which creates bottlenecks in interaction and interfaces between the user and the card-based collaborative workflow management system. For example, the lack of customization and/or control by users to revert one or more user inputs (and the lack of opportunity for the system to accommodate user's request to revert these inputs) may create considerable technical difficulties, particularly in complex and highly customized card-based collaborative workflow management systems.

Continuing from the above example, the team may provide user inputs to update the description associated with the card data object "identify goal stakeholders" to include data/information related to the goal stakeholders. Subsequently, a member from the team may inadvertently delete the data/information related to the goal stakeholders from the description. In systems that do not implement embodiments of the present disclosure, the data/information deleted from the description is not recoverable, and such systems fail to provide sufficient data integrity and reliability for data objects stored.

In addition, unnecessary computing resource consumption (for example, an increase in processor workload and storage space) and processing latency may occur when examples of the present disclosure are not implemented. Continuing from the above example, when a task is completed, the team may want to move the task to a "completed" list by associating the corresponding card data object to a corresponding list date object. When hundreds of tasks are completed, many systems require the processor to individually process the associations between each card data object and the list data object for "completed" list, increasing computing resource consumption and processing latency.

Example embodiments of the present disclosure may overcome the above-referenced technical challenges while providing various technical benefits.

For example, various embodiments of the present disclosure may monitor, track, and/or support a sequence of user inputs by creating card action data objects and utilizing client-side storage (for example, a storage cache of a web browser). The ability to monitor, track, and/or support arbitrary user actions with metadata based on such data objects that are generated and/or stored in the client-side storage may eliminate the need to provision or segment more storage space in any database models in the server-side, and may reduce computing resource needed for monitoring, tracking, and/or supporting sequence of user inputs. For example, the server-side storage may utilize a card or board data object based database storage model, which may not be configured to store multiple iterations of actions of a given card data object. In contrast, the client-side storage provides more flexibility in storing data objects (for example, card action data object) for monitoring, tracking, and/or supporting a sequence of user inputs. Additionally, client-side storage enables tracking user actions without compromising Personally Identifiable Information (PII) as data/information that may contain PII (for example, metadata) are stored locally and may not be transmitted to the server, thereby enhancing the security and privacy of sensitive user information.

As another example, example embodiments of the present disclosure may provide the technical advantages of enabling users to revert one or more user inputs, and/or to replicate user inputs on multiple data objects, and/or dynamically computing action effects associated with data objects. For example, if a user undoes an action, example embodiments of the present disclosure may remove the card action data object from the card action history registry, and may allow the user to queue the next undo action without waiting for a response from the server side, and may allow repeated key inputs without having to throttle or delay the next user input. As shown in this example, the processing latency is reduced.

As another example, example embodiments of the present disclosure may provide technical advantages of dynamically rendering action effects on the user interfaces. For example, when a user undoes a move card action, the client device may render the movement of the card data object rendering to the previous location before the back end (for example, the server) completely executes the undo action, so as to provide a dynamically updated user interface on the client device.

As another example, example embodiments of the present disclosure may provide technical advantages of easily clearing the card action history registry associated with a user after version updates and/or failure cases of the computer program. For example, after an update is applied to the computer program, a user may prefer to undo only card actions that took place after the update is executed. Example embodiments of the present disclosure may remove previous card action data object indications from the card action history registry subsequent to the update being executed. Similarly, example embodiments of the present disclosure may remove previous card action data object indications from the card action history registry when the corresponding card action data object is no longer valid.

As another example, example embodiments of the present disclosure may provide technical advantages of proactively prompting a user if an erroneous undo action is received. For example, example embodiments of the present disclosure may tie undo actions, redo actions, and/or repeat actions to a current session associated with the user (for example, tracking view metadata associated with the undo actions, redo actions, and/or repeat actions). In some embodiments, a card action input can only be undone, redone, an/or repeated if it is executed in the same browser tab or instance (for example, persist their actions to a local session storage).

As such, various embodiments of the present disclosure may precisely record user actions and execute the equal or opposite actions for a given action based on the user input. The card action history registry may provide insight into user workflows and may programmatically suggest actions or workflow improvements based on the actions they take (for example, template, undo actions, and/or the like). The card action history registry may provide insights to ensure that the user is in a valid viewport to undo, redo, or repeat a given action through calculating various contextual arguments (for example, view metadata). Systems structured in accordance with various embodiments of the present disclosure may provide sufficient data integrity and reliability for card data objects, list data objects and board data objects, may reduce computing resource consumption and processing latency, and may provide specific, technical solutions to technical problems faced by many systems, details of which are described hereinafter.

Definitions

As used herein, the terms "data," "content," "digital content," "digital content object," "information," and similar terms may be used interchangeably to refer to data capable of being transmitted, received, and/or stored in accordance with examples of the present disclosure. Thus, use of any such terms should not be taken to limit the spirit and scope of examples of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like (sometimes referred to herein as a "network"). Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

In the present disclosure, the term "circuitry" should be understood broadly to include hardware and, in some examples, software for configuring the hardware. With respect to components of the apparatus, the term "circuitry" as used herein should therefore be understood to include particular hardware configured to perform the functions associated with the particular circuitry as described herein. For example, in some examples, "circuitry" may include processing circuitry, storage media, network interfaces, input/output devices, and the like.

In the present disclosure, the term "set" or "subset" refers to a collection of zero or more elements.

In the present disclosure, the term "data object" refers to a data structure that represents one or more functionalities and/or characteristics associated with data and/or information. In some embodiments, a data object may be associated with one or more software (for example, one or more computer programs) and/or one or more hardware (for example, one or more servers and/or one or more client devices). For example, a data object may provide a functional unit for one or more computer programs. In some embodiments, data items in an example data object may include metadata. The term "metadata" refers to a parameter, a data field, a data element, or the like that describes an attribute of a data object.

A user, while operating a client device, may provide user input (also referred to as "input" herein) associated with one or more data objects, and the input may comprise an electronic selection of a data object, an electronic request to modify, manipulate, and/or change a data object, an electronic request to generate a data object, an electronic request to delete a data object, and/or the like.

For example, a "card data object" refers to a type of data object that represents an organized set of data/information associated with one computer program. Such a computer program may include, but not limited to, computer program(s) associated with a card-based collaborative workflow management system. In this example, a card data object may represent, for example but not limited to, one or more to-do items (for example, things to buy at a store), items on a meeting agenda, customer support issues, sales leads, among many other possibilities.

In some embodiments, the card data object defines protocol(s) and/or structure(s) for representing the organized set of data/information. For example, an example card data object may comprise metadata such as, but not limited to, card identifier metadata, card title metadata, card user metadata, card label metadata, card checklist metadata, card due date metadata, card attachment metadata, card cover metadata, card description metadata, card activity metadata, card status metadata, list association metadata, and/or board association metadata. In some embodiments, these metadata are organized and/or stored based on the protocol(s) and/or structure(s) of the card data object.

In some embodiments, a card data object may comprise card identifier metadata. In some embodiments, card identifier metadata may comprise a card identifier that uniquely identifies data/information that is related to the card data object from other data/information stored in a computing system. In some embodiments, the card identifier metadata may be in the form of text string(s), numerical character(s), alphabetical character(s), alphanumeric code(s), ASCII character(s), and/or the like. As an example, the card identifier metadata may be in the form of a numerical character string such as "123456."

In some embodiments, a card data object may comprise card title metadata. In some embodiments, the card title metadata represents data and/or information associated with a name of card data object. In some embodiments, the card title metadata may be in the form of text string(s), numerical character(s), alphabetical character(s), alphanumeric code(s), ASCII character(s), and/or the like. As an example, the card title metadata may be in the form of an alphabetical character string such as "Identify Goal Stakeholders."

In some embodiments, a card data object may comprise card user metadata. In some embodiments, the card user metadata may comprise one or more user identifiers (as defined herein) that may be associated with the card data object. For example, each of the user identifiers may correspond to a user that may view, edit, and/or manage the card data object. In some embodiments, the card user metadata may be in the form of text string(s), numerical character(s), alphabetical character(s), alphanumeric code(s), ASCII character(s), and/or the like. As an example, the card user metadata may be in the form of an alphabetical character string such as "YZ" that identifies a user associated with the card data object.

In some embodiments, a card data object may comprise card label metadata. In some embodiments, the card label metadata may comprise data/information representing one or more categories, groups, and/or classification (for example, one or more label identifiers) associated with the card data object. In some embodiments, the card label metadata may be in the form of text string(s), numerical character(s), alphabetical character(s), alphanumeric code(s), ASCII character(s), and/or the like. As an example, the card label metadata may be in the form of an alphabetical character string such as "Easy" representing that the corresponding card data object is associated with an easy category.

In some embodiments, a card data object may comprise card checklist metadata. In some embodiments, the card checklist metadata may comprise data/information representing one or more items of information that are arranged in the form of a list (for example, a checklist). For example, the card checklist metadata may indicate one or more to-do items associated with card data object (for example, one or more to-do items associated with the task(s) that the card data object represents). In some embodiments, the card checklist metadata may be in the form of text string(s), numerical character(s), alphabetical character(s), alphanumeric code(s), ASCII character(s), and/or the like. As an example, the card checklist metadata may be in the form of a character string that comprises numerical characters and alphabetical characters such as "1. Identify names, 2. Reach out to people."

In some embodiments, a card data object may comprise card due date metadata. In some embodiments, the card due date metadata may represent a date and/or time associated with the card data object. For example, the card due date metadata may indicate a due date associated with the card data object (for example, a due date for completing the task(s) that the card data object represents). In some embodiments, the card due date metadata may be in the form of text string(s), numerical character(s), alphabetical character(s), alphanumeric code(s), ASCII character(s), and/or the like. As an example, the card due date metadata may be "11/01/2020."

In some embodiments, a card data object may comprise card attachment metadata. In some embodiments, the card attachment metadata may represent one or more computer files (such as, but not limited to, text documents, image documents, video documents, computer programs) that are associated with the card data object. As an example, the card attachment metadata may comprise one or more text files related to the card data object.

In some embodiments, a card data object may comprise card cover metadata. In some embodiments, the card cover metadata may represent one or more image files associated with the card data object. For example, when the card data object is rendered for display on a card data object rendering interface as a card data object rendering, the one or more image files associated with the card data object may be rendered on a front portion of the card data object rendering and/or on a header portion of the card data object back rendering.

In some embodiments, a card data object may comprise card description metadata. In some embodiments, the card description metadata may comprise data/information representing a description, a narrative, and/or the like of the card data object. For example, the card description metadata may describe a context associated with the card data object. In some embodiments, the card description metadata may be in the form of text string(s), numerical character(s), alphabetical character(s), alphanumeric code(s), ASCII character(s), and/or the like. As an example, the card description metadata may be in the form of a text string that provides "Add board members to this card if they are mainly responsible for the team's progress toward the goal."

In some embodiments, a card data object may comprise card activity metadata. In some embodiments, the card activity metadata records and/or documents one or more activities associated with the card data object. For example, the card activity metadata may represent one or more notes or comments associated with card data object (for example, one or more notes and/or comments provided by users associated with the card data object). In some embodiments, the card activity metadata may be in the form of text string(s), numerical character(s), alphabetical character(s), alphanumeric code(s), ASCII character(s), and/or the like.

In some embodiments, a card data object may comprise card status metadata. In some embodiments, the card status metadata may comprise data/information representing a status of the card data object (for example, active, archive, closed, deleted). In some embodiments, the card status metadata may be in the form of text string(s), numerical character(s), alphabetical character(s), alphanumeric code(s), ASCII character(s), and/or the like. As an example, the card status metadata may indicate that the corresponding card data object is active. As another example, the card status metadata may indicate that the corresponding card data object is archived.

While the description above provides some examples of metadata associated with an example card data object, it is noted that the scope of the present disclosure is not limited to the description above. For example, additionally, or alternatively, a card data object may comprise other types of metadata, such as, but not limited to, list association metadata and board association metadata, details of which are described herein.

In some embodiments, a card data object may comprise a card custom field metadata. In some embodiments, the card custom field metadata may comprise a data field associated with a card data object that is customized and/or defined by a user instead of defined by the server. In some embodiments, the card custom field metadata may be in the form of text string(s), numerical character(s), alphabetical character(s), alphanumeric code(s), ASCII character(s), and/or the like. As an example, the card custom field metadata may indicate a user defined field for inputting data representing a location.

In some embodiments, a card data object may comprise a card interaction metadata. In some embodiments, the card interaction metadata may comprise data/information representing certain user interactions associated with the card data object (for example, votes on the card data object, comments on the data object, watched status of the card data object (e.g. whether the user is notified of changes associated with the card data object). In some embodiments, card interaction metadata may be in the form of text string(s), numerical character(s), alphabetical character(s), alphanumeric code(s), ASCII character(s), and/or the like.

In some embodiments, one or more card data objects may be associated with a list data object. In the present disclosure, the term "list data object" refers to a type of data object that represents an organized set of card data objects. In some embodiments, a user may provide user input to associate and/or "assign" one or more card data objects to a list data object. For example, in a card data object rendering interface that comprises a card data object rendering (of a card data object) and one or more list data object renderings (of one or more list data objects), the user may drag and drop the card data object rendering on top of one of the list data object renderings to assign the corresponding card data object to the corresponding list data object, details of which are provided herein.

As an example, a user may provide card action inputs to associate one or more card data objects that represent to-do items with a list data object that represents a to-do list. Additionally, or alternatively, a user may provide card action inputs to associate one or more card data objects that represent ongoing tasks with a list data object that represents tasks that are in progress. Additionally, or alternatively, a user may provide card action inputs to associate one or more card data objects that represent finished tasks with a list data object that represents completed tasks.

As shown in the examples above, the list data object may organize card data objects based on their stages of progress. In some embodiments, list data objects may be used to create a workflow, where card data objects are associated with different list data objects based on their different stages in the workflow (for example, from start to finish).

In some embodiments, a list data object may comprise list identifier metadata. In some embodiments, list identifier metadata may comprise a list identifier that uniquely identifies data/information related to the list data object from other data/information stored in the data object computing environment. In some embodiments, the list identifier metadata may be in the form of text string(s), numerical character(s), alphabetical character(s), alphanumeric code(s), ASCII character(s), and/or the like.

In some embodiments, based on the association between a card data object and one or more list data objects, the card data object may comprise list association metadata. In some embodiments, the list association metadata may comprise list identifiers of one or more list data objects that the card data object is associated with. In some embodiments, the list association metadata may be in the form of text string(s), numerical character(s), alphabetical character(s), alphanumeric code(s), ASCII character(s), and/or the like.

In some embodiments, a list data object may comprise list member metadata. In some embodiments, the list member metadata may comprise one or more user identifiers (as defined herein) that may be associated with the list data object. For example, each of the user identifiers may correspond to a user that may view and/or edit the list data object. In some embodiments, the list member metadata may be in the form of text string(s), numerical character(s), alphabetical character(s), alphanumeric code(s), ASCII character(s), and/or the like.

While the description above provides some examples of metadata associated with an example list data object, it is noted that the scope of the present disclosure is not limited to the description above. For example, additionally, or alternatively, a list data object may comprise other types of metadata.

In some embodiments, a list data object may comprise a list name metadata that comprises data/information associated with a name of the list data object. In some embodiments, the list name metadata may be in the form of text string(s), numerical character(s), alphabetical character(s), alphanumeric code(s), ASCII character(s), and/or the like.

In some embodiments, a list data object may comprise a list position metadata that comprises data/information indicating a position of the list data object among other list data object(s) that are associated with a board data object (as defined further herein). In some embodiments, the list position metadata may be in the form of text string(s), numerical character(s), alphabetical character(s), alphanumeric code(s), ASCII character(s), and/or the like.

In some embodiments, a list data object may comprise a board association metadata that comprises data/information indicating a board data object (as defined herein) that is associated with the list data object. In some embodiments, the board association metadata may be in the form of text string(s), numerical character(s), alphabetical character(s), alphanumeric code(s), ASCII character(s), and/or the like.

In some embodiments, a list data object may comprise a list status metadata that comprises data/information indicating a status of the list data object (for example, archived, active, and/or the like). In some embodiments, the list status metadata may be in the form of text string(s), numerical character(s), alphabetical character(s), alphanumeric code(s), ASCII character(s), and/or the like.

In some embodiments, a list data object may comprise a list watched status metadata that comprises data/information indicating whether a user is notified for changes on the list data object. In some embodiments, the list watched status metadata may be in the form of text string(s), numerical character(s), alphabetical character(s), alphanumeric code(s), ASCII character(s), and/or the like.

In some embodiments, one or more list data objects may be associated with a board data object. In the present disclosure, the term "board data object" refers to a type of data object that represents an organized set of list data objects and/or card data objects. For example, a board data object may correspond to a project, and each list data object and/or each card data objects that is associated with the board data object may represent a subset of tasks associated with the project. For example, in a card data object rendering interface that comprises a card data object rendering (of a card data object) and a board data object rendering (of a board data object), the user may drag and drop the card data object rendering on top of the board data object rendering to assign the corresponding card data object to the corresponding board data object, details of which are provided herein.

In some embodiments, a board data object may comprise board identifier metadata. In some embodiments, board identifier metadata may comprise a board identifier that uniquely identifies data/information that is related to the board data object from other data/information stored in the data object computing environment. In some embodiments, the board identifier metadata may be in the form of text string(s), numerical character(s), alphabetical character(s), alphanumeric code(s), ASCII character(s), and/or the like.

In some embodiments, based on the association between a card data object and one or more board data objects, the card data object may comprise board association metadata. In some embodiments, the board association metadata may comprise board identifier(s) corresponding to one or more board data objects that the card data object is associated with. In some embodiments, the board association metadata may be in the form of text string(s), numerical character(s), alphabetical character(s), alphanumeric code(s), ASCII character(s), and/or the like.

In some embodiments, a board data object may comprise board member metadata. In some embodiments, the board member metadata may comprise one or more user identifiers (as defined herein) that may be associated with the board data object. For example, each of the user identifiers may correspond to a user that may view and/or edit the board data object. In some embodiments, the board member metadata may be in the form of text string(s), numerical character(s), alphabetical character(s), alphanumeric code(s), ASCII character(s), and/or the like.

While the description above provides some examples of metadata associated with an example board data object, it is noted that the scope of the present disclosure is not limited to the description above. For example, additionally, or alternatively, a board data object may comprise other types of metadata.

In some embodiments, a board data object may comprise a board name metadata that comprises data/information indicating a name of the board data object. In some embodiments, the board name metadata may be in the form of text string(s), numerical character(s), alphabetical character(s), alphanumeric code(s), ASCII character(s), and/or the like.

In some embodiments, a board data object may comprise a board description metadata that comprises data/information indicating a description associated with the board data object. In some embodiments, the board description metadata may be in the form of text string(s), numerical character(s), alphabetical character(s), alphanumeric code(s), ASCII character(s), and/or the like.

In some embodiments, a board data object may comprise a board permission metadata that comprises data/information indicating users or members who are authorized or permitted to view, access, or edit the board data object. In some embodiments, the board permission may be in the form of text string(s), numerical character(s), alphabetical character(s), alphanumeric code(s), ASCII character(s), and/or the like.

In some embodiments, a board data object may comprise a board label metadata that comprises data/information indicating one or more labels associated with the board data object. In some embodiments, the board label metadata may be in the form of text string(s), numerical character(s), alphabetical character(s), alphanumeric code(s), ASCII character(s), and/or the like.

In some embodiments, a board data object may comprise a board background metadata that comprises data/information indicating a background associated with the board data object (for example, a background image for a board data object rendering). In some embodiments, the board background metadata may be in the form of text string(s), numerical character(s), alphabetical character(s), alphanumeric code(s), ASCII character(s), and/or the like.

In some embodiments, a board data object may comprise a board custom field metadata that comprises data/information indicating user customized and/or defined data field (such as power-ups that pull information and data from outside services). In some embodiments, the board custom field metadata may be in the form of text string(s), numerical character(s), alphabetical character(s), alphanumeric code(s), ASCII character(s), and/or the like.

In some embodiments, a board data object may comprise a board sticker metadata that comprises data/information indicating a user sticker (for example, an image file) associated with the board data object (for example, the image file may be rendered on top of the board data object rendering). In some embodiments, the board sticker metadata may be in the form of text string(s), numerical character(s), alphabetical character(s), alphanumeric code(s), ASCII character(s), and/or the like.

In some embodiments, a board data object may comprise a board status metadata that comprises data/information indicating the status of a board data object (for example, archived, active, and/or the like). In some embodiments, the board status metadata may be in the form of text string(s), numerical character(s), alphabetical character(s), alphanumeric code(s), ASCII character(s), and/or the like.

In some embodiments, a board data object may comprise a board automation metadata that comprises data/information indicating whether automated actions on a board data object. In some embodiments, the board automation metadata may be in the form of text string(s), numerical character(s), alphabetical character(s), alphanumeric code(s), ASCII character(s), and/or the like.

In some embodiments, a board data object may comprise an organization association metadata that comprises data/information indicating a team and/or an organization associated with the board data object. In some embodiments, the organization association metadata may be in the form of text string(s), numerical character(s), alphabetical character(s), alphanumeric code(s), ASCII character(s), and/or the like.

In some embodiments, a board data object may comprise a starred status metadata that comprises data/information indicating whether a board data object has been starred (for example, whether the board data object is prioritized by a user). In some embodiments, the starred status metadata may be in the form of text string(s), numerical character(s), alphabetical character(s), alphanumeric code(s), ASCII character(s), and/or the like.

In various embodiments of the present disclosure, the card data object, the list data object, and/or the board data object may be rendered for display on a card data object rendering interface. For example, the card data object, the list data object, and/or the board data object may be rendered on a display of a client device, and a user may provide one or more user inputs associated with these data objects. For example, a user operating a client device may provide user inputs associated with a card data object, a list data object, a board data object, and/or the like.

In some embodiments, the term "card action input" refers to user input(s) and/or software operation(s) related to one or more data objects, including, but not limited to, card data object(s). For example, a user may provide one or more card action inputs via operating a client device. In some embodiments, the input(s) and/or software operation(s) may describe, define, and/or indicate one or more modifications or changes of metadata associated with a card data object, details of which are described herein.

In some embodiments, a card action data object may be generated based on the card action input(s). In the present disclosure, the term "card action data object" refers to a type of data object that comprises data/information associated with a card action input, for example, but not limited to, data/information representing, defining, and/or indicating changes to the card data object that is caused or triggered by the card action input.

For example, a card action data object may be generated to document and/or record a user associating a card data object with a list data object. Additionally, or alternatively, a card action data object may be generated to document and/or record a user updating the card user metadata associated with a card data object. Additionally, or alternatively, a card action data object may be generated to document and/or record a user updating the card label metadata associated with the card data object. Additionally, or alternatively, a card action data object may be generated to document and/or record a user changing the card due date metadata associated with the card data object. Additionally, or alternatively, a card action data object may be generated to document and/or record a user updating the card checklist metadata associated with the card data object. Additionally, or alternatively, a card action data object may be generated to document and/or record a user editing the card activity metadata associated with the card data object, and/or the like. As shown in the examples above, card action data objects may provide a history of user inputs and/or user interactions with data objects through a client device.

In some embodiments, a card action data object may comprise metadata, including, but not limited to, card action type metadata, card action variable metadata, card action view metadata, card action identifier metadata, and card action time metadata.

In some embodiments, a card action data object may comprise card action type metadata. In some embodiments, the card action type metadata comprise data and/or information indicating a type or category of card action input and/or software operations associated with one or more card data objects, one or more list data objects, and/or one or more board data objects. In some embodiments, the card action type metadata may be in the form of text string(s), numerical character(s), alphabetical character(s), alphanumeric code(s), ASCII character(s), and/or the like.

For example, the card action type metadata may comprise data/information that indicates a join card action. In this example, a client device may receive a card action input associated with a card data object, and the card action input may comprise an electronic request to join the card data object (for example, updating the card user metadata by associating a user identifier with the card data object). As an example, a user John may operate a client device to provide card action input indicating a request to join the card data object, and the corresponding card action type metadata may comprise data/information indicating that the type of the card action input is a join card action.

Additionally, or alternatively, the card action type metadata may comprise data/information that indicates a leave card action. In this example, a client device may receive a card action input associated with a card data object, and the card action input may comprise an electronic request to leave the card data object (for example, updating the card user metadata by disassociating a user identifier from the card data object). As an example, a user John may operate a client device to provide card action input indicating a request to leave the card data object, and the card action type metadata may comprise data/information indicating that the type of the card action input is a leave card action.

Additionally, or alternatively, the card action type metadata may comprise data/information that indicates an add member to card action. In this example, a client device may receive a card action input associated with a card data object, and the card action input may comprise an electronic request to add a member to the card data object (for example, updating the card user metadata by associating a user identifier with the card data object). As an example, a user John may operate a client device to provide card action input indicating a request to add a user Adam to the card data object, and the card action type metadata may comprise data/information indicating that the type of the card action input is an add member to card action.

Additionally, or alternatively, the card action type metadata may comprise data/information that indicates a remove member from card action. In this example, a client device may receive a card action input associated with a card data object, and the card action input may comprise an electronic request to remove a member from the card data object (for example, updating the card user metadata by disassociating a user identifier from the card data object). As an example, a user John may operate a client device to provide card action input indicating a request to remove a user Adam from the card data object, and the card action type metadata may comprise data/information indicating that the type of the card action input is a remove member from card action.

Additionally, or alternatively, the card action type metadata may comprise data/information that indicates a move card action. In this example, a client device may receive a card action input associated with a card data object, and the card action input may comprise an electronic request to move the card data object (for example, updating the list association metadata and/or the board association metadata of the card data object). As an example, a user John may operate a client device to provide card action input indicating a request to move a card data object from a first list to a second list, and the card action type metadata may comprise data/information indicating that the type of the card action input is a move card action.

Additionally, or alternatively, the card action type metadata may comprise data/information that indicates an add label to card action. In this example, a client device may receive a card action input associated with a card data object, and the card action input may comprise an electronic request to add a label to the card data object (for example, updating the card label metadata of the card data object). As an example, a user John may operate a client device to provide card action input indicating a request to add a label to a card data object, and the card action type metadata may comprise data/information indicating that the type of the card action input is an add label to card action.

Additionally, or alternatively, the card action type metadata may comprise data/information that indicates a remove label from card action. In this example, a client device may receive a card action input associated with a card data object, and the card action input may comprise an electronic request to remove a label from the card data object (for example, updating the card label metadata of the card data object). As an example, a user John may operate a client device to provide card action input indicating a request to remove a label from a card data object, and the card action type metadata may comprise data/information indicating that the type of the card action input is a remove label from card action.

Additionally, or alternatively, the card action type metadata may comprise data/information that indicates an archive card action. In this example, a client device may receive a card action input associated with a card data object, and the card action input may comprise an electronic request to archive the card data object (for example, updating the card status metadata of the card data object to indicate that it is archived). As an example, a user John may operate a client device to provide card action input indicating a request to archive the card data object, and the card action type metadata may comprise data/information indicating that the type of the card action input is an archive card action.

Additionally, or alternatively, the card action type metadata may comprise data/information that indicates an unarchive card action. In this example, a client device may receive a card action input associated with a card data object, and the card action input may comprise an electronic request to unarchive the card data object (for example, updating the card status metadata of the card data object to indicate that it is not archived or active). As an example, a user John may operate a client device to provide card action input indicating a request to unarchive the card data object, and the card action type metadata may comprise data/information indicating that the type of the card action input is an unarchive card action.

Additionally, or alternatively, the card action type metadata may comprise data/information that indicates a rename card action. In this example, a client device may receive a card action input associated with a card data object, and the card action input may comprise an electronic request to update the name or title of the card data object (for example, updating the card title metadata of the card data object). As an example, a user John may operate a client device to provide card action input indicating a request to rename the card data object, and the card action type metadata may comprise data/information indicating that the type of the card action input is a rename card action.

Additionally, or alternatively, the card action type metadata may comprise data/information that indicates an update description card action. In this example, a client device may receive a card action input associated with a card data object, and the card action input may comprise an electronic request to update the description the card data object (for example, updating the card description metadata of the card data object). As an example, a user John may operate a client device to provide card action input indicating a request to update the description of a card data object, and the card description metadata may comprise data/information indicating that the type of the card action input is an update description card action.

While the description above provides some examples of card action type metadata, it is noted that the scope of the present disclosure is not limited to the description above. In some examples, an example card action type metadata may comprise additional and/or alternative data/information.

For example, the card action type metadata may indicate a card action input to update the card due date metadata (for example, set a due date, complete a due date, etc.). Additionally, or alternatively, the card action type metadata may indicate a card action input to update card checklist metadata (for example, add checklist, remove checklist, update checklist name, add checklist item, complete checklist item, set checklist item due date, etc.). Additionally, or alternatively, the card action type metadata may indicate a card action input to update card attachment metadata (for example, add attachment, remove attachment, etc.). Additionally, or alternatively, the card action type metadata may indicate a card action input to update the card cove metadata (for example, update cover of the card data object). Additionally, or alternatively, the card action type metadata may indicate a card action input to update card activity metadata (for example, add comment, edit comment, delete comment, vote on the card, etc.).

Additionally, or alternatively, the card action type metadata may indicate that one or more metadata associated with a card data object are modified by the card action input. For example, the card action type metadata may indicate that the card identifier metadata associated with a card data object is modified. Additionally, or alternatively, the card action type metadata may indicate that the card title metadata associated with a card data object is modified. Additionally, or alternatively, the card action type metadata may indicate that the card user metadata associated with a card data object is modified. Additionally, or alternatively, the card action type metadata may indicate that the card label metadata associated with a card data object is modified. Additionally, or alternatively, the card action type metadata may indicate that the card checklist metadata associated with a card data object is modified. Additionally, or alternatively, the card action type metadata may indicate that the card due date metadata associated with a card data object is modified. Additionally, or alternatively, the card action type metadata may indicate that the card attachment metadata associated with a card data object is modified. Additionally, or alternatively, the card action type metadata may indicate that the card cover metadata associated with a card data object is modified. Additionally, or alternatively, the card action type metadata may indicate that the card description metadata associated with a card data object is modified. Additionally, or alternatively, the card action type metadata may indicate that the card activity metadata associated with a card data object is modified. Additionally, or alternatively, the card action type metadata may indicate that the card status metadata associated with a card data object is modified. Additionally, or alternatively, the card action type metadata may indicate that the list association metadata associated with a card data object is modified. Additionally, or alternatively, the card action type metadata may indicate that the board association metadata associated with a card data object is modified. Additionally, or alternatively, the card action type metadata may indicate that the card custom field metadata associated with a card data object is modified. Additionally, or alternatively, the card action type metadata may indicate that the card interaction metadata associated with a card data object is modified.

Additionally, or alternatively, the card action type metadata may indicate that one or more metadata associated with a list data object are modified by the card action input. In such examples, the card action type metadata may also be referred to as list action type metadata. The card action data object may also be referred to as the list action data object, the card action input may also be referred to as the list action input, and/or the like. For example, the card action type metadata may indicate that the list identifier metadata associated with a list data object is modified. Additionally, or alternatively, the card action type metadata may indicate that the list member metadata associated with a list data object is modified. Additionally, or alternatively, the card action type metadata may indicate that the list name metadata associated with a list data object is modified. Additionally, or alternatively, the card action type metadata may indicate that the list position metadata associated with a list data object is modified. Additionally, or alternatively, the card action type metadata may indicate that the board association metadata associated with a list data object is modified. Additionally, or alternatively, the card action type metadata may indicate that the list status metadata associated with a list data object is modified. Additionally, or alternatively, the card action type metadata may indicate that the list watched status associated with a list data object is modified.

Additionally, or alternatively, the card action type metadata may indicate that one or more metadata associated with a board data object are modified by the card action input. In such examples, the card action type metadata may also be referred to as board action type metadata. The card action data object may also be referred to as the board action data object, the card action input may also be referred to as the board action input, and/or the like. For example, the card action type metadata may indicate that the board name metadata associated with a board data object is modified. Additionally, or alternatively, the card action type metadata may indicate that the board identifier metadata associated with a board data object is modified. Additionally, or alternatively, the card action type metadata may indicate that the board member metadata associated with a board data object is modified. Additionally, or alternatively, the card action type metadata may indicate that the board description metadata associated with a board data object is modified. Additionally, or alternatively, the card action type metadata may indicate that the board permission metadata associated with a board data object is modified. Additionally, or alternatively, the card action type metadata may indicate that the board label metadata associated with a board data object is modified. Additionally, or alternatively, the card action type metadata may indicate that the board background metadata associated with a board data object is modified. Additionally, or alternatively, the card action type metadata may indicate that the board sticker metadata associated with a board data object is modified. Additionally, or alternatively, the card action type metadata may indicate that the board status metadata associated with a board data object is modified. Additionally, or alternatively, the card action type metadata may indicate that the board custom field metadata associated with a board data object is modified. Additionally, or alternatively, the card action type metadata may indicate that the starred status metadata associated with a board data object is modified. Additionally, or alternatively, the card action type metadata may indicate that the board automation metadata associated with a board data object is modified. Additionally, or alternatively, the card action type metadata may indicate that the organization association metadata associated with a board data object is modified.

In some embodiments, a card action data object may comprise card action variable metadata. In some embodiments, the card action variable metadata comprises data and/or information indicating parameter(s) and/or variable(s) of the card action input and/or the software operations associated with one or more card data objects, one or more list data objects, and/or one or more board data objects. In some embodiments, the card action variable metadata may be in the form of text string(s), numerical character(s), alphabetical character(s), alphanumeric code(s), ASCII character(s), and/or the like.

For example, a client device may generate a card action data object based on a card action input comprising an electronic request to join a card data object. In this example, the card action variable metadata of the card action data object may comprise: (1) user identifier associated with the user (who is to join the card data object) and (2) the card identifier associated with the card data object to be joined (based on which the card data object can be identified). As an example, the client device may identify the card data object based on the card identifier, and update the card user metadata to include the user identifier.

Additionally, or alternatively, a client device may generate a card action data object based on a card action input comprising an electronic request to leave a card data object. In this example, the card action variable metadata of the card action data object may comprise: (1) user identifier associated with the user (who is to leave the card data object) and (2) the card identifier associated with the card data object (based on which the card data object can be identified). As an example, the client device may identify the card data object based on the card identifier, and update the card user metadata to remove the user identifier.

Additionally, or alternatively, a client device may generate a card action data object based on a card action input comprising an electronic request to add a member to a card data object. In this example, the card action variable metadata of the card action data object may comprise: (1) user identifier associated with the user (who is to be added to the card data object) and (2) the card identifier associated with the card data object (based on which the card data object can be identified). As an example, the client device may identify the card data object based on the card identifier, and update the card user metadata to include the user identifier.

Additionally, or alternatively, a client device may generate a card action data object based on a card action input comprising an electronic request to remove a member to a card data object. In this example, the card action variable metadata of the card action data object may comprise: (1) user identifier associated with the user (who is to be removed from the card data object) and (2) the card identifier associated with the card data object (based on which the card data object can be identified). As an example, the client device may identify the card data object based on the card identifier, and update the card user metadata to remove the user identifier.

Additionally, or alternatively, a client device may generate a card action data object based on a card action input comprising an electronic request to move a card data object. In this example, the card action variable metadata of the card action data object may comprise: (1) the card identifier associated with the card data object (based on which the card data object can be identified) and (2) one or more of list identifiers or board identifiers. For example, the card action input may comprise an electronic request to associate a card data object with a list data object, and the card action variable metadata may comprise the card identifier associated with the card data object and the list identifier associated with the list data object. Additionally, or alternatively, the card action input may comprise an electronic request to associate a card data object with a board data object, and the card action variable metadata may comprise the card identifier associated with the card data object and the board identifier associated with the board data object.

Additionally, or alternatively, a client device may generate a card action data object based on a card action input comprising an electronic request to add a label to a card data object. In this example, the card action variable metadata of the card action data object may comprise: (1) the card identifier associated with the card data object (based on which the card data object can be identified) and (2) one or more label identifiers (associated with the labels to be added to the card data object). As an example, the client device may identify the card data object based on the card identifier, and update the card label metadata to add the one or more label identifiers.

Additionally, or alternatively, a client device may generate a card action data object based on a card action input comprising an electronic request to remove a label to a card data object. In this example, the card action variable metadata of the card action data object may comprise (1) the card identifier associated with the card data object (based on which the card data object can be identified) and (2) one or more label identifiers (associated with the labels to be removed from the card data object). As an example, the client device may identify the card data object based on the card identifier, and update the card label metadata to remove the one or more label identifiers.

Additionally, or alternatively, a client device may generate a card action data object based on a card action input comprising an electronic request to archive the card data object. In this example, the card action variable metadata of the card action data object may comprise (1) the card identifier associated with the card data object (based on which the card data object can be identified) and (2) an electronic indication to archive the card data object. As an example, the client device may identify the card data object based on the card identifier, and update the card status metadata to indicate that the card data object is archived.

Additionally, or alternatively, a client device may generate a card action data object based on a card action input comprising an electronic request to unarchive the card data object. In this example, the card action variable metadata of the card action data object may comprise (1) the card identifier associated with the card data object (based on which the card data object can be identified) and (2) an electronic indication to unarchive the card data object. As an example, the client device may identify the card data object based on the card identifier, and update the card status metadata to indicate that the card data object is unarchived or active.

Additionally, or alternatively, a client device may generate a card action data object based on a card action input comprising an electronic request to update the name or title of the card data object. In this example, the card action variable metadata of the card action data object may comprise (1) the card identifier associated with the card data object (based on which the card data object can be identified) and (2) an electronic indication of the new name or title of the card data object. As an example, the client device may identify the card data object based on the card identifier, and update the card title metadata based on the new name or title.

Additionally, or alternatively, a client device may generate a card action data object based on a card action input comprising an electronic request to update the description the card data object. In this example, the card action variable metadata of the card action data object may comprise (1) the card identifier associated with the card data object (based on which the card data object can be identified) and (2) an electronic indication of the new description of the card data object. As an example, the client device may identify the card data object based on the card identifier, and update the card description metadata based on the new description.

While the description above provides examples of card action variable metadata, it is noted that the scope of the present disclosure is not limited to the description above. In some examples, an example card action variable metadata may comprise one or more additional and/or alternative data/information. For example, the card action variable metadata may indicate parameter(s) and/or variable(s) associated with the modification of one or more metadata of a card data object by the card action input. For example, the card action variable metadata may indicate parameter(s) and/or variable(s) associated with the modification of the card identifier metadata associated with a card data object. Additionally, or alternatively, the card action variable metadata may indicate parameter(s) and/or variable(s) associated with the modification of the card title metadata associated with a card data object. Additionally, or alternatively, the card action variable metadata may indicate parameter(s) and/or variable(s) associated with the modification of the card user metadata associated with a card data object. Additionally, or alternatively, the card action variable metadata may indicate parameter(s) and/or variable(s) associated with the modification of the card label metadata associated with a card data object. Additionally, or alternatively, the card action variable metadata may indicate parameter(s) and/or variable(s) associated with the modification of the card checklist metadata associated with a card data object. Additionally, or alternatively, the card action variable metadata may indicate parameter(s) and/or variable(s) associated with the modification of the card due date metadata associated with a card data object. Additionally, or alternatively, the card action variable metadata may indicate parameter(s) and/or variable(s) associated with the modification of the card attachment metadata associated with a card data object. Additionally, or alternatively, the card action variable metadata may indicate parameter(s) and/or variable(s) associated with the modification of the card cover metadata associated with a card data object. Additionally, or alternatively, the card action variable metadata may indicate parameter(s) and/or variable(s) associated with the modification of the card description metadata associated with a card data object. Additionally, or alternatively, the card action variable metadata may indicate parameter(s) and/or variable(s) associated with the modification of the card activity metadata associated with a card data object. Additionally, or alternatively, the card action variable metadata may indicate parameter(s) and/or variable(s) associated with the modification of the card status metadata associated with a card data object. Additionally, or alternatively, the card action variable metadata may indicate parameter(s) and/or variable(s) associated with the modification of the list association metadata associated with a card data object. Additionally, or alternatively, the card action variable metadata may indicate parameter(s) and/or variable(s) associated with the modification of the board association metadata associated with a card data object. Additionally, or alternatively, the card action variable metadata may indicate parameter(s) and/or variable(s) associated with the modification of the card custom field metadata associated with a card data object. Additionally, or alternatively, the card action variable metadata may indicate parameter(s) and/or variable(s) associated with the modification of the card interaction metadata associated with a card data object.

Additionally, or alternatively, the card action variable metadata may indicate parameter(s) and/or variable(s) associated with the modification of one or more metadata associated with a list data object by the card action input. In such examples, the card action variable metadata may also be referred to as list action variable metadata. The card action data object may also be referred to as the list action data object, the card action input may also be referred to as the list action input, and/or the like. For example, the card action variable metadata may indicate parameter(s) and/or variable(s) associated with the modification of the list identifier metadata associated with a list data object. Additionally, or alternatively, the card action variable metadata may indicate parameter(s) and/or variable(s) associated with the modification of the list member metadata associated with a list data object. Additionally, or alternatively, the card action variable metadata may indicate parameter(s) and/or variable(s) associated with the modification of the list name metadata associated with a list data object. Additionally, or alternatively, the card action variable metadata may indicate parameter(s) and/or variable(s) associated with the modification of the list position metadata associated with a list data object. Additionally, or alternatively, the card action variable metadata may indicate parameter(s) and/or variable(s) associated with the modification of the board association metadata associated with a list data object. Additionally, or alternatively, the card action variable metadata may indicate parameter(s) and/or variable(s) associated with the modification of the list status metadata associated with a list data object. Additionally, or alternatively, the card action variable metadata may indicate parameter(s) and/or variable(s) associated with the modification of the list watched status associated with a list data object.

Additionally, or alternatively, the card action variable metadata may indicate parameter(s) and/or variable(s) associated with the modification of one or more metadata associated with a board data object are modified by the card action input. In such examples, the card action variable metadata may also be referred to as board action variable metadata. The card action data object may also be referred to as the board action data object, the card action input may also be referred to as the board action input, and/or the like. For example, the card action variable metadata may indicate parameter(s) and/or variable(s) associated with the modification of the board name metadata associated with a board data object. Additionally, or alternatively, the card action variable metadata may indicate parameter(s) and/or variable(s) associated with the modification of the board identifier metadata associated with a board data object. Additionally, or alternatively, the card action variable metadata may indicate parameter(s) and/or variable(s) associated with the modification of the board member metadata associated with a board data object. Additionally, or alternatively, the card action variable metadata may indicate parameter(s) and/or variable(s) associated with the modification of the board description metadata associated with a board data object. Additionally, or alternatively, the card action variable metadata may indicate parameter(s) and/or variable(s) associated with the modification of the board permission metadata associated with a board data object. Additionally, or alternatively, the card action variable metadata may indicate parameter(s) and/or variable(s) associated with the modification of the board label metadata associated with a board data object. Additionally, or alternatively, the card action variable metadata may indicate parameter(s) and/or variable(s) associated with the modification of the board background metadata associated with a board data object. Additionally, or alternatively, the card action variable metadata may indicate parameter(s) and/or variable(s) associated with the modification of the board sticker metadata associated with a board data object. Additionally, or alternatively, the card action variable metadata may indicate parameter(s) and/or variable(s) associated with the modification of the board status metadata associated with a board data object. Additionally, or alternatively, the card action variable metadata may indicate parameter(s) and/or variable(s) associated with the modification of the board custom field metadata associated with a board data object. Additionally, or alternatively, the card action variable metadata may indicate parameter(s) and/or variable(s) associated with the modification of the starred status metadata associated with a board data object. Additionally, or alternatively, the card action variable metadata may indicate parameter(s) and/or variable(s) associated with the modification of the board automation metadata associated with a board data object. Additionally, or alternatively, the card action variable metadata may indicate parameter(s) and/or variable(s) associated with the modification of the organization association metadata associated with a board data object.

In some embodiments, a card action data object may comprise card action view metadata. In some embodiments, the card action view metadata comprise data and/or information related to a user view of card data object rendering(s), list data object rendering(s) and/or board data object rendering(s) associated with the card action input. For example, the card action input may be received from a user device while the user device displays rendering of a board data object. In this example, the card action view metadata may comprise, for example, the board identifier associated with the board data object. Additionally, or alternatively, the card action input may be received from a user device while the user device displays a board data object rendering. In this example, the card action view metadata may comprise, for example, the board identifier associated with the board data object related to the board data object rendering. In some embodiments, the card action view metadata may be in the form of text string(s), numerical character(s), alphabetical character(s), alphanumeric code(s), ASCII character(s), and/or the like.

In some embodiments, a card action data object may comprise card action identifier metadata. In some embodiments, the card action identifier metadata may comprise a card action identifier that uniquely identifies data/information that is related to the card action data object from other data/information stored in a card-based collaborative workflow management systems. In some embodiments, the card action identifier metadata may be in the form of text string(s), numerical character(s), alphabetical character(s), alphanumeric code(s), ASCII character(s), and/or the like. As an example, the card identifier metadata may be in the form of an alphabetical character string such as "abcde."

In some embodiments, a card action data object may comprise card action time metadata. In some embodiments, the card action time metadata comprises data and/or information describing a date and/or time associated with the card action input. For example, when a client device receives a card action input, the client device may generate the card action time metadata based on a current system time. In some embodiments, the card action time metadata may be in the form of text string(s), numerical character(s), alphabetical character(s), alphanumeric code(s), ASCII character(s), and/or the like.

While the description above provides some example metadata associated with a card action data object, it is noted that the scope of the present disclosure is not limited to the description above. In some examples, an example card action data object may comprise one or more additional and/or alternative metadata.

In some embodiments, a computing device may generate a "card action history registry." The term "card action history registry" refers to a data storage location and/or structure (for example, a database) that comprises data/information associated with card action data object(s) related to one computer program. For example, the card action history registry may comprise one or more card action data object indications, where each of the one or more card action data object indications corresponds to a card action data object associated with the computer program. In the present disclosure, the term "card action data object indication" refers to an electronic indication/representation of a card action data object. In some embodiments, the plurality of card action data object indications may be arranged in a chronological arrangement in the card action history registry. In some embodiments, the card action history registry may be stored locally in the client device.

In some embodiments, the card action data object indications in the card action history registry may be associated with card action data objects where a reversal card action operation has not been executed and/or where a reinstate card action operation has been executed (in contrast with the reversed card action history registry), details of which are described herein.

In some embodiments, a card action data object indication may be stored in the card action history registry only if the corresponding card action data object is "recordable." The term "recordable" or "recordability" refers to the eligibility and/or compatibility of a card action data object to be stored by a computing device (such as client device), for example, in a card action history registry.

In some embodiments, the computing device may determine whether a card action data object is recordable based on a recordable card action registry. The term "recordable card action registry" refers to a data structure that indicates, describes, and/or defines certain card action inputs or types of inputs, where card action data objects generated based on these certain card action inputs or types of inputs may be stored in the card action history registry.

As an example, the recordable card action registry may define a plurality of card action type metadata associated with card action data objects that are recordable. If a card action data comprises card action type metadata that corresponds to one of the card action type metadata defined by the recordable card action registry, the computing device determines that the card action data object is recordable. If the card action type metadata of a card action data object does not correspond to any of the card action type metadata defined by the recordable card action registry, the computing device determines that the card action data object is not recordable.

In some embodiments, a computing device may receive a reversal card action input. The term "reversal card action input" refers to a type of card action input that comprises data/information indicating a request to undo, reverse, and/or revert changes to a card data object (for example, changes to one or more metadata associated with the card data object) that is caused or triggered by a previous card action input.

In some embodiments, a reversal card action input may be received by a client device via one or more input/output circuitries and/or display circuitries. For example, the reversal card action input may be received from a user in the form of one or more keystrokes (for example, but not limited to, pressing on the "Z" key on a keyboard). Additionally, or alternatively, the reversal card action input may be received from a user in the form of a selection of a user interface element on a card data object rendering interface rendered for display (for example, a selection of an "undo" button).

In some embodiments, a reversal card action input may be associated with a reversal card action view metadata. In the present disclosure, the term "reversal card action view metadata" refers to a type of a card action view metadata that comprises data and/or information describing and/or indicating a user view of card data object rendering(s), list data object rendering(s) and/or board data object rendering(s) associated with a reversal card action input. For example, the reversal card action input may be received from a user device while the user device displays a board data object rendering. In this example, the reversal card action view metadata may comprise, for example, the board identifier associated with the board data object corresponding to the board data object rendering. Additionally, or alternatively, the reversal card action input may be received from a user device while the user device displays a card data object rendering. In this example, the reversal card action view metadata may comprise, for example, the card identifier associated with the card data object corresponding to the card data object rendering. In some embodiments, the reversal card action view metadata may be in the form of text string(s), numerical character(s), alphabetical character(s), alphanumeric code(s), ASCII character(s), and/or the like.

In some embodiments, a card action data object may be "reversible." The term "reversible" or "reversibility" refers to the eligibility and/or compatibility of changes to a card data object (caused or triggered by a card action input corresponding to the card action data object) to be undone, reversed, and/or reverted. For example, if a card action data object is reversible, changes to a card data object caused by a card action input corresponding to the card action data object can be undone, reversed, and/or reverted. If a card action data object is not reversible, the changes to a card data object caused by a card action input corresponding to the card action data object cannot be undone, reversed, and/or reverted.

In some embodiments, the computing device may determine whether a card action data object is reversible based on a reversible card action registry. The term "reversible card action registry" refers to a data structure that indicates, describes, and/or defines certain card action data objects that are reversible. In some embodiments, the reversible card action registry may define one or more reversal card action operations for a card action data object. The term "reversal card action operation" refers to one or more software operations that, when executed, undo, reverse, and/or revert changes to a card data object (for example, changes to one or more metadata associated with the card data object) that is caused or triggered by a previous card action input.

In some embodiments, a reversal card action operation may be determined and executed by a computing device without additional user input. For example, in response to receiving a reversal card action input, the computing device may determine whether the corresponding card action data object is reversible, and, if so, executing the corresponding reversal card action operation without the need for additional authorization or input from the user. In some embodiments, a user interface element may be rendered for display on a card data object rendering interface subsequent to executing the corresponding reversal card action operation, which may notify the user that the corresponding reversal card action operation has been executed, details of which are described herein.

In some embodiments, the computing device may generate a "reversed card action history registry." The term "reversed card action history registry" refers to a data storage location and/or structure (for example, a database) that comprises data/information associated with card action data object(s) that are related to one computer program and have been reversed by executing one or more corresponding reversal card action operations.

In some embodiments, the reversed card action history registry comprises one or more card action data object indications, where each of the one or more card action data object indications corresponds to a card action data object where one or more reversal card action operations corresponding to the card action data object have been executed. In contrast, the card action history registry described above may comprise one or more card action data object indications that are associated with card action data objects where a reversal card action operation has not been executed and/or where a reinstate card action operation has been executed.

In some embodiments, a computing device may receive a reinstate card action input. The term "reinstate card action input" refers to a type of card action input that comprises data/information indicating a request to undo, reverse, and/ or revert changes to a card data object (for example, changes to one or more metadata associated with the card data object) that was caused or triggered by a reversal card action operation.

In some embodiments, a reinstate card action input may be received by a client device via one or more input/output circuitries and/or display circuitries. For example, the reinstate card action input may be received from a user in the form of one or more keystrokes (for example, but not limited to, pressing on the "Shift" key together with the "Z" key on a keyboard). Additionally, or alternatively, the reinstate card action input may be received from a user in the form of a selection of a user interface element on a card data object rendering interface rendered for display (for example, a selection of an "redo" button).

In some embodiments, in response to receiving a reinstate card action input, the computing device may execute a reinstate card action operation. The term "reinstate card action operation" refers to one or more software operations that, when executed, undo, reverse, and/or revert changes to a card data object (for example, changes to one or more metadata associated with the card data object) that was caused or triggered by a reversal card action operation. In some embodiments, a reinstate card action operation may be determined and executed by a computing device without additional user input. For example, in response to receiving a reinstate card action input, the computing device may execute the corresponding reinstate card action operation without the need for additional authorization from the user. In some embodiments, a user interface element may be rendered for display on a card data object rendering interface subsequent to executing the corresponding reversal card action operation, which may notify the user that the corresponding reinstate card action operation has been executed, details of which are described herein.

In some embodiments, a computing device may receive a replicate card action input. The term "replicate card action input" refers to a type of card action input that comprises data/information indicating a request to duplicate, repeat, and/or replicate changes to a card data object (for example, changes to one or more metadata associated with the card data object that were caused or triggered by a previous card action input) on another card data object.

In some embodiments, a replicate card action input may be received by a client device via one or more input/output circuitries and/or display circuitries. For example, the replicate card action input may be received from a user in the form of one or more keystrokes (for example, but not limited to, pressing on the "R" key on a keyboard). Additionally, or alternatively, the replicate card action input may be received from a user in the form of a selection of a user interface element on a card data object rendering interface rendered for display (for example, a selection of a "repeat" button).

In some embodiments, in response to receiving a replicate card action input, the computing device may execute a replicate card action operation. The term "replicate card action operation" refers to one or more software operations that, when executed, duplicate, repeat, and/or replicate changes to a card data object (for example, changes to one or more metadata associated with the card data object) that were caused or triggered by a previous card action input on another card data object. In some embodiments, a replicate card action operation may be determined and executed by a computing device without additional user input. For example, in response to receiving a replicate card action input, the computing device may execute the corresponding replicate card action operation without the need for additional authorization from the user. In some embodiments, a user interface element may be rendered for display on a card data object rendering interface subsequent to executing the corresponding replicate card action operation, which may notify the user that the corresponding replicate card action operation has been executed, details of which are described herein.

In some embodiments, a computing device may generate a card action template data object. The term "card action template data object" refers to a type of data object that comprises data/information indicates, describes, and/or defines a sequence of software operations that may be carried out by a computing device on one or more card data objects, list data objects, and/or board data objects. For example, the card action template data object may comprise metadata such as, but not limited to, card action type metadata and card action variable metadata. As described above, the card action type metadata may comprise data and/or information indicating a type or category of software operations associated with one or more card data objects, one or more list data objects, and/or one or more board data objects. The card action variable metadata may comprise data and/or information indicating parameter(s) and/or variable(s) of the software operations associated with one or more card data objects, one or more list data objects, and/or one or more board data objects.

In the present disclosure, the terms "data object computing environment" or "data object computing system" refer to a software platform and associated hardware that are configured to support and maintain data exchange related to data objects between and among various computing devices, including, but not limited to, server(s), client devices and/or the like. For example, the data object computing environment may provide sufficient data security through its framework, structure, and/or data exchange channels, such that the one or more client devices may interact with and/or exchange data/information through one or more computer programs that are hosted by the server(s) to generate, view, and/or edit one or more data objects. As described above, the terms "card-based collaborative workflow management system" or "card-based collaborative workflow management environment" refer to a type of data object computing environment or data object computing system based on card data object(s), list data object(s) and/or board data object(s).

The terms "user device" or "client device" refer to computer hardware and/or software that is configured to enable a user to access a data object computing environment. Client devices may include, without limitation, smart phones, tablet computers, laptop computers, wearables, personal computers, enterprise computers, and the like.

A client device may be associated with one or more clients or users. The term "client" or "user" refers to an individual, group of individuals, business, organization, and the like. Users referred to herein are discussed largely in connection with client device enabled activity for receiving data and information to/from the data object computing environment and/or other device(s) associated with the data object computing environment.

In the present disclosure, the terms "client profile," "user profile," "user account," and "user account details" refer to data, files, and other information associated with a user. In some examples, the collection of data items in the client profile may include user identifiers.

The terms "member identifier," "client identifier," or "user identifier" refer to an identifier that uniquely identifies information stored in a data object computing environment that is related to a client or a user. For example, a user identifier may comprise a username, a user email address, a user ID number, and/or the like. In some embodiments, the user identifier may be in the form of text string(s), numerical character(s), alphabetical character(s), alphanumeric code(s), ASCII character(s), and/or the like.

Example System Architecture for Implementing Embodiments of the Present Disclosure Methods, apparatuses, and computer program products of the present disclosure may be embodied by any of a variety of devices. For example, the method, apparatus, and computer program product of an example embodiment may be embodied by a networked device (e.g., a data object server and/or a client device) configured to communicate with one or more devices. Additionally, or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example data object computing environment 100 within which embodiments of the present disclosure may operate. In the example shown in FIG. 1, the data object computing environment 100 may comprise a data object platform 105 in electronic communication with one or more client devices 101A, 101B, . . . 101N via a communication network 103. In some embodiments, the example data object computing environment 100 is a card-based collaborative workflow management environment described above.

In some embodiments, the data object platform 105 comprises a server (such as a card-based data object server 109) in electronic communication with one or more data repositories (such as a data object repository 111).

In some embodiments, the card-based data object server 109 may comprise software components and associated hardware components that are configured to generate one or more card data objects, list data objects and/or board data objects described above. For example, in response to receiving user input requesting generating a data object, a client device (for example, the client device 101A) may initiate an application programming interface (API) call to the card-based data object server 109. In some embodiments, the API call may comprise data/information related to various metadata associated with the data object to be generated. For example, the client device 101A may initiate an API call to the card-based data object server 109 to request generating a card data object, and the API may comprise data/information related to one or more of card identifier metadata, card title metadata, card user metadata, card label metadata, card checklist metadata, card due date metadata, card attachment metadata, card cover metadata, card description metadata, card activity metadata, card status metadata, list association metadata, and/or board association metadata associated with the card data object to be generated.

In some embodiments, the card-based data object server 109 may generate one or more card data objects, list data objects and/or board data objects based on the API calls received from the one or more client devices 101A, 101B, . . . 101N. In some embodiments, the card-based data object server 109 may store the one or more card data objects, list data objects and/or board data objects on the data object repository 111. In some embodiments, the data object repository 111 may be embodied as a data storage device such as a Network Attached Storage (NAS) device or devices, or as a separate database server or servers.

In some embodiments, the communication network 103 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, the communication network 103 may include an 802.11, 802.16, 802.20, and/or WiMax network. Further, the communication network 103 may include a public network (such as the Internet), a private network (such as an intranet), or combinations thereof, and may utilize a variety of networking protocols including, but not limited to, TCP/IP based networking protocols. For instance, the networking protocol may be customized to suit the needs of the data object platform 105. In some embodiments, the protocol is a custom protocol of JSON objects sent via a Web Socket channel. In some embodiments, the protocol is JSON over RPC, JSON over REST/HTTP, and the like.

While the description above provides some examples of data objects being generated by the card-based data object server 109 and stored in the data object repository 111, it is noted that the scope of the present disclosure is not limited to the description above. In some examples, one or more data objects are generated and stored locally by a client device. For example, a client device may generate a card action data object based on the card action input received by the client device, and may store the card action data object locally (for example, in a card action history registry), details of which are described herein.

It is noted that various components of the data object computing environment 100 may leverage the same computer or computing apparatus to perform various operations. For example, various components of the card-based data object server 109 and data object repository 111 may leverage the same computer or computing apparatus to perform various operations.

Example Apparatuses for Implementing Embodiments of the Present Disclosure

The card-based data object server 109 of FIG. 1 may be embodied by one or more computing systems, such as apparatus 200 shown in FIG. 2. The apparatus 200 may include a processor 202, a memory 204, an input/output circuitry 206, and a communications circuitry 208. The apparatus 200 may be configured to execute the operations described above with respect to FIG. 1 and below with respect to FIG. 4A to FIG. 27. Although these components 202-208 are described with respect to functional limitations, it should be understood that the particular implementations necessarily include the use of particular hardware. It should also be understood that certain of these components 202-208 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present disclosure.

The processor 202 may be embodied in a number of different ways and may, for example, include one or more processing devices configured to perform independently. In some examples, the processor 202 may include one or more processors configured in tandem via a bus to enable independent execution of instructions, pipelining, and/or multi-threading. The use of the term "processor" or "processing circuitry" may be understood to include a single core processor, a multi-core processor, multiple processors internal to the apparatus, and/or remote or "cloud" processors.

In some examples, the processor 202 may be configured to execute instructions stored in the memory 204 or otherwise accessible to the processor 202. In some examples, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include the input/output circuitry 206 that may, in turn, be in communication with the processor 202 to provide output to the user and, in some embodiments, to receive an indication of a user input. The input/output circuitry 206 may comprise a user interface circuitry and may include a display, which may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., the memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network (such as the communication network 103 as shown in FIG. 1). For example, the communications circuitry 208 may include one or more network interface cards, antennae, buses, switches, routers, modems, and supporting hardware and/or software, or any other device suitable for enabling communications via a network. Additionally, or alternatively, the communications circuitry 208 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like. As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

The client devices 101A, 101B, . . . , 101N of FIG. 1 may include one or more computing systems, such as the apparatus 300 shown in FIG. 3. The apparatus 300 may be configured to execute the operations described above with respect to FIG. 1 and below with respect to FIG. 4A to FIG. 27. The apparatus 300 may include a processor 301, a memory 303, an input/output circuitry 307, a communications circuitry 305, an input/output circuitry 307, a display 309, and/or a data object processing circuitry 311. The apparatus 300 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitries may both leverage use of the same processor, network interface, storage medium, or the like to perform their associated functions, such that duplicate hardware is not required for each set of circuitries. The use of the term "circuitry" as used herein with respect to components of the apparatus should therefore be understood to include particular hardware configured to perform the functions associated with the particular circuitry as described herein.

In some embodiments, the processor 301 (and/or co-processor or any other processing circuitry assisting or otherwise associated with the processor) may be in communication with the memory 303 via a bus for passing information among components of the apparatus. The memory 303 may be non-transitory and may include, for example, one or more volatile and/or non-volatile memories. In other words, for example, the memory 303 may be an electronic storage device (e.g., a computer readable storage medium). The memory 303 may be configured to store information, data, content, applications, instructions, or the like, for enabling the apparatus 300 to carry out various functions in accordance with example embodiments of the present disclosure.

The processor 301 may be embodied in a number of different ways and may, for example, include one or more processing devices configured to perform independently. Additionally, or alternatively, the processor 301 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 301 may be configured to execute instructions stored in the memory 303 or otherwise accessible to the processor. Alternatively, or additionally, the processor 301 may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor 301 is embodied as an executor of software instructions, the instructions may specifically configure the processor to perform the algorithms and/or operations described herein when the instructions are executed.

In some embodiments, the apparatus 300 may include the input/output circuitry 307 that may, in turn, be in communication with the processor 301 to provide output to the user and, in some embodiments, to receive an indication of a user input. The input/output circuitry 307 may comprise a user interface circuitry and may include a display, which may comprise a web user interface, a mobile application, a client device, a kiosk, or the like. In some embodiments, the input/output circuitry 307 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., the memory 303, and/or the like).

In some embodiments, the apparatus 300 may include the display 309 that may, in turn, be in communication with the processor 301 to display renderings of card data object rendering interfaces. In various examples of the present disclosure, the display 309 may include a liquid crystal display (LCD), a light-emitting diode (LED) display, a plasma (PDP) display, a quantum dot (QLED) display, and/or the like.

The communications circuitry 305 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 305 may include, for example, a network interface for enabling communications with a wired or wireless communication network. For example, the communications circuitry 305 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

The data object processing circuitry 311 includes hardware configured to support various functionalities, details of which are described hereinafter. The data object processing circuitry 311 may utilize processing circuitry, such as the processor 301, to perform these actions. In some embodiments, the data object processing circuitry 311 may include a separate processor, specially configured Field Programmable Gate Array (FPGA), or Application Specific Integrated Circuit (ASIC). The data object processing circuitry 311 may be implemented using hardware components of the apparatus configured by either hardware or software for implementing the functions described herein.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

Example Methods for Implementing Embodiments of the Present Disclosure

Various example methods described herein, including, for example, those as shown in FIG. 4A to FIG. 17, may provide various technical advantages and/or improvements described above.

It is noted that each block of the flowchart, and combinations of blocks in the flowchart, may be implemented by various means such as hardware, firmware, circuitry and/or other devices associated with execution of software including one or more computer program instructions. For example, one or more of the methods described in FIG. 4A to FIG. 17 may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

Referring now to FIG. 4A and FIG. 4B, an example method 400 is illustrated. In particular, the example method 400 illustrates example steps/operations of generating a card action data object and responding to a reversal card action input in accordance with example embodiments of the present disclosure.

In the example shown in FIG. 4A, the example method 400 starts at block 402 and then proceeds to step/operation 404. At step/operation 404, a processing circuitry (such as the processor 301 of the client device 101A described above in connection with FIG. 1 and FIG. 3) may receive a card action input. In some embodiments, the card action input is associated with a card data object.

In some embodiments, a card action input comprises user input(s) and/or software operation(s) related to modifications on metadata associated with a card data object. For example, a user Adam may access and/or view one or more card data object renderings, list data object renderings, and/or board data object renderings associated with a computer software via a card data object rendering interface on a display of a client device. Adam may provide a card action input via an input/output circuitry of the client device.

As an example, Adam may provide card action input to reassign a first card data object "Identify Goal Stakeholders" from a first list data object "Goal 1: Grow Customers by 25%" to a second list data object "Done (Q4 2020)" in a card-based collaborative workflow management system. In this example, the first card data object may represent a task to identify goal stakeholders. The first list data object may represent a list of tasks that are related to "goal 1: grow customers by 25%." The second list data object may represent a list of tasks that are completed in Q4 2020. Adam may provide card action input to reassign the first card data object from the first list data object to the second list data object when the task has been completed. The processing circuitry may change the list association metadata of the first card data object from indicating the first list data object to indicating the second list data object.

Subsequent to step/operation 404, the method 400 proceeds to step/operation 406. At step/operation 406, a processing circuitry (such as the processor 301 of the client device 101A described above in connection with FIG. 1 and FIG. 3) may, in response to receiving the card action input, trigger generating a card action data object.

In some embodiments, the processing circuitry may generate the card action data object based at least in part on the card action input and the card data object. As described above, the card data object may comprise one or more metadata, such as, but not limited to, card identifier metadata, card title metadata, card user metadata, card label metadata, card checklist metadata, card due date metadata, card attachment metadata, card cover metadata, card description metadata, card activity metadata, card status metadata, list association metadata, and/or board association metadata. The card action input may comprise user input(s) and/or software operation(s) related to modifications on one or more of the above metadata associated with the card data object.

In some embodiments, the card action data object may comprise one or more metadata that comprises data/information representing, defining, and/or indicating modifications on the card data object that is caused or triggered by the card action input, details of which are described in connection with at least FIG. 5.

Continuing from the Adam example above, in response to receiving the card action input, the processing circuitry may trigger generating a card action data object based on the card action input and the first card data object. For example, the processing circuitry may generate card action type metadata of the card action data object indicating that a type of card action input is a move card action. The processing circuitry may generate the card action variable metadata comprising the first card identifier associated with the first card data object, the first list identifier associated with the first list data object, and the second list identifier associated with the second list data object. The processing circuitry may generate the card action view metadata based on the user view that is rendered for display when receiving the card action input (for example, the board data object associated with a board data object rendering displayed on the client device). The processing circuitry may assign a numerical string for the card action identifier metadata, and may determine a current system time when receiving the card action input as the card action time metadata. Additional details associated with generating the card action data object are described herein, including, but not limited to, those described in connection with at least FIG. 5.

Referring back to FIG. 4A, subsequent to step/operation 406, the method 400 proceeds to step/operation 408. At step/operation 408, a processing circuitry (such as the processor 301 of the client device 101A described above in connection with FIG. 1 and FIG. 3) may update a card action history registry.

In some embodiments, the processing circuitry may update the card action history registry with a card action data object indication associated with the card action data object. In some embodiments, the card action data object indication is an electronic indication/representation of the card action data object generated at step/operation 406, and the card action history registry comprises a plurality of card action data object indications associated with the client device and/or the computer software.

In some embodiments, the card action history registry is stored in at least one non-transitory memory and/or a storage device of an apparatus (for example, the memory 303 of the client device 101A described above in connection with FIG. 1 and FIG. 3).

In some embodiments, the card action history registry comprises a plurality of card action data object indications arranged in a chronological arrangement. For example, the plurality of card action data object indications may be arranged based on the card action time metadata associated with the corresponding card action data object. As an example, the plurality of card action data object indications may be arranged in a "first in, last out" arrangement, where an earlier card action data object indication is arranged under a later card action data object indication in the list of card action data object indications in the card action history registry. As another example, the plurality of card action data object indications may be arranged in a "first in, first out" arrangement, where an earlier card action data object indication is arranged above a later card action data object indication in the list of card action data object indications in the card action history registry. Details of these chronological arrangements are described and illustrated further herein.

Continuing from the Adam example above, the client device may generate and store a card action history registry comprising a plurality of card action data object indications. Each of the plurality of card action data object indications corresponds to a card action data object, which represents card action input from Adam related to the card-based collaborative workflow management system. Subsequent to generating the card action data object at step/operation 406 based on the move card action, the processing circuitry may add a corresponding card action data object indication (based on the card action data object) to the card action history registry.

Subsequent to step/operation 408, the method 400 proceeds to step/operation 410. At step/operation 410, a processing circuitry (such as the processor 301 of the client device 101A described above in connection with FIG. 1 and FIG. 3) may receive a reversal card action input.

In some embodiments, the reversal card action input comprises data/information indicating a request to undo, reverse, and/or revert changes to a card data object (for example, changes to one or more metadata associated with the card data object) that is caused or triggered by a previous card action input (for example, the card action input received at step/operation 404).

Continuing from the Adam example above, Adam may provide a card action input via the input/output circuitry of the client device while accessing and/or view a card data object rendering interface that comprises one or more card data object renderings, list data object renderings, and/or board data object renderings associated with the computer software and displayed on a client device. For example, Adam may select a user interface element of an "undo" button on the card data object rendering interface.

As described above, the card action history registry may comprise a plurality of card action data object indications. In some embodiments, in response to receiving the reversal card action input, the processing circuitry may determine a card action data object indication that is the most recent card action data object indication among the plurality of card action data object indications for subsequent steps/operations in method 400. For example, in a "first in, first out" arrangement, the processing circuitry may determine the bottom card action data object indication in the list of card action data object indications for subsequent steps/operations in method 400. In a "first in, last out" arrangement, the processing circuitry may determine the top card action data object indication in the list of card action data object indications for subsequent steps/operations in method 400.

In some embodiments, subsequent to step/operation 410, the method 400 proceeds to block E, which connected FIG. 4A to FIG. 4B. Referring now to FIG. 4B, subsequent to block E (e.g. subsequent to receiving a reversal card action input at step/operation 410), the method 400 proceeds to step/operation 412. At step/operation 412, the processing circuitry (such as the processor 301 of the client device 101A described above in connection with FIG. 1 and FIG. 3) may, in response to receiving a reversal card action input, determine whether the card action data object is reversible.

In some embodiments, the processing circuitry may determine whether the card action data object is reversible based at least in part on a reversible card action registry. As described above, the reversible card action registry may indicate, describe, and/or define certain card action data objects that are reversible, including, but not limited to, based on the card data object, card action type metadata, and/or card action view metadata associated with the card action data object. Example details associated with determining whether the card action data object is reversible are described in connection with at least FIG. 8, FIG. 9, and FIG. 10.

If, at step/operation 412, the processing circuitry determines that the card action data object is not reversible, the method 400 proceeds to block 420 and ends.

Continuing from the Adam example above, if the processing circuitry determines that the move card action is not reversible, the processing circuitry may not execute a reversal card action operation. In some embodiments, the processing circuitry may generate and render a notification user interface element on the card data object rendering interface, indicating that the move card action is not reversible.

If, at step/operation 412, the processing circuitry determines that the card action data object is reversible, the method 400 proceeds to step/operation 414. At step/operation 414, a processing circuitry (such as the processor 301 of the client device 101A described above in connection with FIG. 1 and FIG. 3) may execute a reversal card action operation in response to determining that the card action data object is reversible.

In some embodiments, the processing circuitry may determine the corresponding reversal card action operation based on the reversible card action registry and the card action data object. For example, based on the card action type metadata of the card action data object, the processing circuitry may determine the corresponding reversal card action operation from the reversible card action registry, and may execute the corresponding reversal card action operation.

Continuing from the Adam example above, in response to determining that the move card action is reversible, the processing circuitry may execute a reversal card action operation that reassign the first card data object "Identify Goal Stakeholders" from the second list data object "Done (Q4 2020)" to the first list data object "Goal 1: Grow Customers by 25%" in the card-based collaborative workflow management system. In some embodiments, the processing circuitry may change the list association metadata associated with the first card data object from indicating the second list data object to indicating the first list data object.

Subsequent to step/operation 414, the method 400 proceeds to step/operation 416. At step/operation 416, a processing circuitry (such as the processor 301 of the client device 101A described above in connection with FIG. 1 and FIG. 3) may delete the card action data object indication from the card action history registry in response to determining that the card action data object is reversible and/or subsequent to executing the reversal card action operation.

As described above in connection with step/operation 408, the processing circuitry may update the card action history registry to add a card action data object indication based on the card action data object generated at step/operation 406. Here, in response to receiving the reversal card action input and determining that the card action data object in reversible, and/or subsequent to executing the reversal card action operation, the processing circuitry may delete the card action data object indication from the card action history registry.

Subsequent to step/operation 416, the method 400 proceeds to step/operation 418. At step/operation 418, a processing circuitry (such as the processor 301 of the client device 101A described above in connection with FIG. 1 and FIG. 3) may add the card action data object indication to a reversed card action history registry.

In some embodiments, the reversed card action history registry comprises data/information associated with card action data object(s) that have been reversed by executing one or more corresponding reversal card action operations. In some embodiments, the reversed card action history registry is stored in the at least one non-transitory memory and/or a storage device of an apparatus (for example, the memory 303 of the client device 101A described above in connection with FIG. 1 and FIG. 3). In response to receiving the reversal card action input and determining that the card action data object in reversible, and/or subsequent to executing the reversal card action operation, the processing circuitry may add the card action data object indication to a reversed card action history registry.

In some embodiments, step/operation 416 and step/operation 418 may be combined. For example, the processing circuitry may move the card action data object indication from the card action history registry to the reversed card action history registry, thereby deletes the card action data object indication from the card action history registry and adds the card action data object indication to a reversed card action history registry.

Subsequent to step/operation 418, the method 400 proceeds to block 420 and ends.

Referring now to FIG. 5, an example method 500 is illustrated. In the particular, the example method 500 may start at block A from step/operation 406 of FIG. 4A. As described above in connection with step/operation 406 of FIG. 4A, the processing circuitry may trigger generating a card action data object. As such, FIG. 5 illustrates some example embodiments related to generating the card action data object, including generating various metadata associated with the card action data object.

Referring now to FIG. 5, subsequent to block A, the method 500 proceeds to step/operation 501. At step/operation 501, a processing circuitry (such as the processor 301 of the client device 101A described above in connection with FIG. 1 and FIG. 3) may generate card action type metadata and card action variable metadata.

In some embodiments, the processing circuitry may generate card action type metadata and card action variable metadata based at least in part on the card action input and/or the card data object.

As described above, the card action type metadata may comprise data and/or information indicating a type or category of card action input and/or software operations associated with one or more card data objects. For example, the card action type metadata may indicate a join card action, a leave card action, an add member to card action, a remove member from card action, a move card action, an add label to card action, a remove label from card action, an archive card action, an unarchive card action, a rename card action, an update description card action, and/or among other card actions.

As an example, the card action input may be received from a user Bella indicating a request to associate/add another member Cody to the card data object A. In this example, the processing circuitry may generate card action type metadata indicating an add member to card action.

As described above, the card action variable metadata may comprise data and/or information indicating parameter(s) and/or variable(s) of the card action input and/or the software operations associated with one or more card data objects, one or more list data objects, and/or one or more board data objects. In some embodiments, the parameter(s) and/or variable(s) may be related to the card action type metadata.

Continuing from the Bella example above, the processing circuitry may generate card action variable metadata that includes (1) user identifier associated Cody and (2) the card identifier associated with the card data object A.

At step/operation 503, a processing circuitry (such as the processor 301 of the client device 101A described above in connection with FIG. 1 and FIG. 3) may generate card action view metadata.

In some embodiments, the processing circuitry may generate card action view metadata based at least in part on the card data object and/or the card action input. For example, the processing circuitry may determine a current user view associated with the card data object, the list data object, and/or the board data object associated with the card action input.

Continuing from the Bella example above, the processing circuitry may determine that Bella was viewing a board data object rendering corresponding to the board data object X when providing the card action input. In this example, the processing circuitry may generate the card action view metadata that comprises the board identifier of the board data object X.

At step/operation 505, a processing circuitry (such as the processor 301 of the client device 101A described above in connection with FIG. 1 and FIG. 3) may generate card action time metadata.

In some embodiments, the processing circuitry may generate card action time metadata based at least in part on a system time associated with the card action input (e.g., when the card action input was received). The system time may be determined based on, for example but not limited to, a system clock associated with the computing device (for example, the client device), a clock that is provided via another computing device in electronic communication with the computing device (for example, a remote time server in in electronic communication with the client device via one or more wired and/or wireless means).

Continuing from the Bella example above, Bella may provide the card input action at 12:00 p.m. EST on Nov. 1, 2020. In this example, the processing circuitry may generate card action time metadata indicating 12:00 p.m. EST on Nov. 1, 2020.

At step/operation 507, a processing circuitry (such as the processor 301 of the client device 101A described above in connection with FIG. 1 and FIG. 3) may assign card action identifier metadata to the card data object.

In some embodiments, the processing circuitry may generate or assign text string(s), numerical character(s), alphabetical character(s), alphanumeric code(s), ASCII character(s) to the card data object as the card action identifier metadata.

Continuing from the Bella example above, the processing circuitry may assign a text string "abcd1234" to the card action data object as the card action identifier metadata.

In different embodiments, one or more of step/operation 501, step/operation 503, step/operation 505, and/or step/operation 507 may be performed in different sequences. In some embodiments, one or more of the step/operation 501, step/operation 503, step/operation 505, and/or step/operation 507 may be performed simultaneously. In some embodiments, one or more (but not all) of step/operation 501, step/operation 503, step/operation 505, and/or step/operation 507 are performed. In some embodiments, all of step/operation 501, step/operation 503, step/operation 505, and/or step/operation 507 are performed.

Referring back to FIG. 5, subsequent to step/operation 501, step/operation 503, step/operation 505, and/or step/operation 507, the example method 500 proceeds to block B. Referring back to FIG. 4A, subsequent to step/operation 406, the method 400 proceeds to step/operation 408.

Referring now to FIG. 6, an example method 600 is illustrated. In the particular, the example method 600 may start at block C from step/operation 408 of FIG. 4A. As described above in connection with step/operation 408 of FIG. 4A, the processing circuitry may update a card action history registry. As such, FIG. 6 illustrates some example embodiments related to updating a card action history registry, for example, based on whether the card action data object is recordable.

Referring now to FIG. 6, subsequent to block C, the method 600 proceeds to step/operation 602. At step/operation 602, a processing circuitry (such as the processor 301 of the client device 101A described above in connection with FIG. 1 and FIG. 3) may determine whether the card action data object is recordable.

In some embodiments, the processing circuitry may determine whether the card action data object is recordable based at least in part on a recordable card action registry. In some embodiments, the recordable card action registry defines a plurality of card action type metadata associated with recordable card action data objects, as described above.

For example, the recordable card action registry may define that card action data objects associated with one or more of the following list of card actions described in the card action type metadata are recordable: join card action, leave card action, add member to card action, remove member from card action, move card action, add label to card action, remove label from card action, archive card action, unarchive card action, rename card action, and update description card action. In some embodiments, the recordable card action registry may define one or more additionally or alternative card action(s) that are described in the card action type metadata of recordable card action data object(s).

While the description above provides example card action data objects that are recordable, it is noted that the scope of the present disclosure is not limited to the description above. In some examples, one or more additional or alternative card action data objects may be recordable. For example, card action data objects associated with one or more of the following list of card actions described in the card action type metadata are recordable: complete due date, add checklist, remove checklist, update checklist name, add checklist item, complete checklist item, set checklist item due date, add attachment, remove attachment, update cover, convert to template, update custom field value, update address, vote on card, and/or add/edit/delete comment.

Additionally, or alternatively, the recordable card action registry may define one or more of the modifications associated with the metadata for the card data object, the list data object, and/or the card data object (for example, those described above) as recordable.

In some embodiments, the plurality of card action type metadata that are associated with recordable card action data objects may be predefined by the processing circuitry and/or through user input. For example, a user may provide input to the client device indicating one or more card action type metadata that are associated with recordable card action data objects. Additionally, or alternatively, the processing circuitry may determine one or more card action type metadata that are associated with recordable card action data objects based on one or more system requirements (for example, a requirement of the card-based collaborative workflow management system).

If, at step/operation 602, the processing circuitry determines that the card action data object is recordable, the method 600 proceeds to step/operation 604. At step/operation 604, a processing circuitry (such as the processor 301 of the client device 101A described above in connection with FIG. 1 and FIG. 3) may trigger updating the card action history registry in response to determining that the card action data object is recordable.

In some embodiments, based on the card action type metadata of the card action data object (for example, generated in connection with step/operation 406 described above in connection with FIG. 4A) corresponds to one of the plurality of card action type metadata defined by the recordable card action registry, the processing circuitry may determine that the card action data object is recordable, and may proceed with updating the card action history registry (similar to those described in connection with step/operation 408 of FIG. 4A).

Continuing from the example above, a card action type metadata of a card data object B may indicate a move card action (for example, updating the list association metadata of the card data object), which is defined by the recordable card action registry as associated with one of the recordable card action data objects. In this example, the processing circuitry may trigger updating the card action history registry at step/operation 604 to include a card action data object indication based on the card action data object B.

Referring now to FIG. 7, an example card action history registry 700 is shown. In the example shown in FIG. 7, the card action history registry 700 may comprise a first card action data object indication 701 and a second card action data object indication 703. In the example shown in FIG. 7, the first card action data object indication 701 may be generated based on a first card action data object corresponding to a first card action input and relating to updating the card user metadata (for example, adding a member to the card data object). The second card action data object indication 703 may be generated based on a second card action data object corresponding to a second card action input and relating to updating the list association metadata (for example, moving the card data object from one list data object to another list data object). In some embodiments, the first card action data object indication 701 and the second card action data object indication 703 may be in a "first in, last out" arrangement. For example, the first card action data object indication 701 may be generated prior to the second card action data object indication 703, and the second card action data object indication 703 is positioned above the first card action data object indication 701.

Referring back to FIG. 6, if, at step/operation 602, the processing circuitry determines that the card action data object is not recordable, the method 600 proceeds to step/operation 606. At step/operation 606, a processing circuitry (such as the processor 301 of the client device 101A described above in connection with FIG. 1 and FIG. 3) may, in response to determining that the card action data object is not recordable, trigger discarding the card action data object.

In some embodiments, based on the card action type metadata of the card action data object (for example, generated in connection with step/operation 406 described above in connection with FIG. 4A) does not correspond to any of the plurality of card action type metadata defined by the recordable card action registry, the processing circuitry may determine that the card action data object is not recordable, and may proceed with forgoing updating the card action history registry (e.g. may not carry out step/operation 408 and its subsequent steps/operations of FIG. 4A).

Subsequent to step/operation 604 and/or step/operation 606, the example method 600 proceeds to block D. Referring back to FIG. 4A, subsequent to step/operation 408, a processing circuitry may receive a reversal card action input at step/operation 410 and determine whether the card action data object is reversible at step/operation 412.

Referring now to FIG. 8, an example method 800 is illustrated. In the particular, the example method 800 illustrates some example embodiments related to determining whether the card action data object is reversible based on, for example, a plurality of card action type metadata defined by the reversible card action registry.

The example method 800 starts at block 802 and then proceeds to step/operation 804. At step/operation 804, a processing circuitry (such as the processor 301 of the client device 101A described above in connection with FIG. 1 and FIG. 3) may retrieve reversible card action registry.

In some embodiments, the reversible card action registry comprises a plurality of card action type metadata associated with reversible card action data objects. In some embodiments, the plurality of card action type metadata that are associated with reversible card action data objects may be predefined by the processing circuitry and/or through user input. For example, a user may provide input to the client device indicating one or more card action type metadata that are associated with reversible card action data objects. Additionally, or alternatively, the processing circuitry may determine one or more card action type metadata that are associated with reversible card action data objects based on one or more system requirements (for example, a requirement of the card-based collaborative workflow management system).

As an example, the reversible card action registry may define that card action data objects associated with one or more of the following list of card actions described in the card action type metadata are reversible: join card action, leave card action, add member to card action, remove member from card action, move card action, add label to card action, remove label from card action, archive card action, unarchive card action, rename card action, and update description card action. In some embodiments, the reversible card action registry may define one or more additionally or alternative card action(s) that are described in the card action type metadata of reversible card action data object(s).

In some embodiments, the processing circuitry may determine that one or more actions are recordable but not reversible. For example, an add checklist action may be recordable but not reversible. Additionally, or alternatively, interactive actions, such as adding or editing comments, may be recordable but not reversible. Additionally, or alternatively, constructive and destructive actions, such as creating a card or deleting a comment, are not reversible.

Subsequent to step/operation 804, the method 800 proceeds to step/operation 806. At step/operation 806, a processing circuitry (such as the processor 301 of the client device 101A described above in connection with FIG. 1 and FIG. 3) may determine card action type metadata associated with the card data object.

As described above, the card action data object may comprise card action type metadata (for example, generated based at least in part on step/operation 501 of FIG. 5 described above). As such, the processing circuitry may extract the card action type metadata from the card action data object at step/operation 806.

Subsequent to step/operation 806, the method 800 proceeds to step/operation 808. At step/operation 808, a processing circuitry (such as the processor 301 of the client device 101A described above in connection with FIG. 1 and FIG. 3) may determine whether card action type metadata corresponds to those card action type metadata in the reversible card action registry.

In some embodiments, based on the card action type metadata of the card action data object corresponding to one of the plurality of card action type metadata defined by the reversible card action registry, the processing circuitry may determine that the card action data object is reversible. In some embodiments, based on the card action type metadata of the card action data object not corresponding to any of the plurality of card action type metadata defined by the reversible card action registry, the processing circuitry may determine that the card action data object is not reversible.

Referring back to FIG. 8, if, at step/operation 808, the processing circuitry determines that the card action type metadata corresponds to one of those in the reversible card action registry, the method 800 proceeds to step/operation 810. At step/operation 810, a processing circuitry (such as the processor 301 of the client device 101A described above in connection with FIG. 1 and FIG. 3) may determine that the card action data object is reversible in response to determining that the card action type metadata corresponds to one of the plurality of card action type metadata.

For example, if the card action type metadata of the card action data object indicates a move card action, the processing circuitry may determine that the card action data object is reversible as move card action is one of the card actions described in the card action type metadata that is associated with a reversible card action data object as defined by the reversible card action registry.

If, at step/operation 808, the processing circuitry determines that the card action type metadata does not correspond to one of those in the reversible card action registry, the method 800 proceeds to step/operation 812. At step/operation 812, a processing circuitry (such as the processor 301 of the client device 101A described above in connection with FIG. 1 and FIG. 3) may determine that the card action data object is not reversible in response to determining that the card action type metadata does not correspond to any of the plurality of card action type metadata.

For example, if the card action type metadata of the card action data object indicates a create card action (e.g. a request to generate a card data object), the processing circuitry may determine that the card action data object is not reversible as create card action is not one of the card actions described in the card action type metadata that is associated with a reversible card action data object as defined by the reversible card action registry.

In some embodiments, subsequent to determining that the card action data object is not reversible, the processing circuitry may forgo executing the reversal card action operation, forgo deleting the card action data object indication from the card action history registry, and forgo adding the card action data object indication to the reversed card action history registry. For example, the processing circuitry may forgo step/operation 414, step/operation 416, and step/operation 418 described above in connection with FIG. 4B.

Referring back to FIG. 8, subsequent to step/operation 810 or step/operation 812, the method 800 proceeds to block 814 and ends.

Referring now to FIG. 9, an example method 900 is illustrated. In the particular, the example method 900 illustrates some example embodiments related to determining whether the card action data object is reversible, for example, based on a plurality of card data object indications defined by the reversible card action registry.

The example method 900 starts at block 901 and then proceeds to step/operation 903. At step/operation 903, a processing circuitry (such as the processor 301 of the client device 101A described above in connection with FIG. 1 and FIG. 3) may retrieve reversible card action registry.

In some embodiments, the reversible card action registry comprises a plurality of card data object indications. In some embodiments, each of the plurality of card data object indications represents/indicates a card data object, and card action data objects that are associated with these card data objects indicated by the reversible card action registry are reversible. In some embodiments, card action data objects that are not associated with these card data objects indicated by the reversible card action registry are not reversible.

In some embodiments, the plurality of card data object indications that are associated with reversible card action data objects may be predefined by the processing circuitry and/or through user input. For example, a user may provide input to the client device indicating one or more card data object indications that are associated with reversible card action data objects. Additionally, or alternatively, the processing circuitry may determine one or more card data object indications that are associated with reversible card action data objects based on one or more system requirements (for example, a requirement of the card-based collaborative workflow management system).

As an example, the reversible card action registry may define that card action data objects associated with one or more of the following list of card data objects are reversible: card action data object with the card identifier ABC, card action data object with the card identifier DEF, and card action data object with the card identifier GHI.

Additionally, or alternatively, the reversible card action registry may define one or more of the modifications associated with the metadata for the card data object, the list data object, and/or the card data object (for example, those described above) as reversible. Additionally, or alternatively, the reversible card action registry may define one or more types of actions that are not reversible, such as, but not limited to, adding or editing comments associated with a card data object, a list data object, and/or a board data object.

Referring back to FIG. 9, subsequent to step/operation 903, the method 900 proceeds to step/operation 905. At step/operation 905, a processing circuitry (such as the processor 301 of the client device 101A described above in connection with FIG. 1 and FIG. 3) may determine whether the card data object associated with the card action input corresponds to one of the plurality of card data object indications in the reversible card action registry.

In some embodiments, based on the card data object (which is associated with the card action input/corresponding card action data object) corresponds to one of the plurality of card data object indications defined by the reversible card action registry, the processing circuitry may determine that the card action data object is reversible. In some embodiments, based on the card data object (associated with the card action input/corresponding card action data object) does not correspond to any one of the plurality of card data object indications defined by the reversible card action registry, the processing circuitry may determine that the card action data object is not reversible.

If, at step/operation 905, the processing circuitry determines that the card action data object corresponds to one of those card data object indications, the method 900 proceeds to step/operation 907. At step/operation 907, a processing circuitry (such as the processor 301 of the client device 101A described above in connection with FIG. 1 and FIG. 3) may determine that the card action data object is reversible in response to determining that the card data object corresponds to one of the plurality of card action data object indications.

Continuing from the example above, the card action data object may be generated based on a card action input associated with a card data object ABC. Because the card data object ABC does correspond to one of the card data object indications defined by the reversible card action registry, the processing circuitry may determine that the corresponding card action data object is reversible.

If, at step/operation 905, the processing circuitry determines that the card data object does not correspond to one of those card data object indications, the method 900 proceeds to step/operation 909. At step/operation 909, a processing circuitry (such as the processor 301 of the client device 101A described above in connection with FIG. 1 and FIG. 3) may determine that the card action data object is not reversible in response to determining that the card data object indication does not correspond to any of the plurality of card data object indications.

Continuing from the example above, the card action data object may be generated based on a card action input associated with a card data object JKL. Because the card data object JKL does not correspond to any of the card data object indications defined by the reversible card action registry, the processing circuitry may determine that the corresponding card action data object is not reversible.

In some embodiments, subsequent to determining that the card action data object is not reversible, the processing circuitry may forgo executing the reversal card action operation, forgo deleting the card action data object indication from the card action history registry, and forgo adding the card action data object indication to the reversed card action history registry. For example, the processing circuitry may forgo step/operation 414, step/operation 416, and step/operation 418 described above in connection with FIG. 4B.

Referring back to FIG. 9, subsequent to step/operation 907 or step/operation 909, the method 900 proceeds to block 911 and ends.

Referring now to FIG. 10, an example method 1000 is illustrated. In the particular, the example method 1000 illustrates some example embodiments related to determining whether the card action data object is reversible based on, for example, reversal card action view metadata associated with the reversal card action input and/or the card action view metadata of the card action data object.

The example method 1000 starts at block 1002 and then proceeds to step/operation 1004. At step/operation 1004, a processing circuitry (such as the processor 301 of the client device 101A described above in connection with FIG. 1 and FIG. 3) may determine reversal card action view metadata associated with the reversal card action input.

In some embodiments, the reversal card action view metadata comprises data and/or information describing and/or indicating a user view associated with the reversal card action input. For example, the reversal card action view metadata may describe and/or indicate card data object(s), list data object(s), and/or board data object(s) that is rendered for display on a card data object rendering interface, where the reversal card action input is received via said card data object rendering interface.

As an example, a board data object rendering associated with the board data object ABC may be displayed on the card data object rendering interface of a client device associated with a user Nicole. In this example, Nicole may provide a reversal card action input indicating a request to undo, reverse, and/or revert a previous card action input through said card data object rendering interface that displays the board data object rendering (for example, through selecting the "undo" button displayed on the card data object rendering interface).

Subsequent to step/operation 1004, the method 1000 proceeds to step/operation 1006. At step/operation 1006, a processing circuitry (such as the processor 301 of the client device 101A described above in connection with FIG. 1 and FIG. 3) may determine card action view metadata of the card action data object.

As described above, the card action data object may comprise card action view metadata (for example, generated based at least in part on step/operation 503 of FIG. 5 described above). As such, the processing circuitry may extract the card action view metadata from the card action data object at step/operation 1006.

Subsequent to step/operation 1006, the method 1000 proceeds to step/operation 1008. At step/operation 1008, a processing circuitry (such as the processor 301 of the client device 101A described above in connection with FIG. 1 and FIG. 3) may determine whether the reversal card action view metadata corresponds to card action view metadata of the card action data object.

In some embodiments, based on the reversal card action view metadata corresponds to card action view metadata of the card action data object, the processing circuitry may determine that the card action data object is reversible. In some embodiments, based on the reversal card action view metadata does not correspond to card action view metadata of the card action data object, the processing circuitry may determine that the card action data object is not reversible.

If, at step/operation 1008, the processing circuitry determines that the reversal card action view metadata corresponds to card action view metadata of the card action data object, the method 1000 proceeds to step/operation 1010. At step/operation 1010, a processing circuitry (such as the processor 301 of the client device 101A described above in connection with FIG. 1 and FIG. 3) may determine that the card action data object is reversible in response to determining that the reversal card action view metadata corresponds to the card action view metadata.

Continuing from the example above, if the card action view metadata of the card action data object indicates a board data object rendering associated with the board identifier ABC, the processing circuitry may determine that the card action data object is reversible as the reversal card action view metadata also indicates a board data object rendering associated with the board identifier ABC. As such, the processing circuitry may determine that the card action data object is reversible if the user provides a reversal card action input when viewing the rendering of the same board data object as the board data object that is rendered when the user provides the previous card action input that caused the card action data object to be generated. In other words, the processing circuitry may determine that the card action data object is reversible when it is generated in the same "context" (e.g. the rendering of the card data object, list data object, or the board data object that is displayed) of the card action input as the "context" of the reversal card action input.

If, at step/operation 1008, the processing circuitry determines that reversal card action view metadata does not correspond to card action view metadata of the card action data object, the method 1000 proceeds to step/operation 1012. At step/operation 1012, a processing circuitry (such as the processor 301 of the client device 101A described above in connection with FIG. 1 and FIG. 3) may determine that the card action data object is not reversible in response to determining that the reversal card action view metadata does not correspond to the card action view metadata.

Continuing from the example above, if the card action view metadata of the card action data object indicates a board data object rendering associated with the board identifier DEF, the processing circuitry may determine that the card action data object is not reversible as the reversal card action view metadata indicates a board data object rendering associated with the board identifier ABC. As such, the processing circuitry may determine that the card action data object is not reversible if the user provides reversal card action input when viewing the rendering of a different board data object than the board data object that is rendered when the user provides the previous card action input that caused the card action data object to be generated. The processing circuitry may determine that the card action data object is not reversible when it is in a different "context" (e.g. the rendering of the card data object, list data object, or the board data object that is displayed) of the card action input than the "context" of the reversal card action input.

In some embodiments, subsequent to determining that the card action data object is not reversible, the processing circuitry may forgo executing the reversal card action operation, forgo deleting the card action data object indication from the card action history registry, and forgo adding the card action data object indication to the reversed card action history registry. For example, the processing circuitry may forgo step/operation 414, step/operation 416, and step/operation 418 described above in connection with FIG. 4B.

Referring back to FIG. 10, subsequent to step/operation 1010 or step/operation 1012, the method 1000 proceeds to block 1014 and ends.

As described above, the example methods illustrated in the FIG. 8, FIG. 9, and FIG. 10 describe example criteria/conditions for determining whether a card action data object is reversible in connection with step/operation 412 of FIG. 4B. In some embodiments, determining whether a card action data object is reversible in connection with step/operation 412 of FIG. 4B may be based on one or more of the example criteria/conditions described above in connection with FIG. 8, FIG. 9, and FIG. 10.

As described above in connection with at least step/operation 416 and step/operation 418 of FIG. 4B, in some embodiments, the processing circuitry may delete the card action data object indication from the card action history registry and add the card action data object indication to a reversed card action history registry in response to determining that the card action data object reversible and/or executing a reversal card action operation. Referring now to FIG. 11 and FIG. 12, examples of a card action history registry and a reversed card action history registry are shown.

As shown in FIG. 11, the example card action history registry 1100 comprises a first card action data object indication 1101 and a second card action data object indication 1103. For example, the example card action history registry 1100 shown in FIG. 11 may depict a card action history registry that has been updated in accordance with step/operation 408 of FIG. 4A and prior to receiving a reversal card action input. In some embodiments, the first card action data object indication 1101 and the second card action data object indication 1103 may be in a "first in, last out" arrangement. For example, the first card action data object indication 1101 may be generated prior to the second card action data object indication 1103, and the second card action data object indication 1103 is positioned above the first card action data object indication 1101.

In some embodiments, subsequent to receiving a reversal card action input (for example, based on step/operation 410 described above in connection with FIG. 4A) and determining that the card action data object corresponding to the second card action data object indication 1103 (e.g., the most recent card action data object indication) is reversible, the processing circuitry may update the card action history registry 1100 in FIG. 11 to the card action history registry 1100' in FIG. 12 by deleting the second card action data object indication 1103' from the card action history registry 1100'. The processing circuitry may update the reversed card action history registry 1200 in FIG. 12 to add the second card action data object indication 1103.

As described above in connection with at least step/operation 414 of FIG. 4B, in some embodiments, the processing circuitry may execute a reversal card action operation subsequent to determining that a card action data object is reversible. In some embodiments, the reversible card action registry defines a plurality of reversal card action operations, and each of the plurality of reversal card action operations corresponds to one or more card action type metadata. Referring now to FIG. 13, an example reversible card action registry 1300 is shown.

In the example shown in FIG. 13, the example reversible card action registry 1300 may define one or more correlations between card action type metadata 1301 and reversal card action operations 1302.

For example, a first card action type metadata 1303 indicating associating a list identifier with a card data object corresponds to a first reversal card action operation 1304 indicating disassociating the list identifier from the card data object. A second card action type metadata 1305 indicating associating a user identifier with a card data object corresponds to a second reversal card action operation 1306 indicating disassociating the user identifier from the card data object. A third card action type metadata 1307 indicating associating a label identifier with a card data object corresponds to a third reversal card action operation 1308 indicating disassociating the label identifier from the card data object.

In some embodiments, when executing a reversal card action operation, the processing circuitry may determine a card action type metadata associated with the card action data object, and determine the reversal card action operation corresponding to the card action type metadata based at least in part on the reversible card action registry.

For example, based on the card action type metadata indicating associating a list identifier with a card data object, the processing circuitry may execute the first reversal card action operation 1304 indicates disassociating the list identifier from the card data object. Based on the card action type metadata indicating associating a user identifier with a card data object, the processing circuitry may execute the second reversal card action operation 1306 indicating disassociating the user identifier from the card data object. Based on the card action type metadata indicating associating a label identifier with a card data object, the processing circuitry may execute the third reversal card action operation 1308 indicating disassociating the label identifier from the card data object.

While the example illustrated in connection with FIG. 13 shows some example correlations between card action type metadata and reversal card action operations defined by a reversible card action registry, it is noted that the scope of the present disclosure is not limited to the examples described above. In some examples, an example reversible card action registry may comprise one or more additional and/or alternative correlations between card action type metadata and reversal card action operations that are not shown in the example of FIG. 13.

As described above, in some embodiments, a client device may receive one or more reinstate card action inputs. The reinstate card action input may comprise data/information indicating a request to undo, reverse, and/or revert changes to a card data object that was caused or triggered by a reversal card action operation. Referring now to FIG. 14, an example method 1400 is illustrated. In particular, the example method 1400 illustrates examples of responding a reinstate card action input in accordance with example embodiments of the present disclosure.

As shown in FIG. 14, the example method 1400 starts at block 1402 and then proceeds to step/operation 1404. At step/operation 1404, a processing circuitry (such as the processor 301 of the client device 101A described above in connection with FIG. 1 and FIG. 3) may receive a reinstate card action input.

In some embodiments, the reinstate card action input may be received subsequent to adding a card action data object indication to the reversed card action history registry (for example, based on the step/operation 418 described above in connection with FIG. 4B). As described above, the reinstate card action input may comprise data/information indicating a request to undo, reverse, and/or revert changes to a card data object that was caused or triggered by a reversal card action operation. In some embodiments, the reinstate card action input may be received from a user in the form of a selection of a "redo" button on a card data object rendering interface rendered for display on a client device.

In some embodiments, the user may input keystrokes by pressing on the "Shift" key together with the "Z" key on a keyboard to provide the reinstate card action input. In response to receiving the keystrokes, the processing circuitry may receive a reinstate card action. In some embodiments, the keystrokes for providing reinstate card action input may be triggered by pressing on another key, or may be trigger by pressing on a combination of keys.

As an example, a user David operating a client device may provide a reinstate card action input by clicking on the redo button on the card data object rendering interface. Prior to David clicking on the redo button, David provided an initial card action input to reassign a first card data object "Identify Goal Stakeholders" from a first list data object "Goal 1: Grow Customers by 25%" to a second list data object "Done (Q4 2020)," and the processing circuitry generates a first action data object based on the initial card action input. Additionally, prior to David clicking on the redo button, David provided a reversal card action input to undo the initial card action input, and the processing circuitry executed a corresponding reversal card action operation to reassign the first card data object "Identify Goal Stakeholders" from the second list data object "Done (Q4 2020)" back to the first list data object "Goal 1: Grow Customers by 25%." In this example, the reinstate card action input from David indicates an electronic request to redo the initial card action input that has been reverted by the reversal card action input.

Subsequent to step/operation 1404, the method 1400 proceeds to step/operation 1406. At step/operation 1406, a processing circuitry (such as the processor 301 of the client device 101A described above in connection with FIG. 1 and FIG. 3) may execute a reinstate card action operation based on the card action data object indication in response to receiving the reinstate card action input.

As described above in connection with at least step/operation 418 of FIG. 4B, subsequent to determining that a card action data object is reversible and/or executing the reversal card action operation, the processing circuitry may add the card action data object indication corresponding to the card action data object to a reversed card action history registry. Here, the processing circuitry may retrieve the card action data object indication from the reversed card action history registry, determine the card action data object corresponding to the card action data object indication, and execute a reinstate card action operation based on the card action data object (for example, based on one or more metadata associated with the card action data object, including, but not limited to, card action type metadata, card action variable metadata, and/or among others).

Continuing from the example above, in response to receiving the reinstate card action input, the processing circuitry may retrieve the first action data object and execute the corresponding reinstate card action operation to reassign the first card data object from the first list data object to the second list data object.

Subsequent to step/operation 1406, the method 1400 proceeds to step/operation 1408. At step/operation 1408, a processing circuitry (such as the processor 301 of the client device 101A described above in connection with FIG. 1 and FIG. 3) may delete the card action data object indication from the reversed card action history registry in response to receiving a reinstate card action input. Subsequent to step/operation 1408, the method 1400 proceeds to step/operation 1410. At step/operation 1410, a processing circuitry (such as the processor 301 of the client device 101A described above in connection with FIG. 1 and FIG. 3) may add the card action data object indication to the card action history registry.

For example, referring now to FIG. 15A, an example card action history registry 1501 and an example reversed card action history registry 1502 are shown. The card action history registry 1501 may comprise a first card action data object indication 1505, which may indicate a card action data object that is generated based on a card action input. The reversed card action history registry 1502 may comprise a second card action data object indication 1503, which may indicate a card action data object where a corresponding reversal card action operation has been executed in accordance with various examples of the present disclosure.

Referring now to FIG. 15B, in response to receiving a reinstate card action input, the processing circuitry may delete the second card action data object indication 1503' from the reversed card action history registry 1502, and add the second card action data object indication 1503 to the card action history registry 1501. As such, in the event that another reversal card action input is received subsequent to executing the reinstate card action operation, the processing circuitry may retrieve the second card action data object indication 1503 from the card action history registry 1501 and determine whether the corresponding card action data object is reversible, similar to those described above.

Referring back to FIG. 14, subsequent to step/operation 1410, the method 1400 proceeds to block 1412 and ends.

As described above, in some embodiments, a client device may receive one or more replicate card action inputs. The replicate card action input may comprise data/information indicating a request to duplicate, repeat, and/or replicate changes to a card data object (that were caused or triggered by a previous card action input) on another card data object. Referring now to FIG. 16, an example method 1600 is illustrated. In particular, the example method 1600 illustrates examples of interactions with data objects in response to receiving a replicate card action input in accordance with example embodiments of the present disclosure.

In some embodiments, the processing circuitry may determine that one or more changes to a card data object cannot be duplicated, repeated, or replicated. For example, the processing circuitry may determine that an action to complete a checklist item is not repeatable.

As shown in FIG. 16, the example method 1600 starts at block 1602 and then proceeds to step/operation 1604. At step/operation 1604, a processing circuitry (such as the processor 301 of the client device 101A described above in connection with FIG. 1 and FIG. 3) may receive a first card action input associated with a first card data object.

In some embodiments, step/operation 1604 is similar to step/operation 404 described above in connection with FIG. 4A. As an example, Adam may provide card action input to assign a first card data object "Identify Goal Stakeholders" from a first list data object "Goal 1: Grow Customers by 25%" to a second list data object "Done (Q4 2020)" in a card-based collaborative workflow management system. In some embodiments, the processing circuitry may change the list association metadata associated with the first card data object from indicating the first list data object to indicating the second list data object.

Subsequent to step/operation 1604, the method 1600 proceeds to step/operation 1606. At step/operation 1606, a processing circuitry (such as the processor 301 of the client device 101A described above in connection with FIG. 1 and FIG. 3) may trigger generating a first card action data object in response to receiving the first card action input associated with the first card data object.

In some embodiments, step/operation 1606 is similar to step/operation 406 described above in connection with FIG. 4A. Continuing from the Adam example above, in response to receiving the card action input, the processing circuitry may trigger generating a card action data object based on the card action input and the first card data object. For example, the processing circuitry may generate card action type metadata of the card action data object indicating that a type of card action input is a move card action. The processing circuitry may generate the card action variable metadata comprising at least the first list identifier associated with the first list data object and the second list identifier associated with the second list data object.

Subsequent to step/operation 1606, the method 1600 proceeds to step/operation 1608. At step/operation 1608, a processing circuitry (such as the processor 301 of the client device 101A described above in connection with FIG. 1 and FIG. 3) may receive a first replicate card action input associated with a second card data object.

In some embodiments, the first replicate card action input comprises data/information indicating a request to duplicate, repeat, and/or replicate changes to a first card data object (for example, changes to the metadata that were caused or triggered by the first card action input received at step/operation 1604) on the second card data object. In some embodiments, the first replicate card action input may specify the second card data object where the changes are to be duplicated, repeated, and/or replicated.

Continuing from the Adam example above, Adam may provide the first replicate card action input to duplicate, repeat, and/or replicate changes that have been applied to the first card data object (e.g. reassigning it from a first list data object "Goal 1: Grow Customers by 25%" to a second list data object "Done (Q4 2020)") on a second card data object "Launch customer referral email program." For example, Adam may provide the first replicate card action input when viewing a rendering of the second card data object, details of which are described herein.

Subsequent to step/operation 1608, the method 1600 proceeds to step/operation 1610. At step/operation 1610, a processing circuitry (such as the processor 301 of the client device 101A described above in connection with FIG. 1 and FIG. 3) may determine first card action type metadata and first card action variable metadata associated with the first card action data object in response to receiving a first replicate card action input associated with a second card data object.

As described above, the card action data object generated at step/operation 1606 may comprise card action type metadata and card action variable metadata. At step/operation 1610, the processing circuitry may extract the card action type metadata and the card action variable metadata from the card action data object.

Continuing from the Adam example above, the card action data object may comprise card action type metadata indicating a move card action and the card action variable metadata comprising at least the first list identifier associated with the first list data object and the second list identifier associated with the second list data object.

Subsequent to step/operation 1610, the method 1600 proceeds to step/operation 1612. At step/operation 1612, a processing circuitry (such as the processor 301 of the client device 101A described above in connection with FIG. 1 and FIG. 3) may execute a first replicate card action operation on the second card data object.

In some embodiments, the processing circuitry may determine the first replicate card action operation based at least in part on the first card action type metadata and first card action variable metadata. For example, the processing circuitry may apply the same or similar type of action (as described by the card action type metadata) and one or more same or similar variables (as described by the card action variable metadata) on the second card action data object.

Continuing from the Adam example above, the processing circuitry may determine the first replicate card action operation based on the card action type metadata indicating a move card action and the card action variable metadata comprising at least the first list identifier associated with the first list data object and the second list identifier associated with the second list data object. The processing circuitry may execute the first replicate card action operation, causing reassigning the second card data object "Launch customer referral email program" from a first list data object "Goal 1: Grow Customers by 25%" to a second list data object "Done (Q4 2020)" (e.g. updating the list association metadata of the second card data object based on removing the first list identifier and adding the second list identifier).

Referring back to FIG. 16, subsequent to step/operation 1612, the method 1600 proceeds to block 1614 and ends.

Referring now to FIG. 17, an example method 1700 is illustrated. In particular, the example method 1700 illustrates examples of generating card action template data objects. As described above, a card action template data object comprises data/information that indicates, describes, and/or defines a sequence of software operations that are to be carried out by a computing device on one or more card data objects, list data objects, and/or board data objects.

As shown in FIG. 17, the example method 1700 starts at block 1701 and then proceeds to step/operation 1703. At step/operation 1703, a processing circuitry (such as the processor 301 of the client device 101A described above in connection with FIG. 1 and FIG. 3) may determine card action type metadata and card action variable metadata.

In some embodiments, the processing circuitry may determine the card action type metadata and the card action variable metadata associated with a card action data object, similar to those described above in connection with step/operation 1610 of FIG. 16. For example, the card action type metadata comprises data and/or information indicating a type or category of card action input and/or software operations. The card action variable metadata comprises data and/or information indicating parameter(s) and/or variable(s) of the card action input and/or the software operations associated with one or more card data objects, one or more list data objects, and/or one or more board data objects.

Subsequent to step/operation 1703, the method 1700 proceeds to step/operation 1705. At step/operation 1705, a processing circuitry (such as the processor 301 of the client device 101A described above in connection with FIG. 1 and FIG. 3) may generate a card action template data object based on the card action type metadata and card action variable metadata.

In some embodiments, the card action template data object comprises the card action type metadata and card action variable metadata. As such, the card action template data object indicates, describes, and/or defines a sequence of software operations that specify a type or category of software operations (based on the card action type metadata) and one or more parameter(s) and/or variable(s) associated with the software operations (based on the card action variable metadata).

Subsequent to step/operation 1705, the method 1700 proceeds to step/operation 1707. At step/operation 1707, a processing circuitry (such as the processor 301 of the client device 101A described above in connection with FIG. 1 and FIG. 3) may store the card action template data object.

In some embodiments, the processing circuitry may store the card action template data object in the at least one non-transitory memory and/or a storage device of an apparatus (for example, the memory 303 of the client device 101A described above in connection with FIG. 1 and FIG. 3).

In some embodiments, in response to receiving a user request to apply the card action template data object on a card data object, the processing circuitry may retrieve the card action template data object from the memory and/or the storage device, and may execute software operations on the card data object based on the card action type metadata and card action variable metadata of the card action template data object, similar to those described above in connection with step/operation 1612 of FIG. 16.

Referring back to FIG. 17, subsequent to step/operation 1707, the method 1700 proceeds to block 1709 and ends.

Example User Interfaces for Implementing Embodiments of the Present Disclosure

Various example user interfaces described herein, including, for example, those as shown in FIG. 18A to FIG. 27, may provide various technical advantages and/or improvements described above.

Referring now to FIG. 18A to FIG. 18D, various example card data object rendering interfaces are illustrated. In particular, the example card data object rendering interfaces illustrate example software operations associated with responding to a card action input, generating a card action data object, responding to a reversal card action input, and executing a reversal card action operation.

Referring now to FIG. 18A, an example card data object rendering interface 1800A associated with a computer program (for example, a card-based collaborative workflow management system) is illustrated. In particular, the example card data object rendering interface 1800A comprises a plurality of card data object renderings, including, but not limited to, card data object rendering 1802, card data object rendering 1804, card data object rendering 1806, card data object rendering 1808, card data object rendering 1810, and card data object rendering 1812. Each of the plurality of card data object renderings may be in the form a card and corresponds to one of the card data objects associated with the computer program.

As described above, a card data object may be associated with a list data object. In the example card data object rendering interface 1800A, the association between a card data object and a list data object may be represented as the card data object rendering of the card data object being displayed within and/or on top of the list data object rendering of the list data object.

For example, the example card data object rendering interface 1800A may comprise a list data object rendering 1814, a list data object rendering 1816, and a list data object rendering 1818. The card data object rendering 1802, the card data object rendering 1804, and the card data object rendering 1806 are displayed within the list data object rendering 1814, indicating that the card data object corresponding to the card data object rendering 1802, the card data object corresponding to the card data object rendering 1804, and the card data object corresponding to the card data object rendering 1806 are associated with the list data object corresponding to the list data object rendering 1814. Similarly, the card data object rendering 1808 and the card data object rendering 1810 are displayed within the list data object rendering 1816, indicating that the card data object corresponding to the card data object rendering 1808 and the card data object corresponding to the card data object rendering 1810 are associated with the list data object corresponding to the list data object rendering 1816. Similarly, the card data object rendering 1812 is displayed within the list data object rendering 1818, indicating that the card data object corresponding to the card data object rendering 1812 is associated with the list data object corresponding to the list data object rendering 1818.

As described above, a card data object (and/or a list data object) may be associated with a board data object. In the example card data object rendering interface 1800A, the association between a card data object (and/or a list data object) and a board data object may be represented as the card data object rendering of the card data object (and/or the list data object rendering of the list data object) being displayed within and/or on top of the board data object rendering of the board data object.

For example, the example card data object rendering interface 1800A may comprise a board data object rendering 1820. The card data object rendering 1802, card data object rendering 1804, card data object rendering 1806, card data object rendering 1808, card data object rendering 1810, and card data object rendering 1812 are displayed within the board data object rendering 1820, indicating that the card data objects corresponding to these card data object renderings are associated with the board data object corresponding to the board data object rendering 1820. Similarly, the list data object rendering 1814, the list data object rendering 1816, and the list data object rendering 1818 are displayed within the board data object rendering 1820, indicating that the list data objects corresponding to these list data object renderings are associated with the board data object corresponding to the board data object rendering 1820.

Referring now to FIG. 18B, an example card data object rendering interface 1800B associated with a card action input is illustrated. A user operating a client device may provide a card action input to move the card data object rendering 1802 from the list data object rendering 1814 to the list data object rendering 1818. The card action input illustrated in FIG. 18B illustrates a card action input to remove the association between the card data object corresponding to the card data object rendering 1802 and the list data object corresponding to the list data object rendering 1814, and to add an association between the card data object corresponding to the card data object rendering 1802 and the list data object corresponding to the list data object rendering 1818.

Referring now to FIG. 18C, subsequent to receiving the card action input, the processing circuitry may update the user interface to the example card data object rendering interface 1800C. As shown, the card data object rendering 1802 is displayed with the list data object rendering 1818 instead of within the list data object rendering 1814, indicating that the card data object corresponding to the card data object rendering 1802 is associated with the list data object corresponding to the list data object rendering 1818. The processing circuitry may generate a card action data object in accordance with examples of the present disclosure.

In some embodiments, a user may provide a reversal card action input. The example card data object rendering interface 1800C may comprise a user interface element 1822 in the form of an "undo" button. In response to receiving a selection of the user interface element 1822, the processing circuitry may receive a reversal card action. Subsequent to receiving the reversal card action input, the processing circuitry may execute a reversal card action operation based on the various examples described in the present disclosure.

Referring now to FIG. 18D, an example card data object rendering interface 1800D is shown. Subsequent to executing the reversal card action operation, the card data object rendering 1802 is displayed within the list data object rendering 1814 instead of within the list data object rendering 1818, indicating that the card data object corresponding to the card data object rendering 1802 is associated with the list data object corresponding to the list data object rendering 1814.

In some embodiments, the processing circuitry may generate a user interface element 1824 indicating that the reversal card action operation has been executed. For example, the user interface element 1824 may be in the form of a notification message specifying the reversal card action operation that has been executed (e.g. moved to list "Goal 1: Grow Customers By 25%").

Referring now to FIG. 19A to FIG. 19D, various example card data object rendering interfaces are illustrated. In particular, the example card data object rendering interfaces illustrate example software operations associated with responding to a card action input, generating a card action data object, responding to a reversal card action input, and executing a reversal card action operation.

As shown in FIG. 19A, an example card data object rendering interface 1900A associated with a card data object is illustrated. In particular, the example card data object rendering interface 1900A illustrates an example card data object back rendering that displays details and information associated with the card data object. In some embodiments, an example card data object back rendering may be triggered for display when a user selects a card data object rendering on a card data object rendering interface (for example, when the user selects the card data object rendering 1802 described and illustrated above in connection with FIG. 18A).

In some embodiments, the example card data object rendering interface 1900A may comprise a title rendering 1901 based on the card title metadata associated with the card data object. The example card data object rendering interface 1900A may comprise a list association rendering 1903 based on the list association metadata associated with the card data object. The example card data object rendering interface 1900A may comprise a label rendering 1905 based on the card label metadata associated with the card data object. The example card data object rendering interface 1900A may comprise a description rendering 1907 based on the card description metadata associated with the card data object. The example card data object rendering interface 1900A may comprise an activity rendering 1909 based on the card activity metadata associated with the card data object.

In some embodiments, the example card data object rendering interface 1900A may comprise one or more buttons that allow a user to provide card action input associated with the card data object. For example, the example card data object rendering interface 1900A may comprise a members button 1911 that allows a user to provide card action input to change the card user metadata associated with the card data object. The example card data object rendering interface 1900A may comprise a labels button 1913 that allows a user to provide card action input to change the card label metadata associated with the card data object. The example card data object rendering interface 1900A may comprise a checklist button 1915 that allows a user to provide card action input to change the card checklist metadata associated with the card data object. The example card data object rendering interface 1900A may comprise a due date button 1917 that allows a user to provide card action input to change the card due date metadata associated with the card data object. The example card data object rendering interface 1900A may comprise a attachment button 1919 that allows a user to provide card action input to change the card attachment metadata associated with the card data object. The example card data object rendering interface 1900A may comprise a cover button 1921 that allows a user to provide card action input to change the card cover metadata associated with the card data object. The example card data object rendering interface 1900A may comprise a move button 1923 that allows a user to provide card action input to change the list association metadata and/or the board association metadata associated with the card data object. The example card data object rendering interface 1900A may comprise an archive button 1925 that allows a user to provide card action input to change the card status metadata associated with the card data object.

In some embodiments, a user operating a client device may provide one or more card action inputs through selecting one or more of the buttons. Referring now to FIG. 19B, an example card data object rendering interface 1900B is illustrated.

As shown in FIG. 19B, in response to a user selection of the members button 1911, the processing circuitry may update the user interface to display a member addition pane 1927. The member addition pane 1927 may allow the user to update the card user metadata of the card data object by input user identifier(s) through the input box 1929 and/or selecting one or more user icons (for example, a user icon 1931).

For example, a user may select the user icon 1931, providing a card action input to the processing circuitry indicating adding a user "YZ" corresponding to the user icon 1931 to the card data object. The processing circuitry may update the card data object rendering interface to the example card data object rendering interface 1900C shown in FIG. 19C. The example card data object rendering interface 1900C comprises a members rendering 1933 showing a user icon "YZ," indicating that the card data object is associated with the user YZ. The processing circuitry may generate a card action data object in accordance with examples of the present disclosure.

In some embodiments, a user may provide a reversal card action input. For example, the user may input keystrokes by pressing on the "Z" key on a keyboard. In response to receiving the keystrokes, the processing circuitry may receive a reversal card action. Subsequent to receiving the reversal card action input, the processing circuitry may execute a reversal card action operation based on the various examples described in the present disclosure. In some embodiments, the keystrokes for providing reversal card action input may be triggered by pressing on another key, or may be trigger by pressing on a combination of keys.

Referring now to FIG. 19D, subsequent to executing the reversal card action operation, the user icon "YZ" is removed from the card data object rendering interface 1900D, indicating that the card data object corresponding to the card data object back rendering is no longer associated with the user YZ.

In some embodiments, the processing circuitry may generate a user interface element 1935 indicating that the reversal card action operation has been executed. For example, the user interface element 1935 may be in the form of a notification message specifying the reversal card action operation that has been executed (e.g. member "YZ" removed).

Referring now to FIG. 20A to FIG. 20C, various example card data object rendering interfaces are illustrated. In particular, the example card data object rendering interfaces illustrate example software operations associated with responding to a card action input, generating a card action data object, responding to a reversal card action input, and executing a reversal card action operation.

Referring now to FIG. 20A, an example card data object rendering interface 2000A illustrating an example card data object back rendering of a card data object is shown. In some embodiments, a user operating a client device may provide one or more card action inputs through one or more of the buttons of the example card data object rendering interface 2000A. For example, in response to a user selection of the add label button 2002, the processing circuitry may update the card data object rendering interface to display a label addition pane 2004. The label addition pane 2004 may allow the user to update the card label metadata of the card data object by input label identifier(s) through the input box 2006 and/or selecting one or more label icons 2008.

For example, a user may select a label icon "In Progress" from label icons 2008, providing a card action input to the processing circuitry indicating adding a label "In Progress" to the card data object. The processing circuitry may update the card data object rendering interface to the example card data object rendering interface 2000B shown in FIG. 20B. The example card data object rendering interface 2000B comprises a label rendering 2012 showing a label icon "In Progress," indicating that the card data object is associated with the label "In Progress." The processing circuitry may generate a card action data object in accordance with examples of the present disclosure.

In some embodiments, a user may provide a reversal card action input. For example, the user may input keystrokes by pressing on the "Z" key on a keyboard. In response to receiving the keystrokes, the processing circuitry may receive a reversal card action. Subsequent to receiving the reversal card action input, the processing circuitry may execute a reversal card action operation based on the various examples described in the present disclosure. In some embodiments, the keystrokes for providing reversal card action input may be triggered by pressing on another key, or may be trigger by pressing on a combination of keys.

Referring now to FIG. 20C, subsequent to executing the reversal card action operation, the label icon "In Progress" is removed from the card data object rendering interface 2000C, indicating that the card data object corresponding to the card data object back rendering is no longer associated with the label "In Progress."

In some embodiments, the processing circuitry may generate a user interface element 2014 indicating that the reversal card action operation has been executed. For example, the user interface element 2014 may be in the form of a notification message specifying the reversal card action operation that has been executed (e.g. label "In Progress" removed).

Referring now to FIG. 21 to FIG. 27, various example card data object rendering interfaces are illustrated. In particular, the example card data object rendering interfaces illustrate example software operations associated with responding to a card action input and a replicate card action input.

FIG. 21 and FIG. 22 each illustrates an example card data object rendering interface that comprises a board data object rendering corresponding a board data object. In particular, FIG. 21 illustrates a first board data object rendering 2101 corresponding to the board data object "Meeting" displayed on the card data object rendering interface 2100, and FIG. 22 illustrates a second board data object rendering 2202 corresponding to the board data object "Goals" displayed on the card data object rendering interface 2200.

As described above, a board data object may be associated with a plurality of card data objects and list data objects. For example, as shown in FIG. 21, the board data object "Meeting" may be associated with a list data object "Next Town Hall Agenda" corresponding to list data object rendering 2103. As shown in FIG. 22, the board data object "Goals" may be associated with a card data object "Identify Goal Stakeholders" corresponding to the card data object rendering 2204, and a card data object "Launch customer referral email program" corresponding to the card data object rendering 2206. Both the card data object "Identify Goal Stakeholders" and the card data object "Launch customer referral email program" may be associated with a list data object "Goal 1: Grow Customers By 25%" corresponding to the list data object rendering 2208, which is in turn associated with board data object "Goals."

FIG. 23A to FIG. 24 illustrate example software operations associated with responding to a card action input and generating a card action data object in accordance with examples of the present disclosure.

FIG. 23A illustrates an example card data object rendering interface 2300A providing an example card data object back rendering of a card data object "Identify Goal Stakeholders." A user operating a client device may provide card action input through selecting the move button 2301. In response to a user selection of the move button 2301, the processing circuitry may update the card data object rendering interface to the card data object rendering interface 2300B shown in FIG. 23B to display a move card pane 2303. The move card pane 2303 may allow the user to update the board association metadata and/or the list association metadata associated with the card data object "Identify Goal Stakeholders."

For example, the move card pane 2303 may comprise a suggestion section 2305 that displays list identifiers and/or board identifiers that the processing circuitry determined as recommended list identifiers and/or board identifiers to be associated with the card data object "Identify Goal Stakeholders." The move card pane 2303 may comprise a broad selection section 2307, a list selection section 2309, and a position selection section 2311, allowing a user to provide card action input specifying the board identifier, the list identifier, and the position in the list data object, respectively, for the card data object "Identify Goal Stakeholders." The move card pane 2303 may comprise a confirmation button 2313 that allows the user to confirm the change once proper selection(s) in the broad selection section 2307, the list selection section 2309, and/or the position selection section 2311 are made.

For example, in the example card data object rendering interface 2300C shown in FIG. 23C, the user may select the board identifier rendering 2315 corresponding to the board data object "Meeting" in the move card pane 2303'. The user may select a list identifier rendering corresponding to the list data object "Next Town Hall Agenda."

In some embodiments, in response to receiving a selection of the confirmation button 2313, the processing circuitry may update the list association metadata and the board association metadata of the card data object "Identify Goal Stakeholders." As described above in connection with FIG. 22, the card data object "Identify Goal Stakeholders" is previously associated with the list data object "Goal 1: Grow Customers By 25%" and the board data object "Goals." Subsequent to receiving the card action input, the processing circuitry may update the list association metadata of the card data object "Identify Goal Stakeholders" to indicate that it is associated with the list data object "Next Town Hall Agenda," and update the board association metadata of the card data object "Identify Goal Stakeholders" to indicate that it is associated with the board data object "Meeting."

Referring now to FIG. 24, an example card data object rendering interface 2400 is illustrated. In particular, the example card data object rendering interface 2400 shows that the card data object rendering 2204 (corresponding to the card data object "Identify Goal Stakeholders") is displayed within the list data object rendering 2103' (corresponding to the list data object "Next Town Hall Agenda"), which is displayed within the card data object rendering 2101' (corresponding to the board data object "Meeting."). The processing circuitry may generate a card action data object in accordance with examples of the present disclosure.

FIG. 25 to FIG. 27 illustrate example software operations associated with the responding to a replicate card action input and executing a replicate card action operation in accordance with examples of the present disclosure.

Referring now FIG. 25, an example card data object rendering interface 2500 is shown. As shown in FIG. 25, the card data object "Launch customer referral email program" (corresponding to the card data object rendering 2206) is associated with the list data object "Goal 1: Grow Customers By 25%" (corresponding to the list data object rendering 2208') and the board data object "Goals" (corresponding to the second board data object rendering 2202'), similar to those described above connection with FIG. 22.

In some embodiments, a user may select the card data object rendering 2206, which may trigger the processing circuitry to display the card data object rendering interface 2600 shown in FIG. 26. The example card data object rendering interface 1900A illustrates an example card data object back rendering that display details and information associated with the card data object "Launch customer referral email program."

In some embodiments, when card data object rendering interface 2600 is displayed on a client device, a user may provide a replicate card action input. For example, the user may provide one or more keystrokes (e.g. pressing on the "R" key on a keyboard). In some embodiments, the processing circuitry may execute a replicate card action operation in accordance with examples of the present disclosure. In some embodiments, the keystrokes for providing replicate card action input may be triggered by pressing on another key, or may be trigger by pressing on a combination of keys.

In some embodiments, the processing circuitry may determine a replicate card action operation based on the updates of the list association metadata and the board association metadata of the card data object "Identify Goal Stakeholders." The processing circuitry may execute the replicate card action operation to apply similar changes to the list association metadata and the board association metadata of the card data object "Launch customer referral email program." For example, the processing circuitry may update the list association metadata of the card data object "Launch customer referral email program" to indicate that it is associated with the list data object "Next Town Hall Agenda," and update the board association metadata of the card data object "Launch customer referral email program" to indicate that it is associated with the board data object "Meeting."

Referring now to FIG. 27, an example card data object rendering interface 2700 is illustrated. In particular, the example card data object rendering interface 2700 shows that the card data object rendering 2206 (corresponding to the card data object "Launch customer referral email program") is displayed within the list data object rendering 2103" (corresponding to the list data object "Next Town Hall Agenda") and within the board data object rendering 2101" (corresponding to the board data object "Meeting."). The processing circuitry may generate a card action data object in accordance with examples of the present disclosure.

Additional Implementation Details

Although example processing systems have been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. A computer-readable storage medium can be, or be included in, a computer-readable storage device, a computer-readable storage substrate, a random or serial access memory array or device, or a combination of one or more of them. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random-access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer needs not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., an LCD monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML (Hypertext Markup Language) page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as description of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

The invention claimed is:

1. An apparatus comprising at least one processor and at least one non-transitory memory comprising program code, the at least one non-transitory memory and the program code configured to, with the at least one processor, cause the apparatus to at least:
   in response to receiving a card action input associated with a card data object, trigger generating a card action data object based at least in part on the card action input and the card data object, wherein triggering generating the card action data object comprises:
      generating card action type metadata and card action variable metadata for the card action data object based at least in part on the card action input;
      generating card action time metadata based at least in part on a system time associated with the card action input; and
      assigning card action identifier metadata to the card action data object;
   update a card action history registry with a card action data object indication associated with the card action data object;
   in response to receiving a reversal card action input, determine whether the card action data object is reversible based at least in part on a reversible card action registry; and
   in response to determining that the card action data object is reversible based at least in part on the reversible card action registry:
      execute a reversal card action operation associated with the card action data object, and
      in response to executing the reversal card action operation, delete the card action data object indication from the card action history registry and add the card action data object indication to a reversed card action history registry.

2. The apparatus of claim 1, wherein, when trigger generating the card action data object, the at least one non-transitory memory and the program code are configured to, with the at least one processor, cause the apparatus to:
   generate card action view metadata based at least in part on the card data object.

3. The apparatus of claim 1, wherein, prior to updating the card action history registry with the card action data object indication, the at least one non-transitory memory and the program code are configured to, with the at least one processor, cause the apparatus to:
   determine whether the card action data object is recordable based at least in part on a recordable card action registry, wherein the recordable card action registry defines a plurality of card action type metadata associated with recordable card action data objects.

4. The apparatus of claim 3, wherein the at least one non-transitory memory and the program code are configured to, with the at least one processor, cause the apparatus to:
in response to determining that the card action data object is recordable, trigger updating the card action history registry with the card action data object indication, wherein the card action history registry is stored in the at least one non-transitory memory of the apparatus.

5. The apparatus of claim 3, wherein the at least one non-transitory memory and the program code are configured to, with the at least one processor, cause the apparatus to:
in response to determining that the card action data object is not recordable, trigger discarding the card action data object.

6. The apparatus of claim 1, wherein the at least one non-transitory memory and the program code are configured to, with the at least one processor, cause the apparatus to:
in response to determining that the card action data object is recordable based at least in part on a recordable card action registry, trigger updating the card action history registry with the card action data object indication associated with the card action data object.

7. A computer-implemented method comprising:
in response to receiving a card action input associated with a card data object, triggering generating a card action data object based at least in part on the card action input and the card data object, wherein triggering generating the card action data object comprises:
generating card action type metadata and card action variable metadata for the card action data object based at least in part on the card action input;
generating card action time metadata based at least in part on a system time associated with the card action input; and
assigning card action identifier metadata to the card action data object;
updating a card action history registry with a card action data object indication associated with the card action data object;
in response to receiving a reversal card action input, determining whether the card action data object is reversible based at least in part on a reversible card action registry; and
in response to determining that the card action data object is reversible based at least in part on the reversible card action registry:
executing a reversal card action operation associated with the card action data object, and
in response to executing the reversal card action operation, deleting the card action data object indication from the card action history registry and add the card action data object indication to a reversed card action history registry.

8. The computer-implemented method of claim 7, wherein triggering generating the card action data object further comprises:
generating card action view metadata based at least in part on the card data object.

9. The computer-implemented method of claim 7, wherein, prior to updating the card action history registry with the card action data object indication, the computer-implemented method further comprises:
determining whether the card action data object is recordable based at least in part on a recordable card action registry, wherein the recordable card action registry defines a plurality of card action type metadata associated with recordable card action data objects.

10. The computer-implemented method of claim 9 further comprising:
in response to determining that the card action data object is recordable, triggering updating the card action history registry with the card action data object indication, wherein the card action history registry is stored in at least one non-transitory memory.

11. The computer-implemented method of claim 9 further comprising:
in response to determining that the card action data object is not recordable, triggering discarding the card action data object.

12. The computer-implemented method of claim 7, further comprising:
in response to determining that the card action data object is recordable based at least in part on a recordable card action registry, triggering updating the card action history registry with the card action data object indication associated with the card action data object.

13. A computer program product comprising at least one non-transitory computer-readable storage medium having computer-readable program code portions stored therein, the computer-readable program code portions comprising an executable portion configured to:
in response to receiving a card action input associated with a card data object, trigger generating a card action data object based at least in part on the card action input and the card data object, wherein triggering generating the card action data object comprises:
generating card action type metadata and card action variable metadata for the card action data object based at least in part on the card action input;
generating card action time metadata based at least in part on a system time associated with the card action input; and
assigning card action identifier metadata to the card action data object;
update a card action history registry with a card action data object indication associated with the card action data object;
in response to receiving a reversal card action input, determine whether the card action data object is reversible based at least in part on a reversible card action registry; and
in response to determining that the card action data object is reversible based at least in part on the reversible card action registry:
execute a reversal card action operation associated with the card action data object, and
in response to executing the reversal card action operation, delete the card action data object indication from the card action history registry and add the card action data object indication to a reversed card action history registry.

14. The computer program product of claim 13, wherein, when trigger generating the card action data object, the computer-readable program code portions comprise the executable portion configured to:
generate card action view metadata based at least in part on the card data object.

15. The computer program product of claim 13, wherein, prior to updating the card action history registry with the card action data object indication, the computer-readable program code portions comprise the executable portion configured to:

determine whether the card action data object is recordable based at least in part on a recordable card action registry, wherein the recordable card action registry defines a plurality of card action type metadata associated with recordable card action data objects.

16. The computer program product of claim 15, wherein the computer-readable program code portions comprise the executable portion configured to:
   in response to determining that the card action data object is recordable, trigger updating the card action history registry with the card action data object indication, wherein the card action history registry is stored in the at least one non-transitory computer-readable storage medium.

17. The computer program product of claim 13, wherein the computer-readable program code portions comprise the executable portion configured to:
   in response to determining that the card action data object is recordable based at least in part on a recordable card action registry, triggering updating the card action history registry with the card action data object indication associated with the card action data object.

* * * * *